(12) United States Patent
Ueki

(10) Patent No.: US 6,345,383 B1
(45) Date of Patent: Feb. 5, 2002

(54) DEBUGGING SUPPORT DEVICE AND DEBUGGING SUPPORT METHOD

(75) Inventor: Katsuhiko Ueki, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 08/528,247

(22) Filed: Sep. 14, 1995

(30) Foreign Application Priority Data

Sep. 14, 1994 (JP) .............................................. 6-219759

(51) Int. Cl.[7] .............................................. G06F 9/45
(52) U.S. Cl. .......................................... 717/4; 709/315
(58) Field of Search ................................ 345/683, 680, 345/704, 702; 717/4; 714/38; 709/315

(56) References Cited

U.S. PATENT DOCUMENTS

| | | | | |
|---|---|---|---|---|
| 4,885,717 A | * | 12/1989 | Beck et al. ................... | 395/704 |
| 5,093,914 A | * | 3/1992 | Coplien et al. ............. | 395/700 |
| 5,339,433 A | * | 8/1994 | Frid-Nielsen ............... | 395/700 |
| 5,428,618 A | * | 6/1995 | Ueki et al. ................... | 395/704 |
| 5,600,838 A | * | 2/1997 | Guillen et al. .............. | 395/683 |
| 5,652,888 A | * | 7/1997 | Burgess ....................... | 395/683 |
| 5,845,125 A | * | 12/1998 | Nishimura et al. ......... | 395/704 |

OTHER PUBLICATIONS

R. Wahle, et al, "Practical Data Breakpoints: Design and Implementation", ACM publication, pp. 1–12, Jun. 1993.*
T. Moher, "PROVIDE: A Process Visualization and Debugging Environment", IEEE Trans. Software Eng. vol. 14, No. 6, pp. 849–857, Jun. 1988.*
Wim De Pauw et al., Visualizing the Behavior of Object-Oriented Systems, 1993, ACM, 326–337.*
Kleyn et al, Graph Trace–Understanding Object–Oriented Systems Using Concurrently Animated Views, OOPSLA '88 Proceedings, p. 191–205.*

* cited by examiner

*Primary Examiner*—Majid Banankhah
*Assistant Examiner*—Sue Lao
(74) *Attorney, Agent, or Firm*—Oblon, Spivak, McClelland, Maier & Neustadt, P.C.

(57) ABSTRACT

A debugging support method for object-oriented programs by which the debug target objects may be designated and a debugging support method equipped with various means for realizing said method. A first designation means (110) designates an object (100) as the debug target object. At a second designation means (101), a destination designation means (104) designates the destination of the event history and a range designation means (105) designates the range of objects targeted for debug support. While said designation is registered in a storage means (107), a second sending means (109) notifies a collection means (102) of the messages received by a receiving means (106) and messages sent by a first sending means (108). After the completion of the processes, a cancellation means (103) deletes the registered contents in said storage means (107).

16 Claims, 31 Drawing Sheets

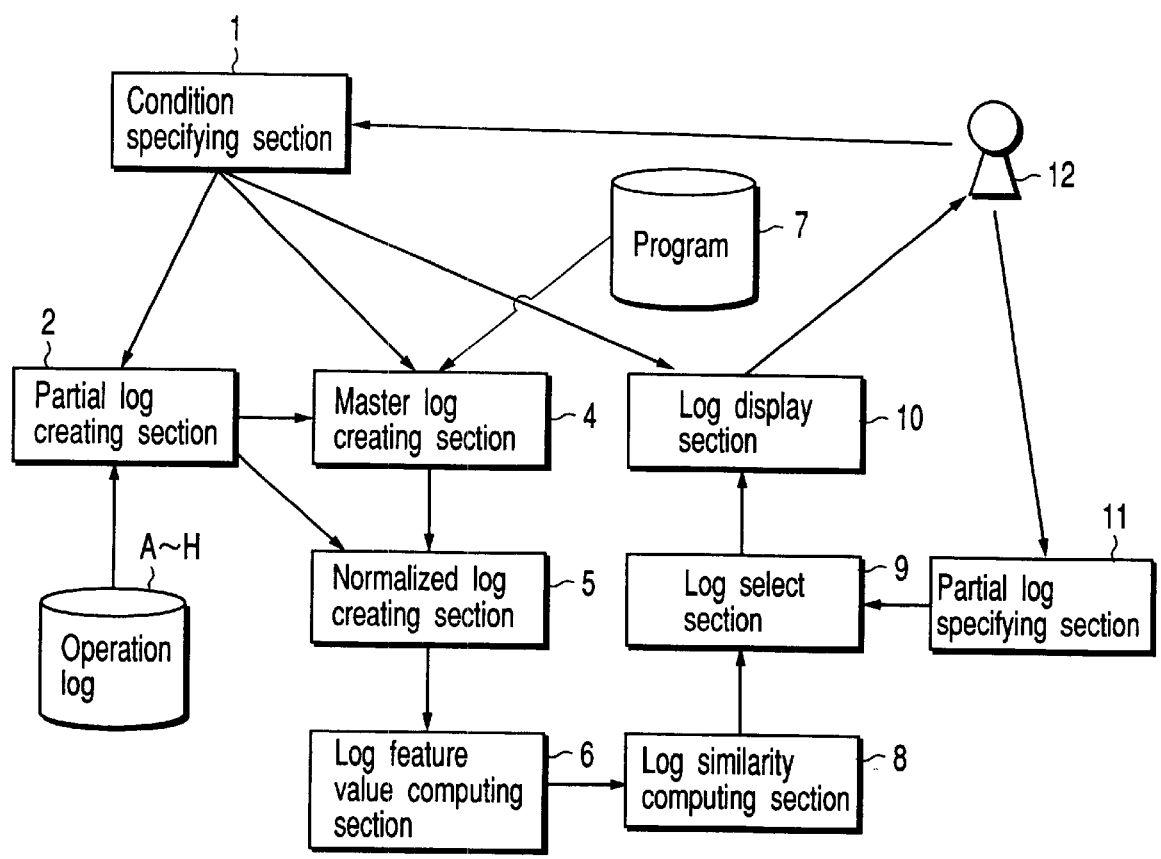
F I G. 4

```
#include<stdio.h>
#define MAX_STR_NUM 10
// declaration of functions
void PrintError();
void reverseString(char* string);
void makeValueString(int value,char* str);
// main functions
int main(int argc,char** argv){
   char string[MAX_STR_NUM];
   // convert the number of arguments into character strings
   in ternary representation (the order of characters is in reverse)
   makeValueString(argc,string);
   // reverse the order of characters
   reverseString(string);
   // display the result
   printf(" %d to %s\n",argc,string);
}
// definition of each function
void makeValueString(int value,char* str);
  {
   // recursion end condition for recursive function
   if(value<=0)
     {
       str[0]='\0';
       return;
     }
   makeValueString( value/3,str+1);
   switch(value%3)
     {
     case 0:
       str[0]='\0';    // mistaken for '0'
       break;
     case 1:
       str[0]='1';
       break;
     case 2:
       str[0]='2';
       break;
     default:
       break;
```

FIG. 5A

```
      }
    }
void PrintError()
  {
    printf("error\n");
  }
void reverseString(char* string)
  {
    char tmp_char
    int n;
    int i;
    n=strlen(string);
    if(n==0)
      {
        PrintError(); // error process
      }
    else
      {
        // reverse the order of the character strings
        for (i=0;i<(n/2);i++)
          {
            tmp_char=string[i];
            string[i]=string[n-1-i];
            string[n-1-i]=tmp_char;
          }
      }
  }
```

FIG. 5B

```
main(12,0x10000)
{
    makeValueString(12,0x20000)
    {
        if(value<=0)
        makeValueString(4,0x20001)
        {
            if(value<=0)
            makeValueString(1,0x20002)
            {
                if(value<=0)
                makeValueString(0,0x20003)
                {
                    if(value<=0)
                    {
                    }
                }
                switch(value%3)
                {
                    case 1:
                }
            }
            switch(value%3)
            {
                case 1:
            }
        }
        switch(value%3)
        {
            case 0:
        }
    }
    reverseString(0x20000)
    {
        n=strlen(0x20000);
        if(n==0)
        {
            PrintError()
            {
                printf(" error\n");
            }
        }
    }
    printf(" %d to %s\n",12,0x20000);
}
```

FIG. 6

```
main(13,0x10000)
{
    makeValueString(13,0x20000)
    {
        if(value<=0)
        makeValueString(4,0x20001)
        {
            if(value<=0)
            makeValueString(1,0x20002)
            {
                if(value<=0)
                makeValueString(0,0x20003)
                {
                    if(value<=0)
                    {
                    }
                }
                switch(value%3)
                {
                    case 1:
                }
            }
            switch(value%3)
            {
                case 1:
            }
        }
        switch(value%3)
        {
            case 1:
        }
    }
    reverseString(0x20000)
    {
        n=strlen(0x20000);
        if(n==0)
        else
        {
            for(i=0,i<(n/2);i++)
            {
            }
        }
    }
    printf(" %d to %s\n",13,0x20000);
}
```

FIG. 7

```
int main(int argc,char** argv)
{
    makeValueString(int value,char* str)
    {
        if(value<=0)
        {
        }
        makeValueString(int value,char* str)
        {
            if(value<=0)
            {
            }
            makeValueString(int value,char* str)
            {
                if(value<=0)
                {
                }
                makeValueString(int value,char* str)
                {
                    if(value<=0)
                    {
                    }
                    makeValueString(value/3,str+1);
                    switch(value%3)
                    {
                        case 0:
                        case 1:
                        case 2:
                    }
                }
                switch(value%3)
                {
                    case 0:
                    case 1:
                    case 2:
                }
            }
            switch(value%3)
            {
                case 0:
                case 1:
                case 2:
            }
        }
    }
```

FIG. 8A

```
        switch(value%3)
        {
            case 0:
            case 1:
            case 2:
        }
    }
    reverseString(char* string)
    {
        n=strlen(string);
        if(n==0)
        {
            PrintError()
            {
                printf(" error\n");
            }
        }
        else
        {
            for(i=0,i<(n/2);i++)
            {
            }
            for(i=0,i<(n/2);i++)
            {
            }
            for(i=0,i<(n/2);i++)
            {
            }
        }
    }
    printf(" %d to %s\n",argc,string);
}
```

FIG. 8B

```
1  main()
1  {
1      makeValueString()
1      {
1          if(value<=0)
0          {
0          }
1          makeValueString()
1          {
1              if(value<=0)
0              {
0              }
1              makeValueString()
1              {
1                  if(value<=0)
0                  {
0                  }
1                  makeValueString()
1                  {
1                      if(value<=0)
1                      {
1                      }
0                      makeValueString();
1                      switch(value%3)
1                      {
0                          case 0:
1                          case 1:
1                          case 2:
1                      }
1                  }
1                  switch(value%3)
1                  {
0                      case 0:
1                      case 1:
0                      case 2:
1                  }
1              }
1              switch(value%3)
1              {
1                  case 0:
0                  case 1:
0                  case 2:
1              }
```

FIG. 9A

```
1          }
1              switch(value%3)
1              {
1                  case 0:
0                  case 1:
0                  case 2:
1              }
1          }
1          reverseString()
1          {
1              n=strlen();
1              if(n==0)
1              {
1                  PrintError()
1                  {
1                      printf();
1                  }
1              }
0              else
0              {
0                  for(i=0,i<(n/2);i++)
0                  {
0                  }
0                  for(i=0,i<(n/2);i++)
0                  {
0                  }
0                  for(i=0,i<(n/2);i++)
0                  {
0                  }
0              }
0          }
1          printf();
1      }
```

| A | B | C | D | E | F | G | H |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 6 | 6 | -2 | -2 | -2 | -2 | -2 | -2 |
| 6 | 6 | -2 | -2 | -2 | -2 | -2 | -2 |
| -6 | -6 | -2 | -2 | -2 | -2 | -2 | -2 |
| -6 | -6 | 2 | 2 | 2 | 2 | 2 | 2 |
| -6 | -6 | 2 | 2 | 2 | 2 | 2 | 2 |
| -6 | -6 | 2 | 2 | 2 | 2 | 2 | 2 |
| -6 | -6 | 2 | 2 | 2 | 2 | 2 | 2 |
| -6 | -6 | 2 | 2 | 2 | 2 | 2 | 2 |
| -6 | -6 | 2 | 2 | 2 | 2 | 2 | 2 |
| -6 | -6 | 2 | 2 | 2 | 2 | 2 | 2 |
| -5 | -5 | 3 | 3 | 3 | 3 | 3 | -5 |
| -1 | -1 | -1 | -1 | -1 | -1 | -1 | 7 |
| -6 | -6 | 2 | 2 | 2 | 2 | 2 | 2 |
| 0 | 0 | 0 | 0 | 0 | 0 | 0 | 0 |
| 0 | 0 | 0 | 0 | 0 | 0 | 0 | 0 |
| 5 | 5 | -3 | -3 | -3 | -3 | 5 | -3 |
| -3 | -3 | -3 | 5 | 5 | 5 | -3 | -3 |
| -2 | -2 | -6 | -2 | -2 | -2 | -2 | -6 |
| 0 | 0 | 0 | 0 | 0 | 0 | 0 | 0 |
| 0 | 0 | 0 | 0 | 0 | 0 | 0 | 0 |
| -2 | 6 | -2 | -2 | -2 | 6 | -2 | -2 |
| 4 | -4 | 4 | -4 | 4 | -4 | 4 | -4 |
| -2 | -2 | -2 | 6 | -2 | -2 | -2 | 6 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| -2 | -2 | -2 | -2 | -2 | -2 | -2 | 6 |
| -2 | -2 | -2 | 6 | -2 | -2 | -2 | 6 |
| -2 | -2 | -2 | 6 | -2 | -2 | -2 | 6 |
| -2 | -2 | -2 | 6 | -2 | -2 | -2 | 6 |
| -2 | -2 | -2 | 6 | -2 | -2 | -2 | 6 |
| -2 | -2 | -2 | 6 | -2 | -2 | -2 | 6 |
| 2 | 2 | 2 | -6 | 2 | 2 | 2 | -6 |
| 2 | 2 | 2 | -6 | 2 | 2 | 2 | -6 |
| 2 | 2 | 2 | -6 | 2 | 2 | 2 | -6 |
| 3 | 3 | 3 | -5 | 3 | 3 | 3 | -5 |
| 3 | 3 | 3 | -5 | 3 | 3 | 3 | -5 |
| 2 | 2 | 2 | -6 | 2 | 2 | 2 | -6 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

|   | A | B | C | D | E | F | G | H |
|---|---|---|---|---|---|---|---|---|
| A |   | 494 | -130 | -346 | -90 | -138 | -26 | -306 |
| B |   |   | -178 | -330 | -138 | -58 | -74 | -290 |
| C |   |   |   | -58 | 70 | 22 | 70 | -18 |
| D |   |   |   |   | -82 | -66 | -146 | 470 |
| E |   |   |   |   |   | 126 | 110 | -170 |
| F |   |   |   |   |   |   | 62 | -154 |
| G |   |   |   |   |   |   |   | -170 |
| H |   |   |   |   |   |   |   |   |

| | SOURCE | DESTINATION | TYPE | FACTOR | RETURN VALUE |
|---|---|---|---|---|---|
| 1 | user-interface | game | start | player:3 | |

FIG. 16

| | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |

FIG. 17

| | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |
| 3 | game | user-interface | | | 0 |

FIG. 18

|   | SOURCE | DESTINATION | TYPE | FACTOR | RETURN VALUE |
|---|---|---|---|---|---|
| 1 | user-interface | game | start | player:3 | |

FIG. 19

|   | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |

FIG. 20

|   | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |
| 3 | game | dice | roll | num:2 | |

FIG. 21

| | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |
| 3 | game | dice | roll | num:2 | |
| 4 | dice | game | | | 8 |

FIG. 22

| | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |
| 3 | game | dice | roll | num:2 | |
| 4 | dice | game | | | 8 |
| 5 | game | user-interface | | | 0 |

| Target Object | Range | Status |
|---|---|---|
| user-interface | 2 | On |
| dice | 2 | On |
| | | |
| | | |
| | | |

FIG. 29

| SOURCE | DESTINATION | TYPE | FACTOR | RETURN VALUE |
|---|---|---|---|---|

```
user-interface, game, start, player:3, ;
user-interface, game, roll, who:0, ;
game, dice, roll, num:2, ;
dice, game, , , 8;
game, user-interface, , , 0;
```

DEBUGGING SUPPORT DEVICE AND DEBUGGING SUPPORT METHOD

BACKGROUND OF THE INVENTION

1. Field of the Invention

The present invention concerns improvements in debugging support devices and debugging support methods for supporting the debugging of object-oriented programs and particularly concerns a support device and method which are suited to the debugging of object-oriented programs for parallel processing systems.

2. Description of the Prior Art

Since a computer program is a complex set of data processing procedures, it is actually very difficult to completely prevent the occurrence of errors in a program in its development or modification, even if the developer takes the utmost care. Thus, the developer must test a tentatively completed program and eliminate the errors (bugs) in order to increase the reliability of the program.

A debugging support device, using a debugging support method is a device which supports debugging operations and such a device supports efficient debugging of a program through functions which, for example, (1) indicate the part of the program being executed, (2) display execution information concerning the program execution (e.g. contents of the register and memory, etc.), (3) break (stop) the execution of the program at places (breakpoints) designated by the user, and (4) record the debugging history such as the user's instructions and execution information, while the program to be debugged is being executed and stopped according to the operations by the user.

Conventionally, programs were designed using data processing procedures. Data was structured in accordance with the processing procedure, and as a separate entity from the processing procedures. Such programs designed using processing procedures are called procedural programs. In such procedural programs, the source code (the program expressed in a specific programming language), which is written one statement (unit of expression, such as a declaration or an instruction) at a time, directly expresses the data processing procedures in the computer during the execution of the program.

Thus, conventional debugging support devices supported debugging by showing the part of the program being executed, by setting breakpoints, by recording the debugging history, etc. while using the statement or the line (in the source codes) as the smallest unit to be debugged.

On the other hand, object-oriented programming has become popular in recent years as a new software development means. Throughout the specification, object-oriented programming refers to a means where the actual entity to be processed by the software is expressed as an "object". An object is a software entity where the elements that make up the structure of the object and the processing procedures which operate on those elements are respectively defined as data or attributes, and methods, processing procedures or functions. For example, one type of method is an "operation" method that operates on the data.

Programs written using object-oriented programming techniques are called object-oriented programs. In an object-oriented program, a plurality of objects, corresponding to actual entities, operate cooperatively, processing information. That occurs because of the relationships between actual entities can be easily realized on a computer. As a result, the information structure of actual entities is simulated in the software structure and software can be realized which has a clear structure and which is maintainable. Furthermore, since the contents of each module which comprises the program becomes easier to understand objectively, it becomes generally easier to make improvements in the encapsulation and reusability of each module.

Such object-oriented programming is performed with an object-oriented programming language such as Smalltalk or C++ and is generally designed using object-oriented design techniques in which programs are developed module by module.

Conceptually speaking, the program becomes a set of objects in such an object-oriented program. These objects are instantiated in the computer only during the execution of the program and the data of an object is assigned specific values only after being mapped to a memory block in the computer.

Thus, the development of a program is, for the sake of convenience, performed in the form of source code even in object-oriented programming. However, the source code in object-oriented programming is a set of class definitions which describe the characteristics of an object. Here, a "class definition" refers to a module of a program which describes the data of an object and the operations to be performed on such data. Since this class definition serves as a basis for instantiating objects, which are entities, a plurality of instances of an object may be instantiated from a single class definition. However, once objects are instantiated, they are, as a rule, separate and independent of each other and the data contents for each individual object is self-contained.

As described above, object-oriented programming is a means by which the series of methods necessary for the execution of a specific program and the data used in such a program are handled as a single unit called an object and by which a program is formed by using objects as the base execution unit.

In recent years, object-oriented programming has gained attention as a new technique that is particularly suited for programming in parallel processing system environments in which a plurality of processors perform multiple processing operations in an asynchronous manner.

In an object-oriented program, the methods and data that constitute each object cannot be freely accessed by other objects. Thus, in order to perform the operations of an object-oriented program, a structure is required by which the data necessary for the execution of the program is instantiated and then accessed using at least one method of the instantiated object.

To create such a structure, messages which invoke the methods of one object are sent by another object. That is, when a method or a part of a method is completed at one object, this object transmits a message indicating the execution thereof to another object in charge of a different part of a program or the next method. Contained in this message is information such as the name of the method to be invoked by the message-receiving object, the argument (parameter) to be passed to the method when making the method, etc.

Upon receiving a message correctly, the receiving object executes a method in accordance with the contents of the message and, when the process is ended without any problem, returns a prescribed return value as a reply message to the message-sending object as necessary. Each object can thus interoperate as expected by sending and receiving messages. On the other hand, if the program does not function as expected, the object which behaves abnormally can be found by examining and tracing the contents of messages sent and received by each object.

The debugging means in object-oriented programming are based on the concepts described above, and, in general, the operation of the entire program is investigated by examining a record (hereinafter referred to as an event history) of messages exchanged between objects during the execution of the program. As an example of where such a means is applied, there is a system in which the object to be debugged (hereinafter referred to as the debug target object) is specified and the recording object (hereinafter referred to as the debugger object) for recording the event history are set so that all messages sent and received by the debug target object are sent to and recorded by the debugger object.

However, problems arise when debugging specific objects and object-oriented application programs with conventional debugging means in parallel processing systems. With a conventional debugging means, a suitable object is selected and all messages sent and received by the object are recorded. In this case, numerous messages which are unrelated to the object or application program to be debugged are recorded in the debugger object. This arises as a result of said object being commonly possessed by a plurality of different objects and application programs.

In other words, a program generally contains relatively upper-ranking overall methods and relatively simple and specific lower-ranking methods which are components of the upper-ranking methods. In an object-oriented methods, the upper-ranking methods and lower-ranking methods are implemented as separate objects and the upper-ranking methods request services from lower-ranking methods by sending messages to the objects performing the lower-ranking methods. Objects which comprise a part of the function of another object by being called by the other object are called member objects with respect to the other object which does the calling.

When debugging is performed for a specific object, the information that is mainly needed is the messages sent and received between the central object and the peripheral objects. "Peripheral" objects refer to objects that have a close relationship with the central object and, to be more specific, include objects which are directly called by the central object as a member and grandchild or great-grandchild object which are indirectly called by such member objects. Thus, to be specific, in the debugging of an object-oriented program, the messages sent and received by a central object and its peripheral objects are recorded.

However, an object that is called as a member by the central object may also be subsequently called as a member of a different object. Furthermore, in a parallel processing system environment, the member of a central object may be called as member of an object of another application program. In such cases, even if the object that is to be the center and its peripheral objects are designated inside one program, the recorded messages will include messages sent and received between other objects outside the targeted range.

It thus becomes necessary to perform the extremely troublesome task of selecting from among a vast amount of message information recorded in the debugger object only those messages that relate to the object or application program targeted for debugging. Furthermore, previously effective means for selectively recording messages that relate only to the object or application program targeted for debugging have not been created.

SUMMARY OF THE PRESENT INVENTION

The present invention has been proposed to solve such problems of the conventional art as described above and the object thereof is to present a debugging support device and debugging support method which would make the debugging of object-oriented programs more efficient. Another object of the present invention is to present a debugging support device and debugging support method which can be implemented easily.

To be more specific, a first object of the present invention is to present a debugging support method by which the objects targeted for debugging can be identified as necessary.

A second object of the present invention is to present a debugging support method by which the debug target objects can be distinguished from other objects without increasing the scale of the device.

A third object of the present invention is to present a debugging support device equipped with specific means for realizing the above-mentioned second object.

A fourth object of the present invention is to present a debugging support device that designates the specific objects to be debugged.

A fifth object of the present invention is to present a debugging support device which records, in the debugger object, the history only of events sent and received by objects designated as an object to be debugged.

A sixth object of the present invention is to present a debugging support device which can express the priorities of the debugging operations for each object within the objects to be debugged in a relative manner by the use of numerical values within a prescribed range.

A seventh object of the present invention is to present a debugging support device for performing a debugging operation only on objects having a range of numerical values within said prescribed range.

An eighth object of the present invention is to present a debugging support device which, upon the sending of a message in each object within the debug target range, redesignates the above-mentioned priority of the debugging operation for the next object.

A ninth object of the present invention is to present a debugging support device which can express the position of the next object, which is to be the destination of the above-mentioned message, in a relative manner using the above-mentioned prescribed numerals which express the priorities of the debugging operation.

A tenth object of the present invention is to present a debugging support device which, when a message is received by an object which is to be debugged, records the priorities of the debugging operation concerning said object.

An eleventh object of the present invention is to present a debugging support device which sends the messages, sent and received by each object which is to be discussed, to a designated debugger object.

In order to accomplish the above objects, a first illustrative implementation of the present invention implements a debugging support device for supporting the debugging of an object-oriented program containing at least one object, each of said at least one objects having a sending means which sends messages between said at least one object, and a receiving means which receives said messages. The debugging support device comprises a designation means, which designates an object among said objects of said at least one object-oriented program to be a central object to be targeted for debugging; a detection means, which detects as relevant messages both direct messages and indirect messages that are relevant to said central object, wherein said direct messages are sent and received by said central object, and said indirect messages are messages sent and received as a result of said direct messages; and recording means for recording said relevant messages that are detected.

The debugging support method of the present invention enables the debugging of an object-oriented program containing at least one object, each of said at least one object performing a sending process by which messages are sent between at least one of said at least one object and a receiving process by which said messages are received, comprising the steps of: designating an object from among plural objects of an object-oriented program to be a central object to be targeted for debugging, detecting as relevant messages those direct messages and indirect messages relevant to said central object wherein said direct messages are messages sent and received by said central object and said indirect messages are messages sent and received as a result of said direct messages; and recording said relevant messages that are detected.

Using the present invention the relevant messages, including direct messages, are detected and recorded. In general, an object that is called as a member by the central object at some point may behave as a member of a different object at a different point in time. Since the relevant messages to be recorded are sent or received as a result of a direct message, such messages are useful in the analysis of the actions performed for the central object by a called object. On the other hand, when this called object behaves as a member of another object, it is unrelated to the central object. The message in such a case is not included among the relevant messages and is not recorded. Since only the messages related to the central message are thus recorded, the trouble of finding the records of the necessary messages is eliminated and debugging is made efficient.

In a second illustrative implementation of the present invention, the previous embodiment is further refined so that said detection means comprises: a member designation means, which designates said objects that have received said relevant message to be a member of said central object, a cancellation means, which cancels said designation of said object as a member when said object has completed the process requested by the received relevant message, and a judging means, which judges that the message sent by said object designated as a members to be one of the said relevant messages.

A method that performs the functions of the above embodiment uses a detecting step that comprises: a member designation process by which the objects that have received said relevant message are designated as a member of said central object, a cancellation process by which, when said object has completed the process requested by the received relevant message, said designation of said object as a member is canceled and a judging process by which it is judged that the message sent by said object designated as a member is one of the said relevant messages.

In the second illustrative implementation and its method which has received a relevant message is designated as a member until the process requested by said relevant message has been completed. The messages sent by said object while said object is designated as a member are also regarded as relevant messages. The same process is also performed on objects receiving relevant messages from members.

The designation as a member may be realized, for example, by securing a flag block corresponding to each instance and raising this flag while an object is designated as a member. This implementation and its method eliminate the need to trace the transmission path of the message to confirm the relationship of each message with the central object in order to judge whether or not the message is a relevant message, even when the range of relevant messages resulting from a direct message expands. Instead, by repeating the above-mentioned simple process, the range of relevant messages may be specified easily and infallibly.

The third illustrative implementation is a debugging support device as described in the first illustrative implementation, wherein said recording metgod comprises: a debugger object for recording said messages, and a second sending means, which sends said relevant messages to said debugger object.

The debugging support method of the first illustrative implementation implements said recording process using: a debugger object for recording said message and a second sending process by which said relevant message are sent to said debugger object.

The method may be further implemented to record the message in an object. Thus these inventions are excellent in compatibility with the processing system of an object-oriented program itself and may be implemented easily.

The third illustrative implementation and its method may be augmented to form a fourth illustrative implementation by including a destination designation means which designates said debugger object.

With the fourth illustrative implementation and its method, since the debugger object can be designated freely, different debugger objects may be used according to each target object or be used sequentially each time a test is performed in order to organize the information and make the debugging operation efficient.

The fifth illustrative implementation augmanets the first illustrative implementation by including: a counting means, which counts the distance of each of said relevant messages from said central object based on the number of said messages or said objects passed through to get from said central object to said relevant message, and a restricting means, which restricts said relevant messages to be recorded based on said distance counted.

The debugging support method of the fifth illustrative implementation further includes a counting process by which the distance of each of said relevant messages from said central object is counted based on the number of said messages or said objects passed through to get from said central object to said relevant message and a restricting process by which said relevant messages to be recorded is restricted based on said distance counted.

In the execution of an object-oriented program, messages are sequentially transferred from an object to the next object. Debugging is made efficient by the fifth illustrative implementation and its method since the relevant messages to be recorded are limited to those which are not far in distance from the central object. For example, if the recording target is limited to messages of objects that are away from the central object by a distance of 2, the messages by which the central object directly calls a member object and the messages by which the called member calls a grandchild object are recorded.

The sixth illustrative implementation augments the fifth illustrative implementation by further comprising a range designation means which designates the range of said messages to be recorded by designating said distance, involved with said restriction, from said central object. The debugging support method of the sixth illustrative implementation utilizes a range designation process by which the range of said messages to be recorded is designated by designating said distance, involved with said restriction, from said central object.

With the sixth illustrative implementation and its method, since the range of messages to be recorded can be designated by the distance from the central object, the range of recorded messages can be changed in a maneuverable manner according to the debug target and the debugging can thus be made efficient. For example, if the relevant messages to be recorded are designated to be those for which the distance from the central object is short, the messages recorded can be restricted to those having an especially close relationship with the central object. Oppositely, if messages for which the distance from the central object is far are recorded, operations may be tracked over a wide range.

The seventh illustrative implementation augments the fifth illustrative implementation by further including an output means, which outputs each of said messages recorded and each of said objects involved in the sending and receiving of said messages by depicting said messages and said objects in a manner whereby they are centered about said central object and are positioned further outwards the greater the said distance from said central object.

The debugging support method of the seventh illustrative implementation utilizes an output process by which each of said messages recorded and each of said objects involved in the sending and receiving of said messages are output by depicting said messages and said objects in a manner whereby they are centered about said central object and are positioned further outwards the greater the said distance from said central object.

With the seventh illustrative implementation and its method, each of said recorded messages and the objects involved in the sending and receiving of each message are output in a manner whereby they are centered around said central object and positioned further outwards as the distance from the central object increases. The distance relationships of each object and message with respect to the central object can thus be grasped easily in a single view to thus make the debugging efficient.

The eight illustrative implementation is a debugging support device for supporting the debugging of an object-oriented program containing one or more objects, each of said objects having a sending means which sends messages between said objects, and a receiving means which receives said messages, being characterized by comprising; a designation means, which designates a desired object among said objects of said object-oriented program to be the central object to be targeted for said debugging, and a debugger object, which records said messages, and each of said objects comprising; a retaining part, which retains an index that indicates the distance of said message from said central object, an initializing means, which sets a prescribed index as said index at said retaining part of said central object, a deleting part, which, when the process requested by said message corresponding to said index retained has been completed, deletes the corresponding index, a second sending means which, when said message with said index is received or sent, sends the corresponding message to said debugger object, an adjusting part which adjusts said index in a fixed direction, an attaching means which attaches said adjusted index to the message sent to other said objects, and a restricting means which detects that said index has reached a prescribed limit value and stops said attachment of said adjusted index to said message.

The debugging support method of the eigth illustrative implementation supports the debugging of an object-oriented program containing one or more objects, each of said objects performing a sending process by which messages are sent between said objects and a receiving process by which said messages are received, by using a designation process by which a desired object is designated from among said objects of said object-oriented program to be the central object to be targeted for said debugging, using a debugger object for recording said messages, and each of said objects performing; a retaining process by which an index indicating the distance of said message from said central object is retained, an initializing process by which the retaining process of said central object is controlled so that a prescribed index is retained as said index, a deleting process by which, when a process requested by said message corresponding to said retained index has been completed, the corresponding index is deleted, a second sending process by which, when said message with said index is received or sent, the corresponding message is sent to said debugger object, an adjusting process by which said index is adjusted in a fixed direction, an attaching process by which said adjusted index is attached to the message sent to other said objects, and a restricting process by which said attachment of said adjusted index to said message is stopped upon detecting that said index has reached a prescribed limit value.

With the eight illustrative implementation and its method, when an index for distance is set for the central object, an index for distance is attached to the message sent from the central object. At the object receiving the message, the received index is adjusted in a fixed direction and attached to a message and sent to another subsequent object. The message index is thus adjusted as the sending of messages is repeated and the distance from the central object increases. When the index reaches a prescribed limit, the index is no longer attached to messages sent to further objects. Since only the messages with the index is sent from each object to the debugger object and recorded, the recorded messages are restricted to those for which the distance from the central object is within a certain range.

With the eighth illustrative implementation and its method, the composition is made easy since whether or not a message is recorded is determined autonomously by the organic interaction of each object.

The ninth illustrative implementation augments the eigth illustrative implementation by including: a destination designation means, which designates said debugger object, and a transmission means, which sequentially transmits an identifier, that indicates said designated debugger object, along with said index between each of said objects.

The debugging support method of the ninth illustrative implementation includes: a designation process by which said debugger object is designated and a transmission process by which an identifier indicating said designated debugger object is transmitted sequentially along with said index between each of said objects.

With the ninth illustrative implementation and its method, the composition is made easy since an identifier, that describes the destination of a message, is transmitted sequentially along with the index to enable the destination of a message to be judged easily just from within each object.

A first enhanced debugging method according to the present invention restricts a specified part in an object-oriented program targeted for debugging as a debug target zone and recording messages sent and received by objects contained within said restricted debug target zone.

The second enhanced debugging method augments the first enhanced debugging method by selecting an object arbitrarily from among objects comprising said object-oriented program to be a debug target and, when another object relevant to the actions of said selected object is to be included within said debug target area, a numeral within a prescribed range is attached to said another object.

The tenth illustrative implementation is a debugging support device equipped with a debugger object, which is an object that records messages sent and received by objects within an object-oriented program, said debugging support device being further equipped with: a first designation means, which designates an object, that is arbitrarily selected from among objects comprising said object-oriented program, to be a debug target object, a second designation means, which designates other objects, relevant to said object designated as the debug target object, as being in the debug target range along with said object, a collection means, which records messages, sent and received by each object included in the debug target range, according to each object, a cancellation means, which when the collection of messages have been completed, removes and cancels the targeting of the objects included in the debug target range for debugging, a storage means, which stores the contents designated by said second designation means, a first sending means, which sends messages from objects included within the debug target range, a receiving means, which receives messages sent to objects included with the debug target range, and a second sending means, which sends the contents of messages, received and sent by said receiving means and first sending means, to said debugger object.

The eleventh illustrative implementation augments the tenth illustrative implementation by equipping designation means with a range designation means which designates said debug target range by a numeral within a prescribed range.

The twelfth illustrative implementation augments the tenth illustrative implementation by equipping designation means with a destination designation means which designates, by the use of an unique identifier, said debugger object, which is to be the recording destination of messages sent and received by objects within said debug target range.

The thirteenth illustrative implementation augments the eleventh illustrative implementation so that the distances from said debug target object to each of the objects within said debug target range are designated by depth levels by which said distances are classified in a relative manner with the use of integers within a prescribed range.

The fourteenth illustrative implementation augments the thirteenth illustrative implementation so that said depth level takes on a prescribed limit value when said depth level is to indicate the furthest distance, within said debug target range, from said debug target object.

The fifteenth illustrative implementation augments the fourteenth illustrative implementation so that, when said identifier and said depth level within a prescribed range are registered within the storage means, said identifier and a new depth level, obtained by modifying said depth level, are attached to the contents of the message to be sent.

The sixteenth illustrative implementation augments the fifteenth illustrative implementation so that said new depth level is set to a value closer than the depth level before modification to the prescribed limit value, which is the depth level that indicates the furthest distance, within said debug target range, from said debug target object, by one step.

The seventeenth illustrative implementation augments the twelfth illustrative implementation so that, when said identifier and said depth level within a prescribed range are attached to the received message, said depth identifier and said depth level are removed form said message.

The eighteenth illustrative implementation augments the twelfth illustrative implementation so that, when said identifier and said said depth level within a prescribed range are registered in said storage means, the messages sent and received by objects within the debug target range are sent to the debugger object specified by said identifier.

The first and second enhanced debugging methods and the tenth through eighteenth illustrative implementations provide the following actions. That is, when debugging support is to be performed for an object-oriented program in a parallel processing system environment by using the debugging support method and device of the present invention, an arbitrary object comprising said program is designated as a debug target object before the execution of said program. Said program to be debugged is thus specified. Thereafter, said program is executed and the messages, exchanged between said debug target object and other objects (hereinafter referred to as relevant objects) relevant to the actions of said debug target object, are recorded in a debugger object specified by an unique identifier.

Here, if the debug target object belongs in common to a plurality of programs, the number of said relevant objects will increase. A vast amount of messages will thus be exchanged between said debug target object and said relevant objects. Moreover, since such relevant objects will include numerous objects which are not relevant to the program which was initially targeted for debugging, numerous event histories which are not necessary for the debugging operation will be recorded in the debugger object.

In the first enhanced debugging method, messages, which are relevant to the actions of the debug target object but are not relevant to the immediate debugging support work, are excluded to solve the problem described above. That is, a prescribed part of the program targeted for debugging is restricted as the debug target range and only the information sent to and received by objects within this debug target range are recorded in the debugger object. By doing so, one can concentrate on the actions of specific objects relevant to a specific program.

By the second enhanced debugging method, objects included in said debug target range are distinguished from objects outside said range. That is, if an object within the debugged program is to be included in the debug target range, a numerical value within a prescribed range is attached to this object.

The tenth illustrative implementation can implement the second enhanced debugging method. The following actions are provided by the various above-mentioned means.

[Before Program Execution]

A first designation means designates an object, that is arbitrarily selected from within the debugged program, as a debug target object. Next, a second designation means designates other objects relevant to the actions of said debug target object as being in the debug target range. To be more specific, in the eleventh illustrative implementation, a range designation means designates the debug target range with respect to said debug target object. Furthermore, in the twelfth illustrative implementation, a destination designation means designates the debugger object to which a message sent or received by an object designated to be in the debug target range should be sent. That is, when a plurality of debugger objects are activated, an unique identifier assigned to each debugger object is provided to said debug target object.

The debug target range designated by said range designation means is expressed in a relative manner by a numerical value within a prescribed range. In the thirteenth illustrative implementation, depth levels are used as this numerical value within a prescribed range. The depth levels are prescribed integer values which classify and express, in a relative manner, the distances from said debug target object to each of the objects within said debug target range.

An object-oriented program is executed by messages being handed sequentially from one object to the next object. When said debug target object is set as the starting point, said depth level designates how far an object may be from said debug target object, which serves as the starting point, to be set within said debug target range based on the process by which messages are handed sequentially to far objects.

In the fourteenth illustrative implementation, the depth level, that indicates the furthest debug target range from said starting-point debug target object, takes on a prescribed limit value. An object which is given this limit value is regarded to be of lowest priority as a debug target and depth levels are not given to objects that are positioned further away from this object and are outside the debug target range. This eliminates the need to be concerned with actions of objects that are unrelated to the current debugging operation.

When the specific designations necessary for the debugging operation are completed by the second designation means for said debug target object and for the objects within the debug target range as described above, the storage means registers said identifiers and depth levels. The debugging operation is controlled during the execution of the program according to the contents of these designations registered in the storage means. These actions shall now be described.

[During Program Execution]

During the execution of the program, the sending and receiving of various messages take place between objects. In the invention of claim 8, a message sending process is performed by said debug target object or each of the objects within the debug target range. That is, a first sending means first checks whether an identifier and a depth level are registered in said storage means. If both of these are registered in the storage means, it is then checked whether the registered depth level is the said limit value that indicates the furthest part of the debug target range and it is thereby judged whether the next object, which is to be the destination of the message, is within the debug target range.

If said depth level is the limit value, the next object which is to be the destination of a message is considered to be outside the debug target range. In this case, said message is sent as it is to the next object. On the other hand, if said depth level is not the limit value, the next object which is to be the destination of a message is considered to be still within the debug target range. In this case, a message, to which are attached the identifier registered in said storage means and a new depth level, obtained by modifying said depth level according to a prescribed procedure, is sent to the next object.

In the sixteenth illustrative implementation, each time a message is sent to the next object, the depth level to be attached to the message is modified to be closer to the limit value. The new depth level to be attached to said message is set to a value that is closer to said limit value than the depth level prior to modification by just one step. This means that the closer a depth level is to the limit value, the further away from the debug target object is the next object that is to be the destination of the message. The depth level value is modified in this manner to express the sequential lowering of priority of said next object as a debug target.

In the seventeenth illustrative implementation, a message receiving process is performed by said debug target object or each of the objects within the debug target range. That is, a receiving means checks whether the identifier and the modified depth level, which were attached by said first sending means, exist in the received message. If these do exist, these are removed from said message and the message is received. Furthermore, if there are no registered contents within the referenced storage means at this time, the identifier and the depth level removed from said message are stored in said storage means. These registered contents are used when a message is subsequently sent by the above-mentioned first sending means.

The identifier and the depth level registered in the storage means are also used in the debugging support process to control the recording of the event history. That is, in the eighteenth illustrative implementation, if and only if the identifier and the depth level are registered in the referenced storage means, a second sending means sends the event history to the debugger object specified by the registered identifier. Thus this enables only the messages sent and received by the designated debug target object and the objects within the designated debug target range to be sent to the designated debugger object. Meanwhile, a collection means records the sent messages according to object and in the order of time at the debugger object receiving the event history.

When the above series of processes are completed, a cancellation means deletes the identifier and the depth level registered in the storage means. The designation of the debug target range is thereby canceled automatically and a new debug target range can be designated in preparation for the next debugging support work.

Other and further objects, functions, and advantages of the present invention will be more fully understood by the following detailed description.

BRIEF DESCRIPTION OF THE DRAWINGS

FIG. 7 is an explanatory diagram of the contents registered in the storage means for the debug target object, "user-interface" 21, in the second preferred embodiment of the present invention;

FIG. 8 is an explanatory diagram of the contents registered in the storage means for the object, "game" 22, in the second preferred embodiment of the present invention;

FIG. 9 is an explanatory diagram of the coded contents executed by the debug target object, "user-interface" 21, in the second preferred embodiment of the present invention;

FIG. 10 is an explanatory diagram of the coded contents executed by the object, "game" 22, in the second preferred embodiment of the present invention;

FIG. 11 is an explanatory diagram of the coded contents executed by the object, "dice" 23, in the second preferred embodiment of the present invention;

FIG. 15 is an explanatory diagram of the contents of the event history concerning debug target object, "user-interface" 21, when the message, [game start player: 3], is sent in the second preferred embodiment of the present invention;

FIG. 16 is an explanatory diagram of the contents of the event history concerning debug target object, "user-interface" 21, when the message, [game roll who: 0], is sent in the second preferred embodiment of the present invention;

FIG. 17 is an explanatory diagram of the contents of the event history concerning debug target object, "user-interface" 21, when a return value of [0] is received from object, "game" 22, in the second preferred embodiment of the present invention;

FIG. 18 is an explanatory diagram of the contents of the event history concerning object, "game" 22, when the message, [game start player: 3], is received in the second preferred embodiment of the present invention;

FIG. 19 is an explanatory diagram of the contents of the event history concerning object, "game" 22, when the message, [game roll who: 0], is received in the second preferred embodiment of the present invention;

FIG. 20 is an explanatory diagram of the contents of the event history concerning object, "game" 22, when the message, [dice roll num: 2] is sent in the second preferred embodiment of the present invention;

FIG. 21 is an explanatory diagram of the contents of the event history concerning object, "game" 22, when a return value of [8] is received from object, "dice" 23, in the second preferred embodiment of the present invention; FIG. 22 is an explanatory diagram of the contents of the event history concerning object, "game" 22, when a return value of [0] is sent to "user-interface" 21 in the second preferred embodiment of the present invention;

FIG. 29 shows an example of the data format of the second preferred embodiment of the present invention for the recording of messages;

Explanation of the Symbols

Figure 1:
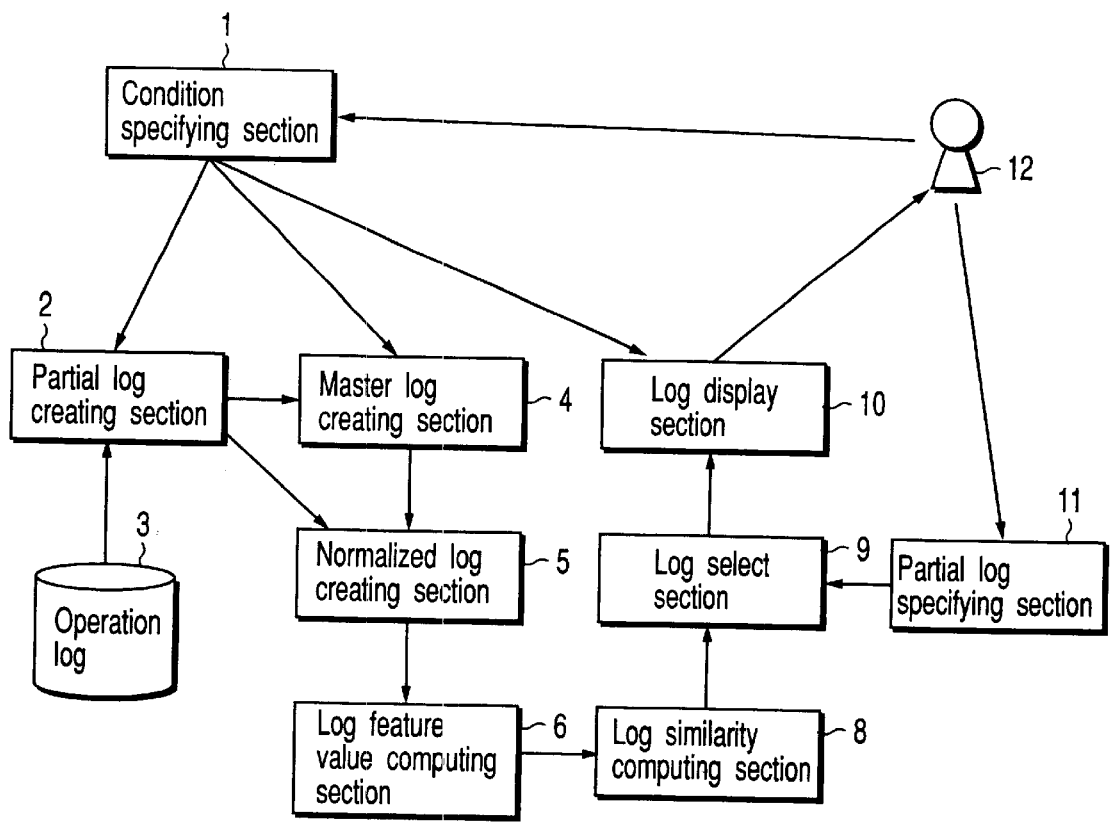
FIG. 1 is a functional block diagram of the composition of the first preferred embodiment of the present invention.

A1—central designation means
A2—destination designation means
A3—initializing part
A4—range designation means
A5—output means
XD—debugger object
X, X1, X2, X3—objects
B1—sending means
B2—receiving means
B3—execution means
B4—retaining part
B5—deleting part
B6—second sending means
B7—adjusting part
B8—attaching part
B9—restricting means
25—debugger object
100—object
101—second designation means
102—collection means
103—cancellation means
104—destination designation means
105—range designation means
106—receiving means
107—storage means
108—first sending means
109—second sending means
110—first designation means

DETAILED DESCRIPTION OF THE PREFERRED EMBODIMENTS

Preferred embodiments of the present invention (hereinafter referred to simply as "embodiments") shall now be described in detail with reference to the drawings. The functions of the embodiments are realized by the controlling of the computer and peripheral equipment by a prescribed software. That is, in the present specification, the invention and the embodiments are described by assuming virtual circuit blocks (e.g. " . . . means," " . . . part," etc.) that correspond to each of the functions and processes. Thus, each block is not in a one-to-one relationship with each hardware or software element.

Besides containing the main storage device comprised of a CPU and RAM, the computer for realizing the embodiments typically comprises input devices, such as a keyboard, mouse, etc., external storage devices, such as a hard disk device, etc., output devices, such as a CRT display device, printer, etc., and the necessary input/output control circuits. The scale, number, and type of computers and CPU's are not restricted in particular and computer networks, distributed processing, multitasking, etc. may be implemented freely. Furthermore, other input devices, such as a tracker ball, image scanner, etc., other storage devices, such as a floppy disk device, magneto-optical disk device, flash memory, etc., and other output devices, such as a liquid crystal device, etc., may also be used.

The form of software for realizing the embodiments may typically be an OS application software or machine language software compiled from a high-level language or assembly language. However, as long as the present invention may be implemented, the software may be freely modified and, for example, may be executed with an interpreter that does not use an OS. The storage form of the software is also not restricted and, for example, the software may be stored in a ROM and be read all at once or one part at a time from an external device. The form of storage may also differ according to the different parts of the software. Furthermore, each step of the process may be freely modified in sequence or processed in parallel as long as its characteristics are not violated.

In the present specification, the term "input" includes not only inputs from the exterior but also inputs from a file, etc. and not only inputs in the original meaning of the word but also echo backs, modifications, editing, etc. Similarly, the term "output" includes not only outputs to the exterior but also outputs to a file, etc. and not only outputs in the original meaning of the word but also designation of the output range, etc. The user interface mode is not restricted and may be an interactive mode, a menu mode, a graphical user interface, a multi-window, etc. The input and output may also be realized through integrated operations using interactive input/output procedures. The processes, such as selection, designation, specification, etc. may be performed through such integrated operations.

The form of data expression and the form of data storage means in the present specification are not restricted and, for example, the storage location of the data may be internal or external. The data may also be stored in a file form. The data needs only to be retained only while it is needed and may be deleted thereafter. Information that are not modified for the time being, such as dictionary data, may be stored in a ROM.

Furthermore, general information required for operation and the storage areas therefor, such as various pointers, stacks, counters, flags, parameters, work areas, buffers, etc., are used where appropriate even though these may not be specified in the present specification.

Unless otherwise indicated, the information required for the processing by each part of the embodiments are acquired by accessing, from other parts storing the corresponding information, the variable or memory that stores the corresponding information. The embodiments may also be realized along with or as part of another software and parts of the functions may be replaced by electronic circuits.

1. First Embodiment

A debugging support device and its corresponding support method.

That is, the first embodiment is a debugging support device (debugging support method) which supports the debugging of an object-oriented program with one or more objects.

An object of the first embodiment is to present a debugging support device and debugging support method which make the debugging of object-oriented programs more efficient. Another object of the first embodiment is to present a debugging support device and debugging support method which can be composed easily.

1-1. Composition

FIG. 1 is a functional block diagram of the composition of the first embodiment. The debugging support device of the first embodiment has parts which are provided outside the object-oriented program objects (hereinafter referred to simply as "objects"), which are the debug targets, and parts which are provided within each object.

Here, the outside of the objects refer, for example, to the processing system side, such as the object manager, and to dedicated objects which are separate and independent of the program targeted for debugging. A certain composition may be realized in each object by describing the functions corresponding to the class of each object or it may be realized in the following manner. That is, the operation in which an object calls another object as a member may be described in terms of the class, which is the source code, simply by the calling of the function describing the called object. This description is then replaced by a library function, execution module (run time routine), system call, etc., which realizes the sending and receiving of messages between objects, according to the composition of the system during compilation and linking.

The procedures which realize each of the components in the object may thus be incorporated in the form of a program into these library functions, execution modules (run time routines), system calls, etc. which realize the sending and receiving of messages.

The first embodiment has a central designation means A1 which designates a desired object X to be the central object X1 that is targeted for debugging. The first embodiment also has a debugger object XD for storing messages and a destination designation means A2 which designates said debugger object.

Figure 2:
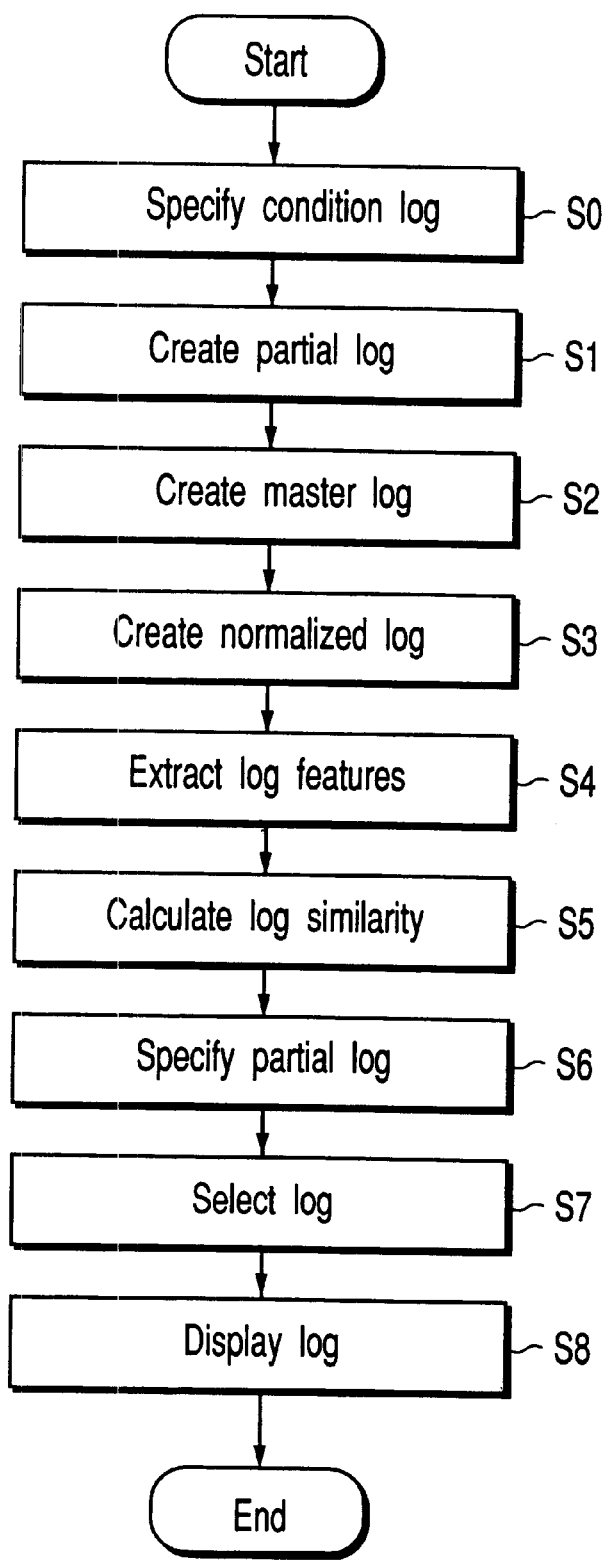
FIG. 2 is a functional block diagram of the composition of each object in the first preferred embodiment of the present invention.

FIG. 2 is a functional block diagram of the composition of each object X. As in the conventional case, each object X has a sending means B1 for sending messages between objects X, a receiving means B2 for receiving messages, and an execution means B3 for executing processes based on the received message.

Furthermore, each object X has a retaining part B4 for retaining the index, which describes the distance from said central object X1 for a message, and a deleting part B5 for deleting said index when the process, requested by the message corresponding to the retained index, has been completed. In correspondence with this retaining part B4, an initializing part A3, for setting the prescribed index in the retaining part B4 of central object X1, is provided outside the objects (FIG. 1).

Each object X (FIG. 2) also has a second sending means B6, which sends a corresponding message to the debugger object XD when a message with said index is received or sent, an adjusting part B7, which adjusts the index in a fixed direction, and an attaching part B8, which attaches the adjusted index to a message sent to another object.

Each object X also has a restricting means B9 which detects that the index has reached a certain limit value and stops the attachment of the adjusted index onto a message. In correspondence, a range designation means A4, which designates the distance from said central object, which is related to said restriction, to designate the range of messages to be recorded, is provided outside the objects (FIG. 1).

The first embodiment (FIG. 1) also has an output means for outputting the recorded messages.

1-2. Actions and Effects

The actions of the first embodiment with the above composition are as follows.

[Outline of Actions]

With the first embodiment, when a prescribed index is set to central object X1, a distance index is attached to a message sent from the designated central object X1. At an object X, which received the message, the received index is adjusted in a fixed direction and is then attached to the message that is sent further to the next object X. Thus, the message index is adjusted as the sending of messages is repeated and as the distance from central object X1 increases. When the index reaches a prescribed limit value, the index will no longer be attached to a message to a further object X and only the messages with the index are sent from each object X to debugger object XD and recorded. As a result, the recorded messages are restricted to those for a certain distance from central object X1. The actions of the first embodiment shall now be described in more detail.

[Central Designation Process]

To debug an object-oriented program, the central designation means A1 is used to designate a desired object X of the object-oriented program as the central object X1 targeted for debugging. In general, an object-oriented program is described by classes, which are the units that generally describe the operation content of each object, and the source code is a set of classes. Upon execution of the program, one or a plurality of objects are generated by each class. Since a plurality of the same objects may be generated from a single class, each of such objects is called an instance.

The designation of central object X1 may be based on the class or on the actually generated instance. For example, for classes that are known to generate only a single object (instance), the single instance may be designated as central object X1 simply by designating the corresponding class. For classes that generate a plurality of instances, central object X1 may be designated according to the order of generation, for example, by designating the first instance generated. Furthermore, if all instances generated by a certain class are to be sequentially targeted for debugging as central object X1, the class may be designated unconditionally.

If central object X1 is to be designated based on actually generated instances, the program, for example, may be executed to a certain point and then stopped to designate central object X1 from among the instances generated at that point and the execution of the program can then be restarted thereafter. Such stoppage of a program may be realized, for example, by inserting an interrupt instruction at a desired position in the source code, by incorporating an interrupt instruction in the load module during compilation/linking, by activating a hardware interrupt during execution and transferring the control to the system software, or by simulating the execution of the program with an interpreter.

[Initializing Process]

When central object X1 has been designated, the initializing part A3 sets a prescribed distance index to the retaining part B4 of central object X1. Although an integer will be used as the distance index here, the form of expression of the distance index is not restricted and may be a desired form such as a real number, a character, or a character string.

[Destination Designation Process]

Messages are sent to and recorded by a debugger object XD, which is a dedicated object. The user may freely designate the debugger object by means of destination designation means A2. This designation may be performed by inputting the name of the debugger object with a keyboard or by selecting from among various debugger objects, that are generated in advance and displayed on a display screen, using a pointing device, such as a mouse.

With the first embodiment, different debugger objects may be used according to each central object and different debugger objects may be used sequentially for each test to organize the information to thereby make the debugging operation efficient.

[Range Designation Process]

The user may also designate the index to be set to central object X1 with range designation means A4 to designate within how far from central object 1 a received message should be to be recorded.

The designated debugger object XD is labeled with a debugger identifier, which indicates its ID and name and is set along with the index to retaining part B4 of central object X1. Here, the index shall be decremented as the distance from central object X1 increases and thus in this case, the range of messages recorded is expanded when a larger number is designated as the index.

[Index Retaining Process]

In each object X, the index, which indicates the distance from the central object, and the identifier for a message are retained by a retaining part B4. That is, at the point at which the execution of the program is started, the retaining part B4 of central object X1 retains the designated index and identifier. Then the index and identifier is first attached to the direct message from central object X1 and sent to another object.

At the object receiving the message, the retaining part B4 stores the index and identifier if an index and identifier is attached to the message received. This process signifies the member designation process by which objects receiving relevant messages are designated as members of the above-mentioned central object. Also, if an index and identifier are stored in an object, this means that the object is designated as a member of the central object.

[Index Deleting Process]

At each object X storing the index, the deletion part B5 deletes the corresponding index when the process requested by the message corresponding to the retained index has been completed. This process signifies the cancellation process by which said designation of an object as a member is canceled when the object has completed the process requested by the relevant message received.

The completion of such a requested process may be detected in accordance with the system composition, for example, by the returning of a reply message or control from a called object to the calling object, by the execution of an annihilator, etc.

[Message Sending Process]

At an object X, which has received a message with the index, the second sending means B6 sends the message to debugger object XD. The message with the index may also be sent to debugger object XD from the sending object upon sending of the message.

Generally, for example, the timing of object X1 sends the message to object X2 and the timing of object X2 receives the message from object X1 are mostly different. Therefore, it is desirable to record events "object X1 sent the message to object X2" and "object X2 received the message from object X1" for each object X1 and X2 separately.

Also, with regards to messages for which a reply message (return value) exists, the reply message is also sent to debugger object XD upon its arrival.

The restriction of the messages to be sent to those with an index signifies the judgment process by which messages sent by an object X, which has been designated as a member as described above, and reply messages received in correspondence with such sent messages are judged whether they are the above-mentioned relevant messages.

The debugger object XD, which is to be the destination, is determined by the identifier and the message is sent to debugger object XD along with type information such as the source object, destination object, index, etc. The message and type information are stored at the receiving debugger object XD.

[Restricting Process and Index Attaching Process]

When the sending means B1 of an object X, which stores an index, is to send a message to another object X, it is judged by restricting means B9 whether or not the index has reached the prescribed limit value. If it is detected that the index has reached the prescribed limit value, the message is sent without an index and identifier attached thereto since said another object X, which is to be the destination, is adequately far from central object X. In this case, this next object X that receives this message will not send the received message to debugger object XD.

If the index has not yet reached the limit value, adjusting part B7 adjusts the index stored in retaining part B4 in a fixed direction and attaches the index to the message. Sending means B1 then sends this message to the next object X. At this time, the index is attached to the message with the debugger identifier and transferred to the next object X.

If, for example, it is assumed that an integer value of 3 is initially set as the index at central object X1 and that the limit value is 0, the index is adjusted to 2 at central object X1 and sent with the message to object X2 (FIG. 1). When a message is sent from object X2 to object X3, since the retained index becomes 1 upon adjustment and is not yet 0, 1 is attached to the message as an index.

The index of a message is thus adjusted as the sending of messages is repeated and as the distance from central object X1 increases. When the index reaches the prescribed limit value, the index is no longer attached to a message to a further object X. And as a result of only the messages with index being sent from each object X to debugger object XD and recorded thereat, the recorded messages are restricted to those for which the distance from central object X1 is within a certain range.

That is, in the above assumed case, when a message is to be sent further from object X3 to another object X, the retained index of 1 reaches the limit value of 0 when adjusted and thus the index is not attached to the message. As a result, the messages recorded in the above assumed case are only that which was sent from central object X1 to object X2 and that which was sent from object X2 to X3. The process by which the index is transferred across objects while being sequentially adjusted signifies the counting process by which the distance from the central object is counted for each relevant message based on the number of messages or objects passed through to get from the central object to the relevant message.

The process by which only messages to which the index has been attached are recorded signifies the restriction process by which the above-mentioned relevant messages are restricted based on the above-mentioned counted distance.

Thus, with the first embodiment, the debugging is made efficient by the recorded relevant messages being restricted to those for which the distance from the central object is not far. For example, if the recording target is restricted by the combination of the index and limit value to messages for which the distance from the central object is 2, only the messages by which the central object calls a member object directly and the messages by which the called member calls a grandchild object are recorded.

[Effect of the First Embodiment]

Figure 3:
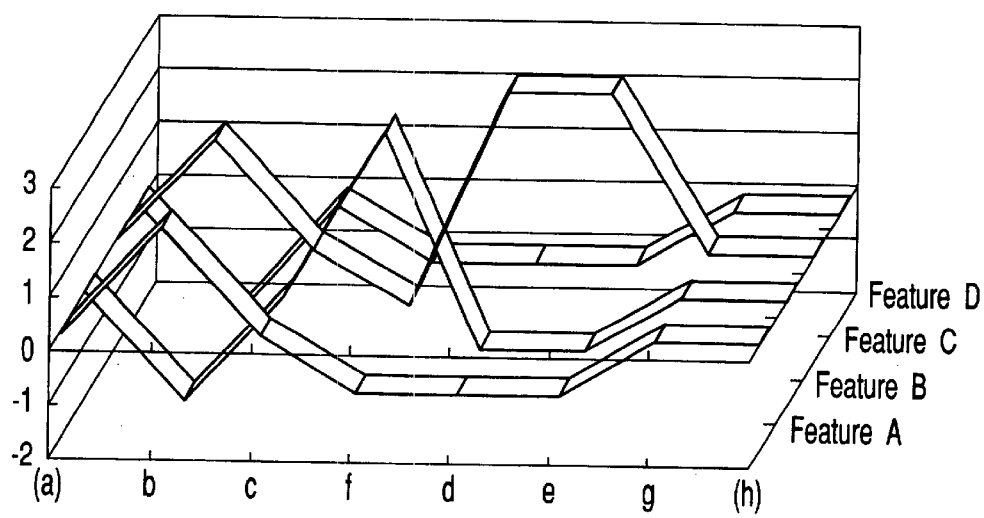
FIG. 3 illustrates the condition where an index is sent along with a message when other objects exist in addition to objects X1, X2, and X3 in the first preferred embodiment of the present invention.

FIG. 3 shows the condition where messages are sent with an index in the case where other objects exist besides objects X1, X2, and X3. In this figure, the recorded messages and the objects concerned with the sending and receiving of these messages are indicated with solid lines while other objects are indicated with broken lines. As shown in this figure, only the messages for which the index is 2 or 1 are recorded and, for example, although object X2 is called as a member at another point by another object, the message for this call is not recorded.

Thus, the composition is made easy by the first embodiment, since whether or not a message is to be recorded is determined autonomously by the organic interaction of each object.

In the first embodiment, the direct messages, which are the messages sent and received by the central object, and the indirect messages, which are sent and received as a result of the direct messages, are detected and recorded by the above-mentioned processes as being relevant messages which are relevant to said central object.

That is, an object that is called as a member at some point by the central object may behave as a member of another object at a different point in time. Since the recorded relevant messages are those which are sent or received as a result of direct messages, they are useful in the analysis of the actions performed by the called objects for the central object. On the other hand, when the called object behaves as a member of another object, it is unrelated to the central object. The messages for this case are not included among the relevant messages and are not recorded. It thus becomes unnecessary to go through the trouble of finding the records of the central message and debugging is made efficient.

To be more specific, in the first embodiment, the object receiving a relevant message is designated as a member until the process requested by the relevant message has been completed and a message, which is sent by said object while it is designated as a member, is also deemed to be a relevant message. The same processes are performed on an object receiving a relevant message from a member. As a result, even if the range of messages arising from direct messages expand, the range of relevant messages can be specified easily and infallibly by repeating the simple process described above.

Also, since messages are recorded in an object in the first embodiment, this embodiment is excellent in compatibility with the processing system of an object-oriented program itself and may be implemented easily.

Also, since the range of messages to be recorded can be designated by the distance from the central object in the first embodiment, the range of recorded messages can be changed in a maneuverable manner according to the target of debugging to make the debugging more efficient. For example, if the relevant messages to be recorded are designated as those for which the distance from the central object is short, the messages recorded can be restricted to those having an especially close relationship with the central object. Oppositely, if messages for which the distance from the central object is far are recorded, operations may be tracked over a wide area.

Furthermore, since an identifier describing the destination of a message is transmitted sequentially along with the index (transfer process) in the first embodiment, the destination of a message can be judged easily from within each object and the composition is made easy.

2. Second Embodiment

A second embodiment of the present invention shall now be described by the use of actual examples of objects and messages.

With the second embodiment, a parallel processing system comprised of two processors is set up as the environment to which the present device is applied. However, the present device may be applied regardless of the number of processors in the parallel processing system.

Figure 5:
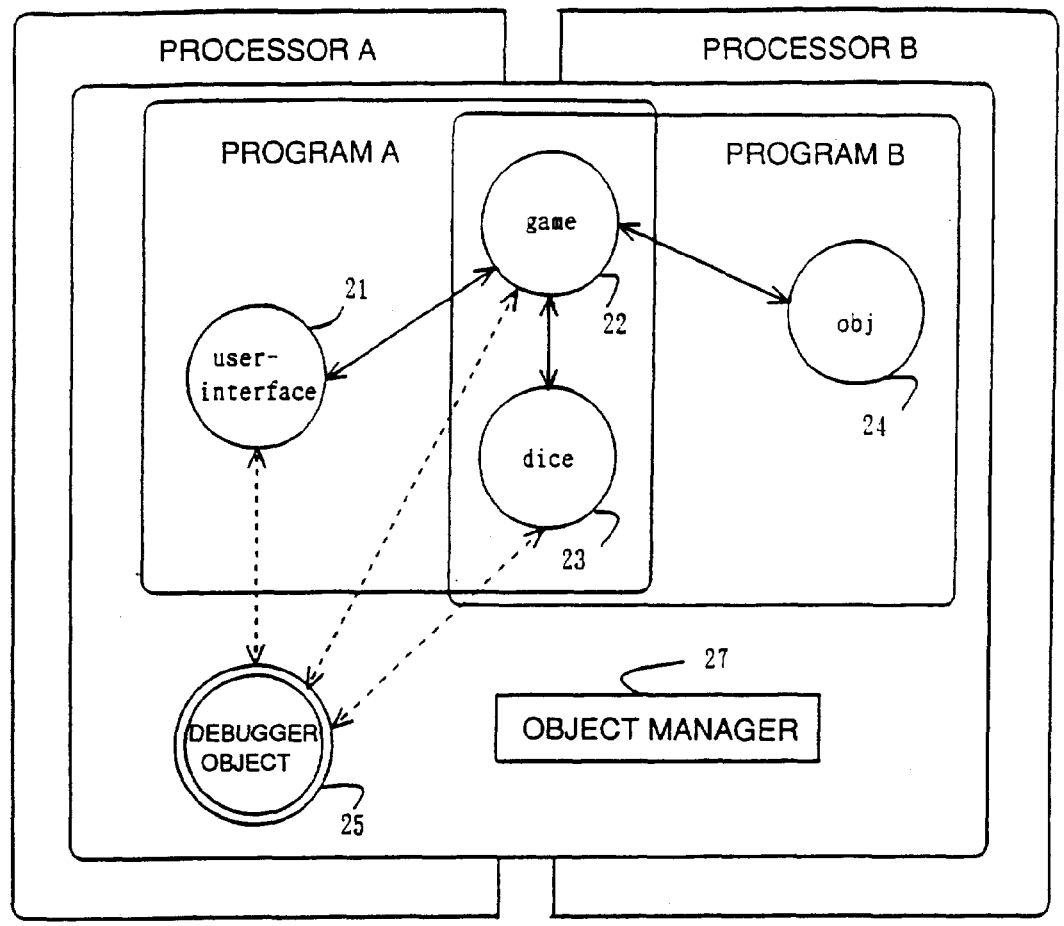
FIG. 5 is a block diagram of the overall composition of the parallel processing system in the second preferred embodiment of the present invention.

2-1. Composition of the Second Embodiment
2-1-2. Composition of the Parallel Processing System in the Second Embodiment FIG. 5 shows the composition of the parallel processing system in the second embodiment. This parallel processing system is comprised of two processors (processor A and processor B) and each processor executes a different application program (program A and program B). Each application program is comprised of a plurality of objects. Among these objects, the objects, "game" 22 and "dice" 23 are commonly possessed by programs A and B and are executed by both processors A and B.

On the other hand, the objects "user-interface" 21 and "obj" 24 are objects which are respectively unique to program A and program B. When each program is executed, messages for executing modules prescribed for each object are exchanged between these objects. The solid lines with arrows on both ends shown in FIG. 5 indicate such exchanges of messages.

Also in FIG. 5, processor A contains a debugger object 25, which is an object for recording the event history. Debugger object 25 receives and records, for example, the contents of messages sent or received by a prescribed object comprising the above-mentioned program A. At this time, a debugger identifier, "debname," which is a name unique to debugger object 25, is sent from debugger object 25 to the above-mentioned object comprising program A. The broken lines with arrow in FIG. 5 indicate such exchange of data. The above-mentioned debugger identifier is used to specify the debugger object which is to be the destination of the event history and the correspondence between the debugger identifier and the debugger object is registered in object manager 27.

2-2-2. Composition of the Debugging Support Device in Embodiment 2

The program debugging support device (hereinafter referred to as "the present device"), which is the present invention, is applied to a parallel processing system having a composition such as that described above. The composition of the present device shall now be described with reference to FIG. 4.

Figure 4:
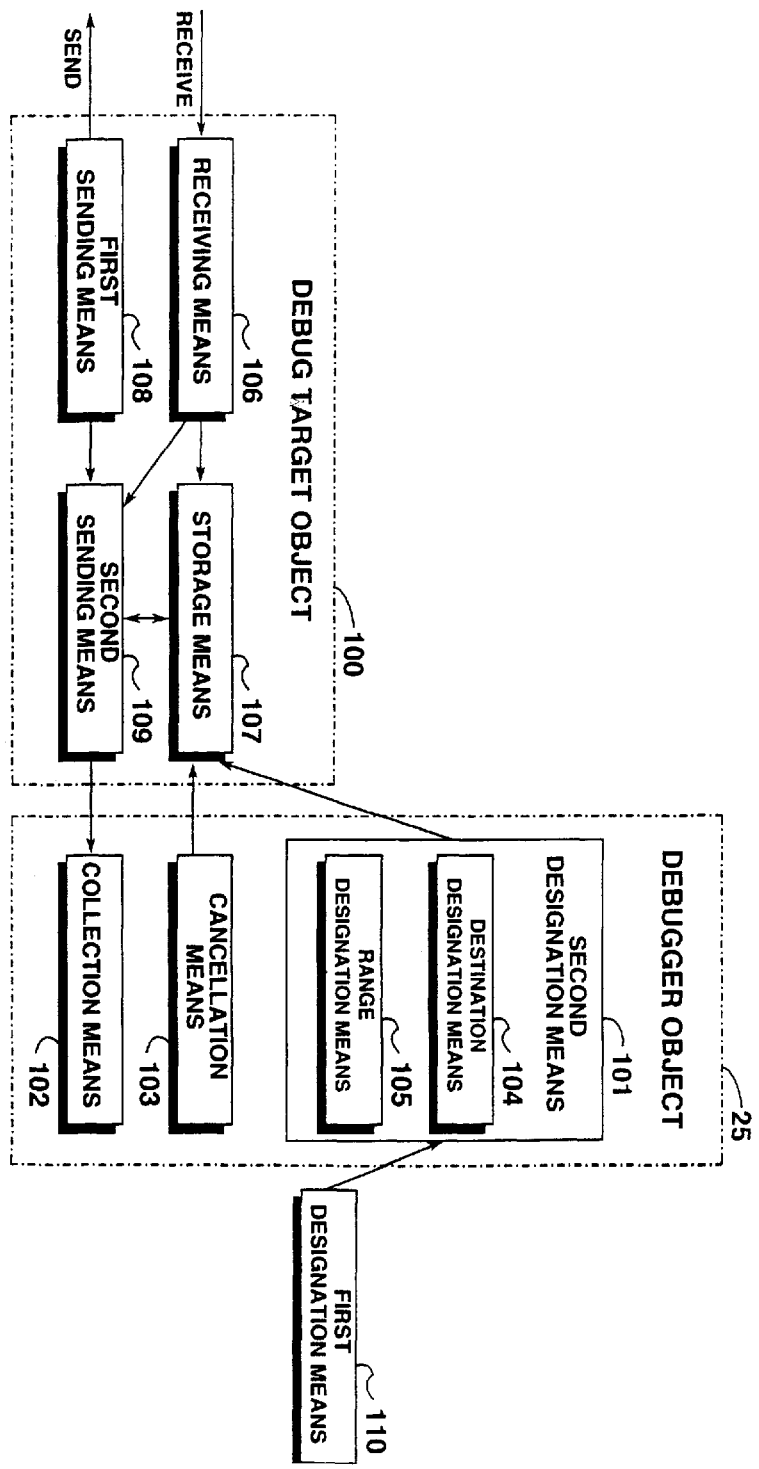
FIG. 4 is a block diagram of the composition of the debugging support device in the second preferred embodiment of the present invention.

In FIG. 4, object 100 is, for example, an arbitrary object which comprises program A within the parallel processing system. The present device, first of all, has a first designation means 110 (corresponding to the central designation means of the first embodiment) which designates object 100 as a debug target for debugger object 25.

Debugger object 25 contains a second designation means 101 (corresponding to the member designation means of the first embodiment) for making the designation concerning debugging support on object 100, which was designated as a debug target object, a collection means 102 (corresponding to the debugger object of the first embodiment) for collecting and recording the message information sent and received by object 100, and a cancellation means 103 for removing object 100 from the target of debugging support. Said second designation means 101 further contains a destination designation means 104 for designating the debugger identifier as the destination of the event history for object 100 and a range designation means 105 for designating the target range of debugging support.

Meanwhile, object 100 contains a receiving means 106 for receiving messages sent from objects besides itself, a storage means 107 (corresponding to retaining part B4 of the first embodiment) for registering the debugger identifier attached to the received message, a first sending means 108 for sending messages to objects besides itself, and a second sending means 109 which references said debugger identifier and sends the messages sent and received by object 100 as the event history to debugger object 25.

Since object 100 is an arbitrary object comprising program A, the various above-mentioned means 106–109 are equally contained in each of the objects, "user-interface" 21, "game" 22, and "dice" 23.

2-2. Actions and Effects of the Second Embodiment

The actions of the program debugging support device with the above composition shall now be described in detail with an example where the object, "user-interface" 21, in said program A is selected as said object 100 in FIG. 4 and is thus designated as the debug target object. Although "user-interface" 21 has been selected as the debug target object in the second embodiment, the same actions and effects may be obtained in cases where other objects are selected.

[Before Program Execution]

The present device is characterized in that it restricts the range in which debugging support is provided to the debug target object and the objects within a specified range which are relevant to this debug target object. The debugger object is notified of only the messages sent and received by objects in the restricted range and records these messages as the event history. As a preliminary step for executing such processes, the following designations are made in the second embodiment prior to the execution of program A:

(a) Designation of the debug target object.
(b) Designation of the debugger object which is to be the destination of the event history.
(c) The designation of the debugging support range for which the event history is to be recorded.

These designations are made by the first and second designation means described below. In FIG. 4, the first designation means 110 first sends a message for debug target object designation to debugger object 25 of program A in order to designate the debug target object. The items, [name of destination object, type of message, factor 1: factor 2], are contained as information in a common form in all messages exchanged between objects. Here, the contents of the message, [debugger 1 settarget name: user-interface], which is sent to debugger object 25, indicate that the object, "user-interface" 21, is designated as the target (debug target object) with respect to debugger identifier "debugger 1" of debugger object 25, which is the destination of this message.

When the debug target object is designated by first designation means 110, the second designation means 101 makes the designations necessary to execute debugging support on said debug target object. To be specific, the destination designation means 104 designates the debugger object which is to be the destination of the event history. That is, the debug target object "user-interface" 21 is given the debugger identifier, "debname: debugger 1," of debugger object 25. Debugger object 25 is thereby designated as the destination of the event history concerning the debug target object. Furthermore, the range designation means 105 designates the debugging support range which is to be recorded in the event history. That is, a prescribed depth level, "depthlevel," (corresponding to the index in the first embodiment) is given to "user-interface" 21.

Figure 6:
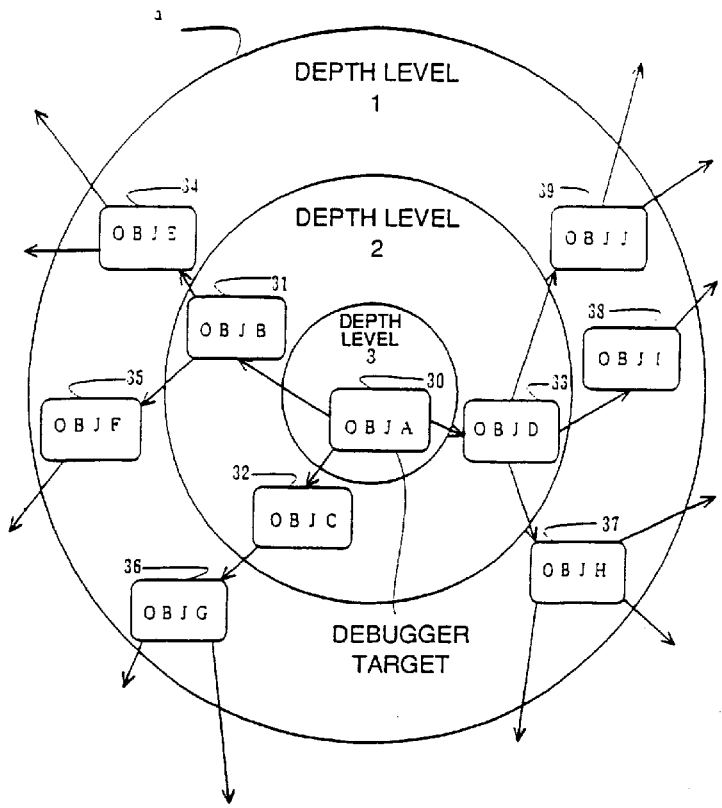
FIG. 6 is an explanatory diagram which illustrates the concept of the depth level and the procedures for setting the depth level in the second preferred embodiment of the present invention.
Figure 6:
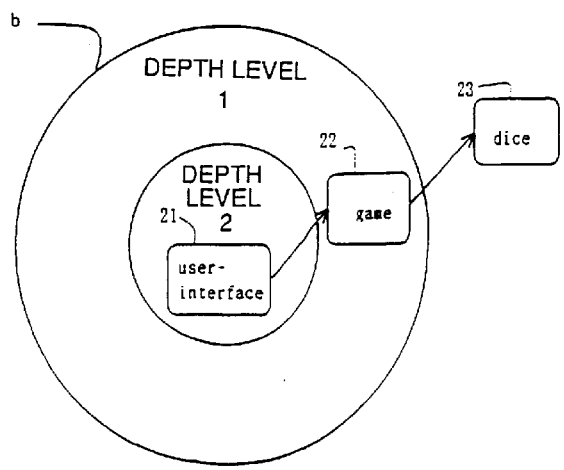

The depth level describes, in a relative manner, the distance from the debug target object to other objects through the use of integers of 1 or greater and is used to restrict the debugging support target range. This depth level shall be described with reference to FIG. 6. In FIG. 6a, OBJ A 30 is a debug target object. When a depth level of 3 is assigned to OBJ A 30 as shown in FIG. 6a, the area described by depth levels of 1–3 become the target of debugging support. That is, when the program is executed, the messages, sent to and received by all objects (OBJ B 31–OBJ I 39) contained in the range of a depth level of 1 or more, are sent to and recorded by the debugger object as the event history.

The above-mentioned debugging support range is centered around debug target OBJ A 30 and is divided in a concentric manner according to the depth level. The depth level decreases by 1 each time the distance, in message units, from debug target object OBJ A 30 increases and approaches a limit value of 1. The range for which the depth level has reached the limit value of 1 is the range which is lowest in importance in the debugging support target range. Objects that exist in areas that are further away than objects having a depth level of 1 are excluded from being targeted for debugging support.

In the second embodiment, the debug target object, "user-interface" 21, is assigned a depth level of 2. In this case, objects up to object "game" 22, which is two messages away counting from "user-interface" 21, are included in the debug target range as shown in FIG. 6b. As can be understood from FIG. 6b, by setting 2 as the depth level, the range of objects to be recorded in the event history can be limited to objects to which the debug target objects sends a message directly. The depth level is thus determined according to how far an object should be from the debug target object to be a target of debugging support.

As described above, a debugger identifier, "debname: debugger 1," and a depth level, "depthlevel: 2," are respectively designated for "user-interface" 21 by the above-mentioned second designation means 101. To be specific, the message, [user-interface settarget debname: debugger 1 depthlevel: 2], is sent to "user-interface" 21 from debugger object 25. The debugger identifier and depth level designated by the above message is registered in storage means 107 within "user-interface" 21. The contents of storage means 107 at this stage are shown in FIG. 7.

[During Program Execution]

Program A is executed after the debugger identifier and the depth level are registered in storage means 107. Program A is comprised of the above-mentioned three objects ("game" 22, "dice" 23, "user-interface" 21) and is an application program in which a dice game is performed as messages are exchanged between these objects. The debugging support actions of the present device during the execution of program A shall now be described in detail.

<"user-interface" 21: Sending of Message>

When program A is executed, "user-interface" 21 performs the various initialization processes necessary for the game in the first to the sixth coded lines of FIG. 9. At the sixth line of FIG. 9, the first message, [game start player: 3], is sent to object, "game" 22, which is in charge of the subsequent process in program A, to perform the initialize the number of players that will play the game. This message tells object, "game" 22, to execute the method, "start," upon setting an argument value of 3 to "player" and means, "start the dice game played by three players."

Figure 12:
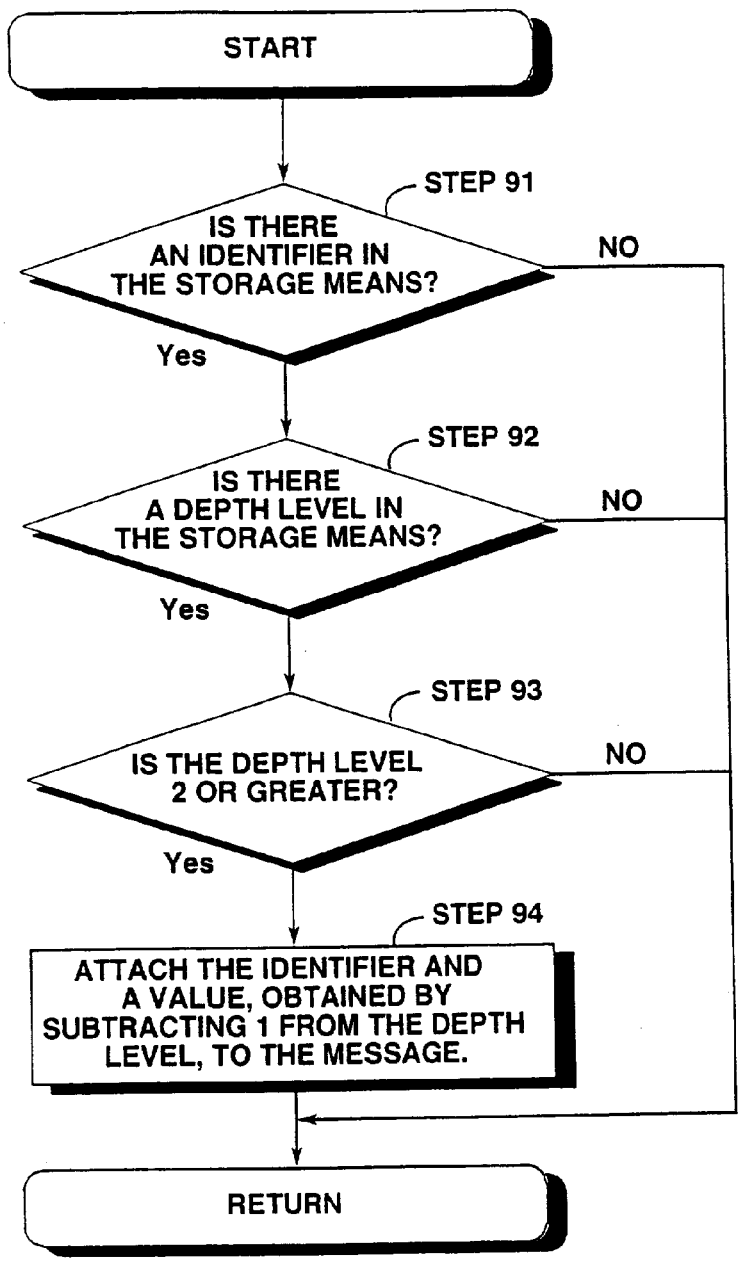
FIG. 12 is a flowchart of the procedures of first sending means 108 in the second preferred embodiment of the present invention.
Figure 13:
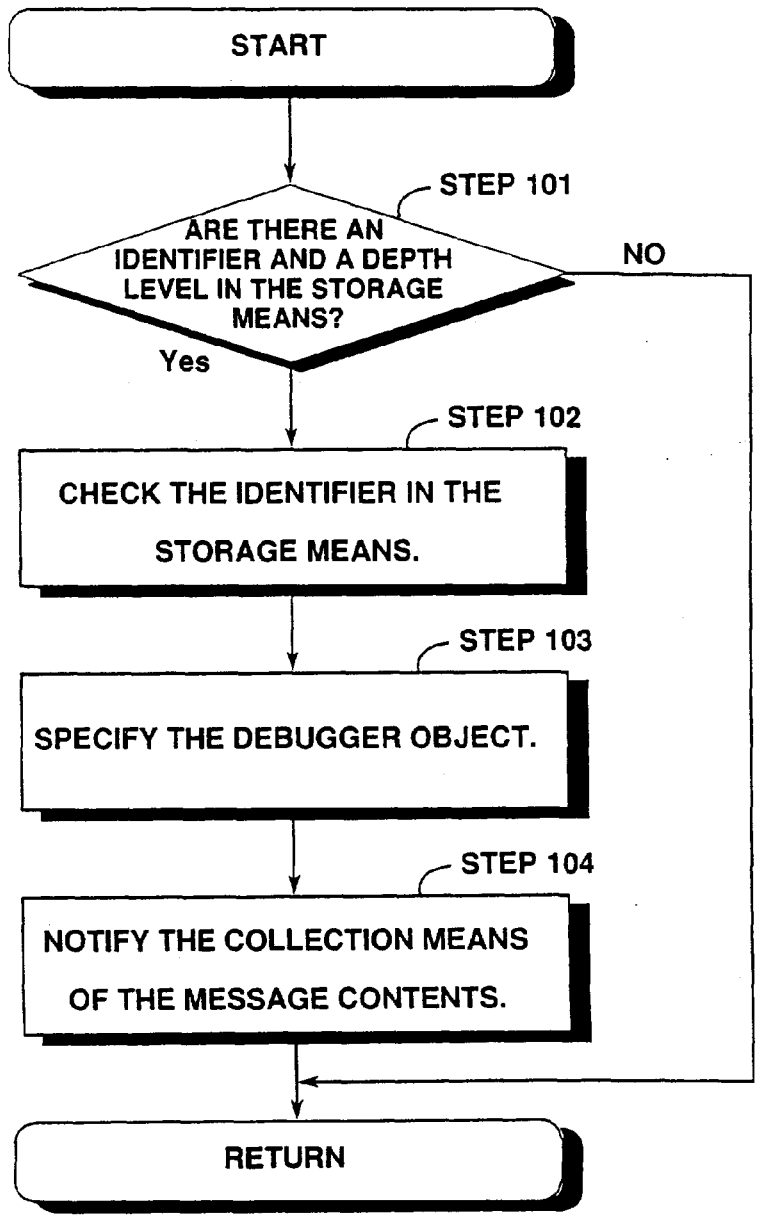
Figure 14:
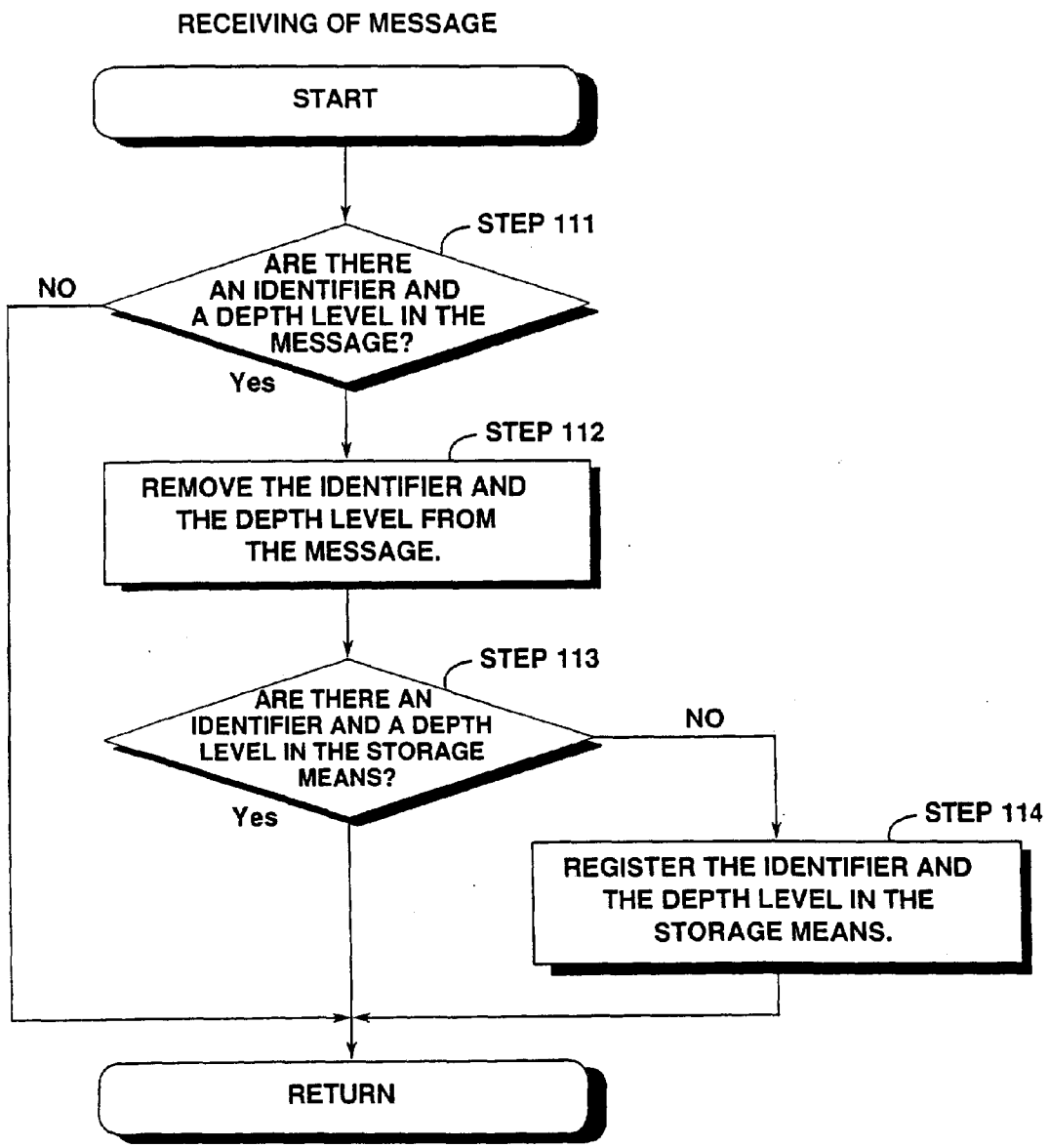
Figures 23, 24:
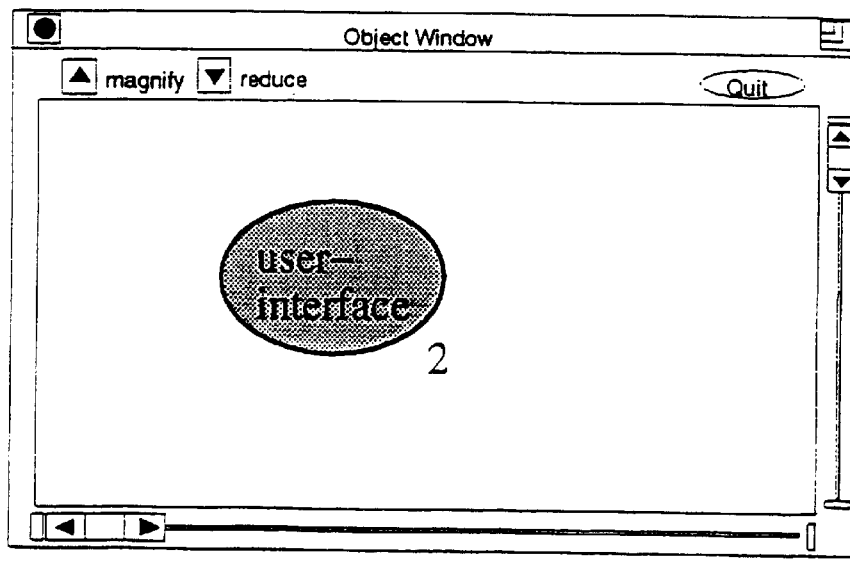
Figure 25:
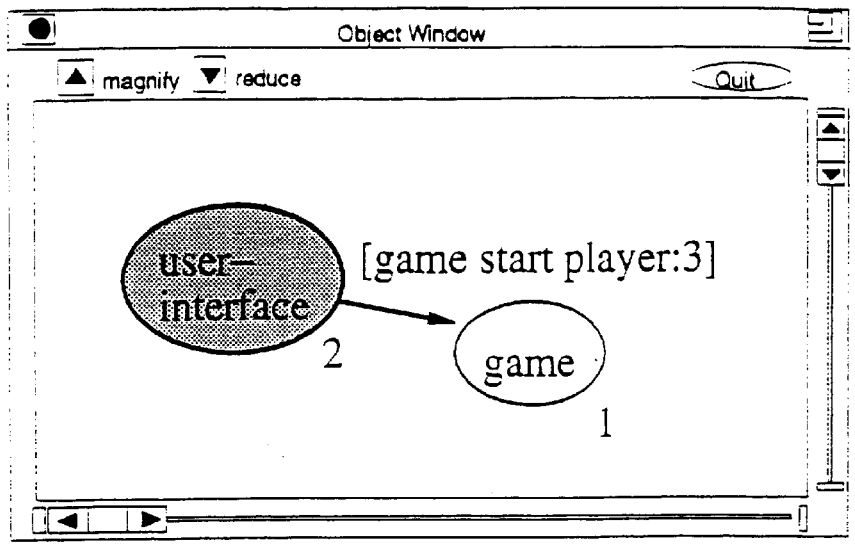
Figure 26:
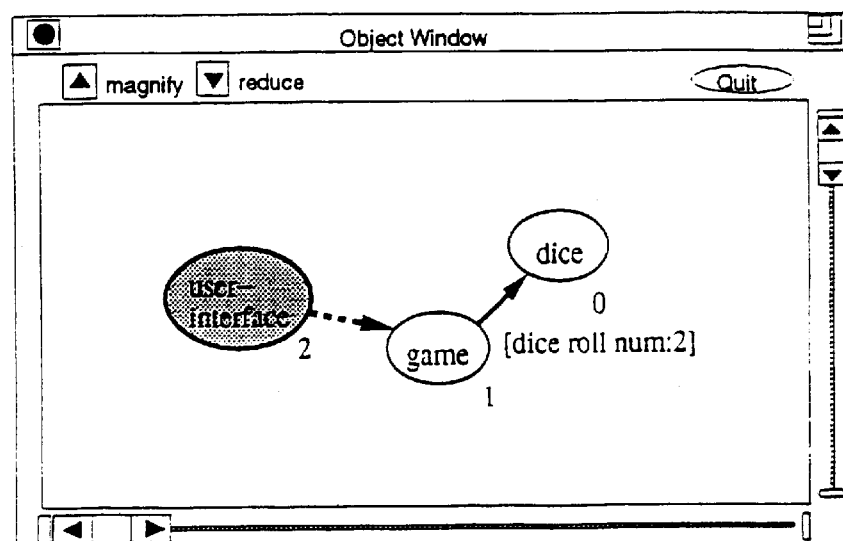
Figures 27, 28:
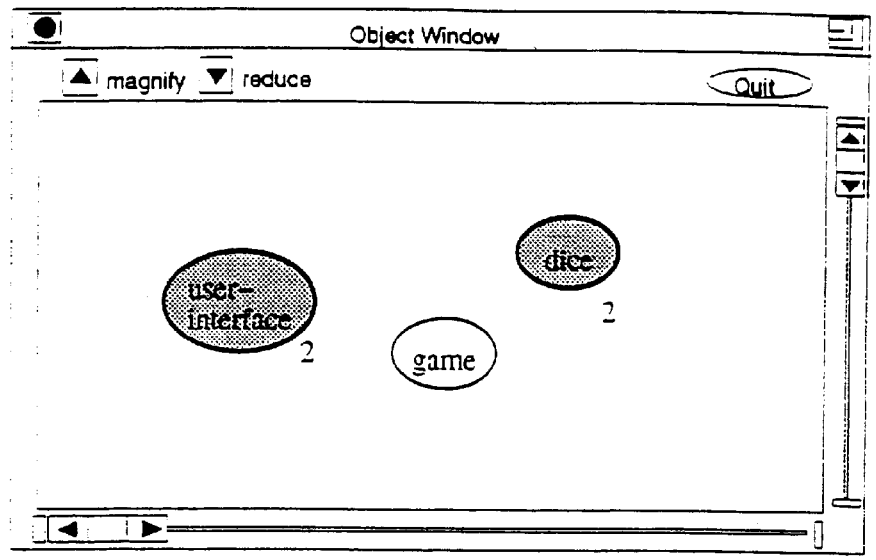
Figure 30:
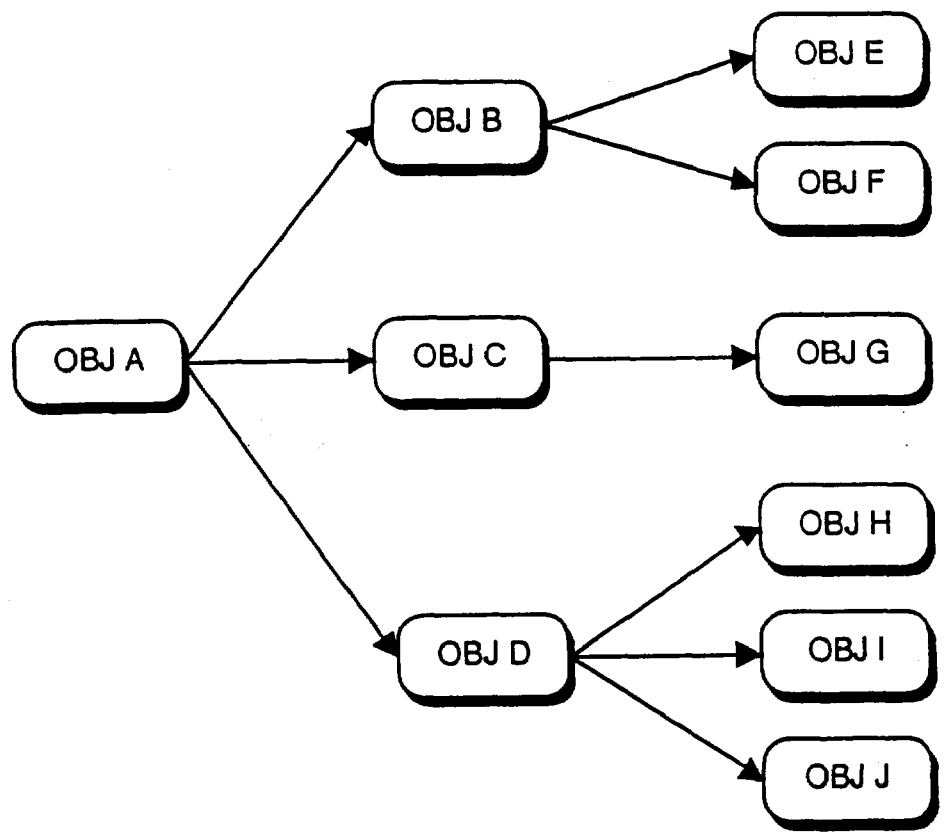
Figure 31:
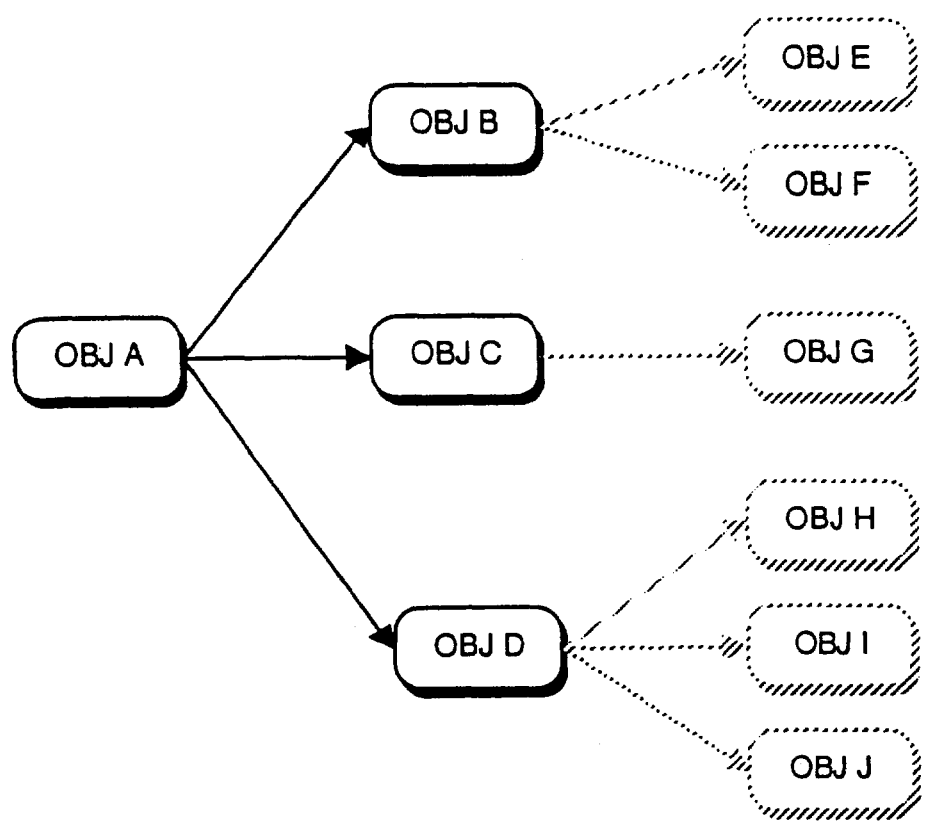
Figure 32:
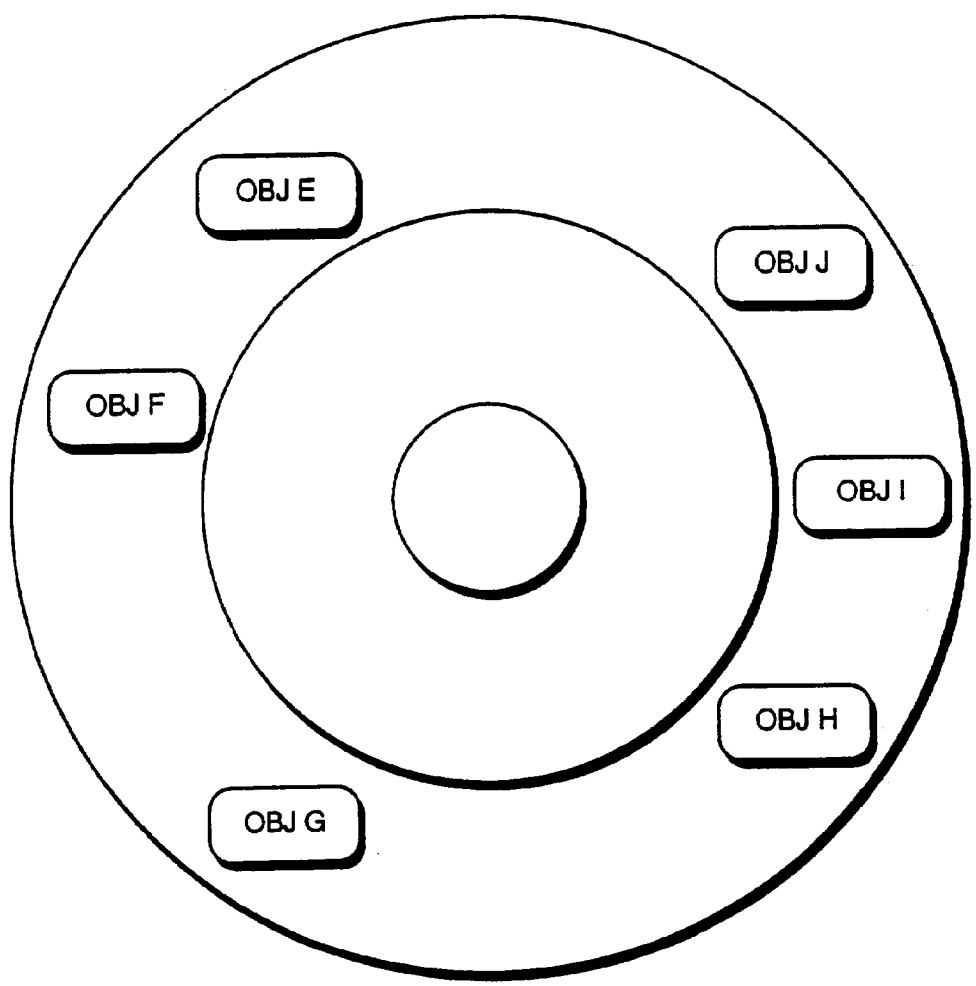
Figure 33:
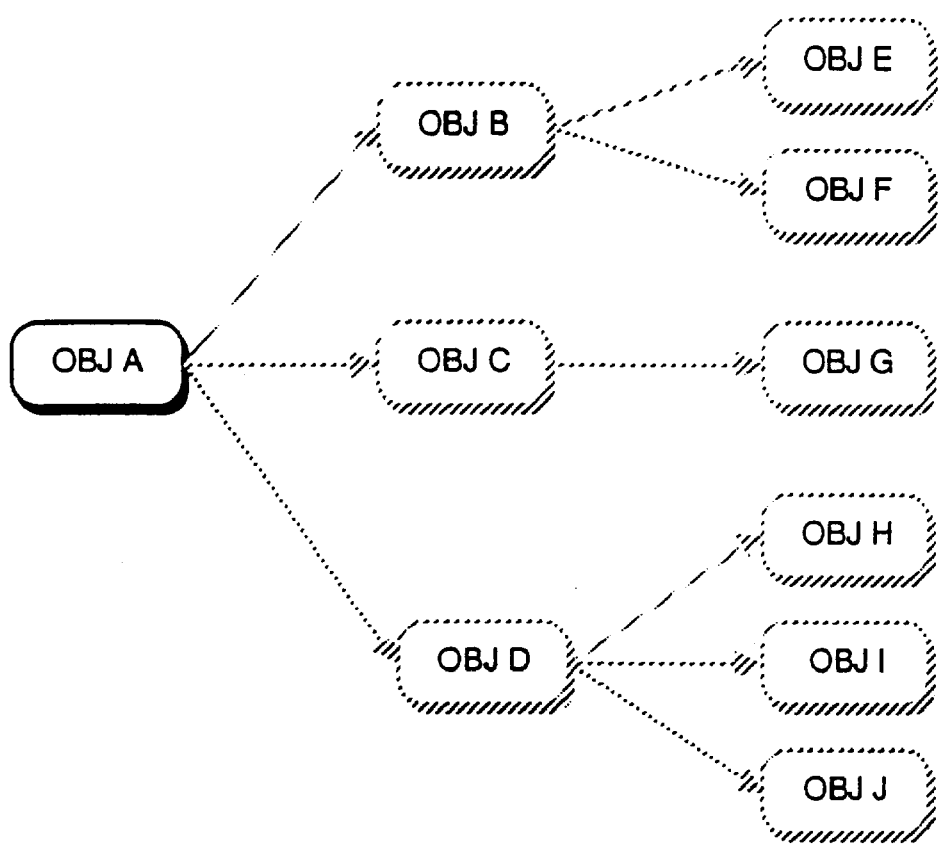
Figure 34:
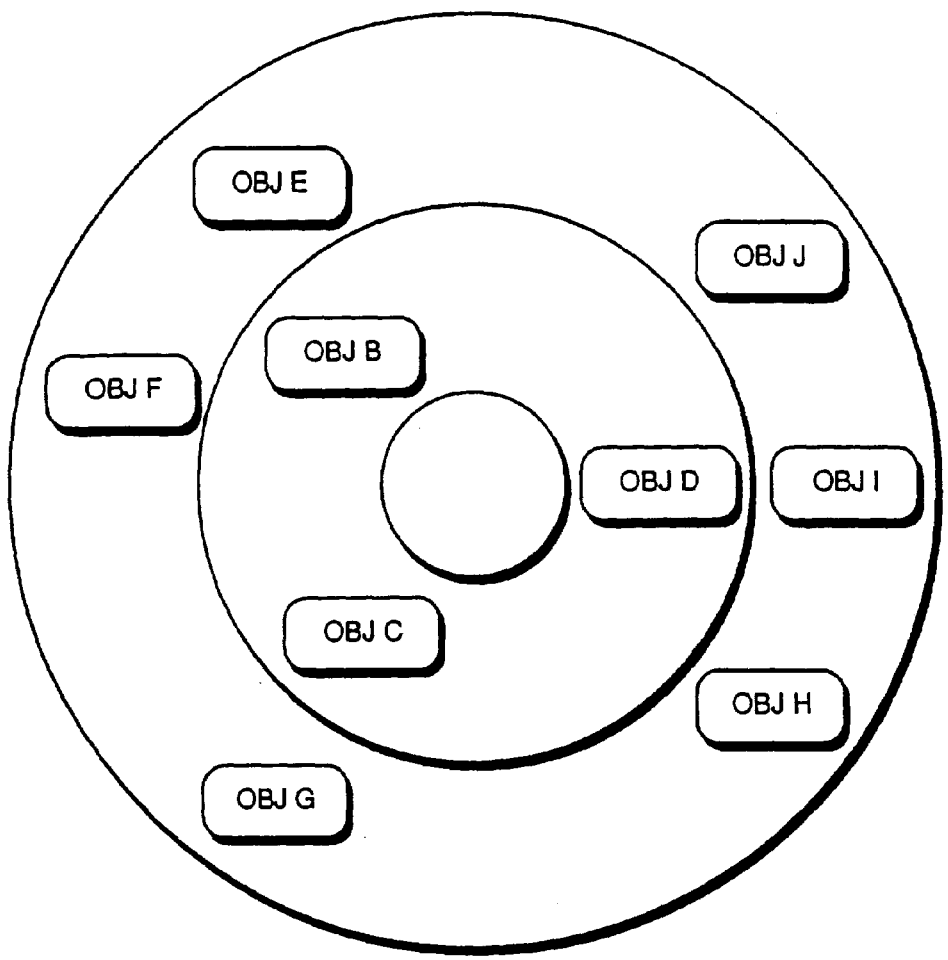
Figure 35:
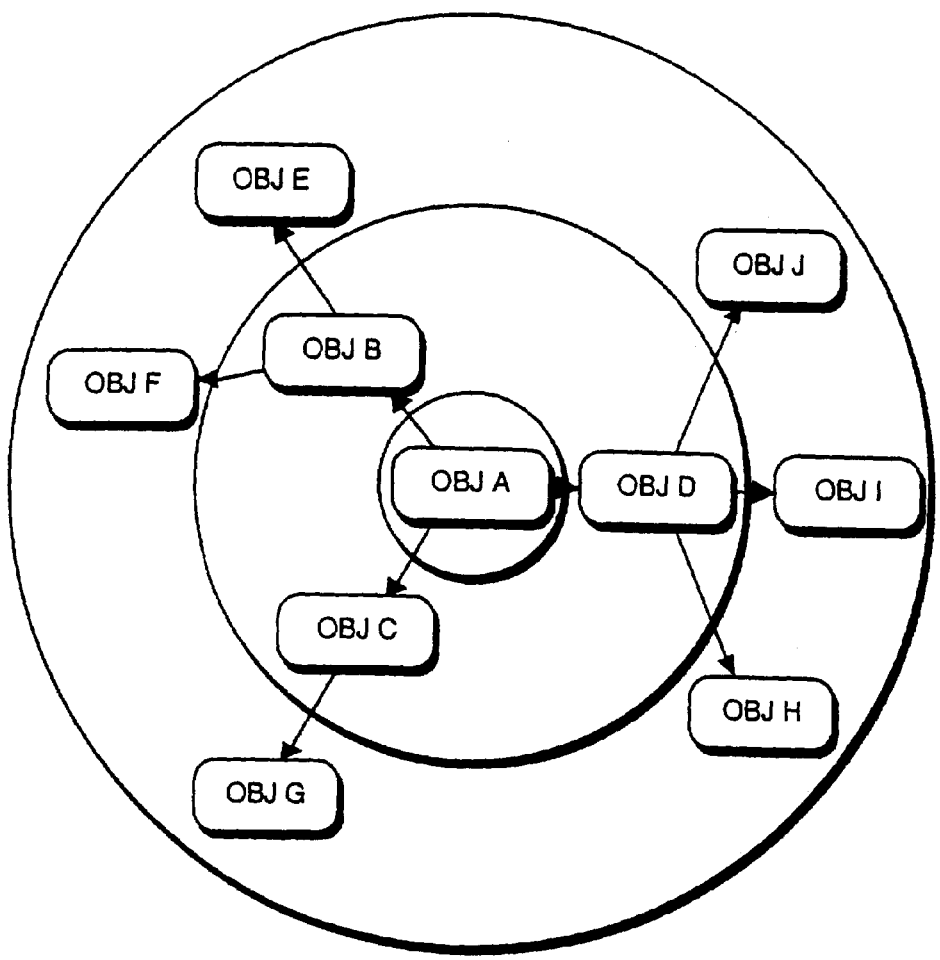
Figure 36:
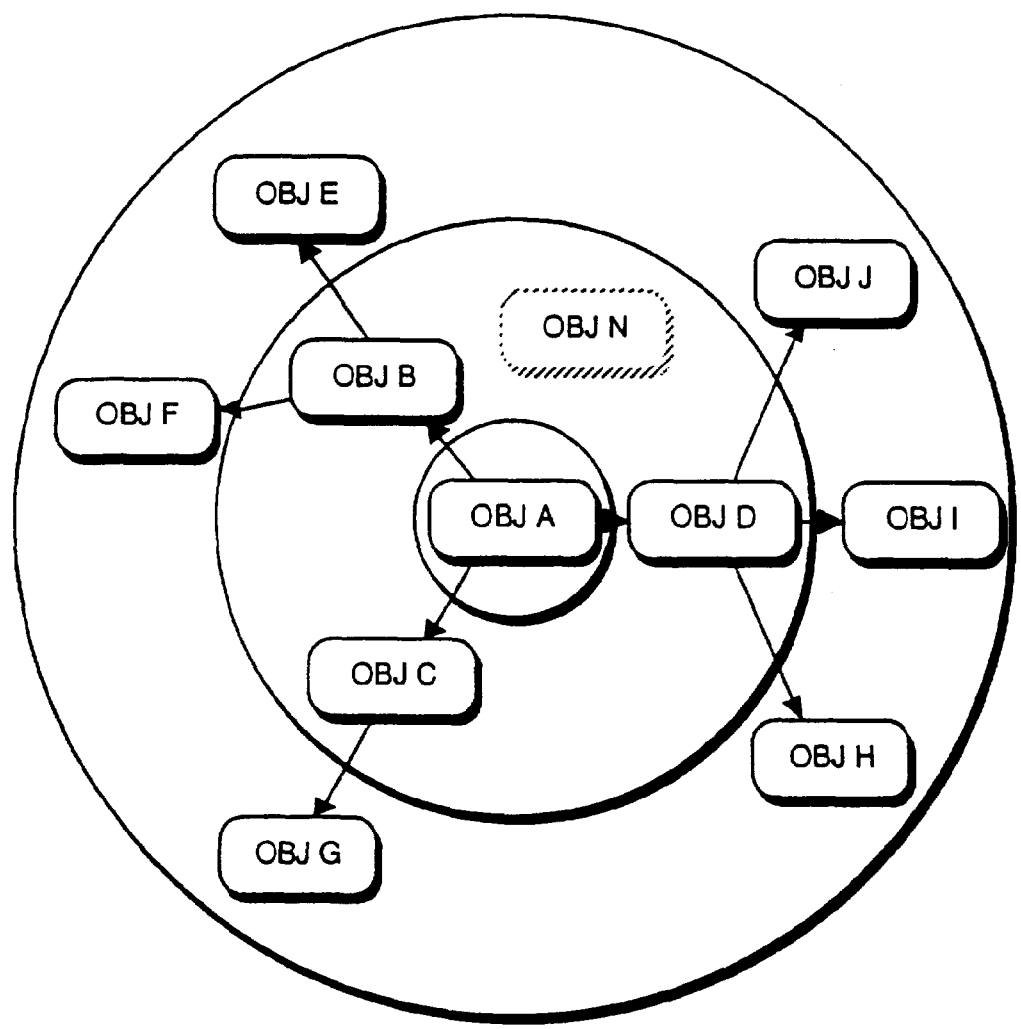
Figure 37:
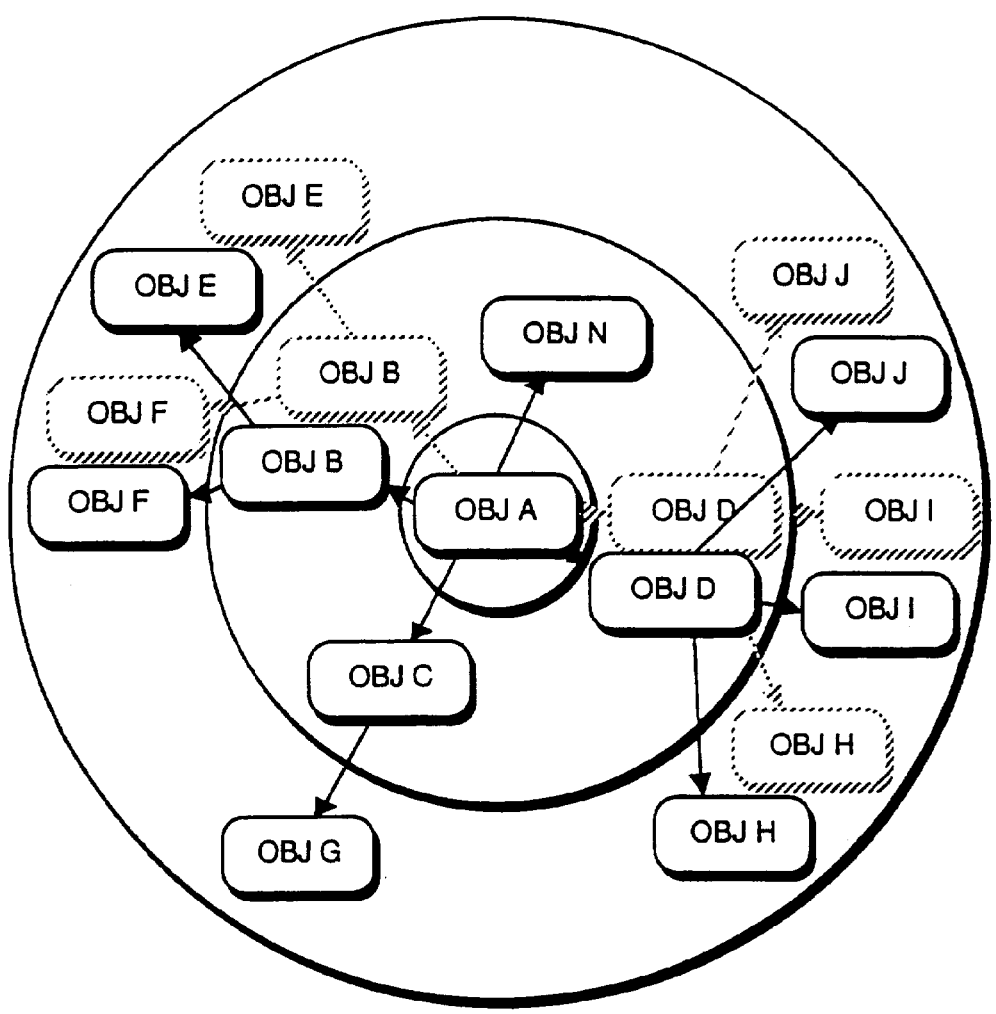

When this message is to be sent, the first sending means 108 at the debugger target object, "user-interface" 21 performs the message sending process. FIG. 12 is a flowchart that describes this procedure. In FIG. 12, first sending means 108 checks the storage means 107 of "user-interface" 21. Within storage means 107 are the debugger identifier, "debname: debugger 1," and the depth level, "depth level: 2," (steps 91, 92) which have been stored in advance before program execution. Since the depth level stored in storage means 107 is greater than the limit value of 1 (step 93), the debugger identifier, "debname: debugger 1" and a value of 1, obtained by subtracting 1 from the initial depth value of 2, are attached to the above-mentioned message (step 94).

By the depth level, "depthlevel," being decreased by 1 each time the above-mentioned message is sent to the next object, it is indicated that the above-mentioned message is sent to objects that are sequentially separated from the debug target object. Through such a procedure, [game start player: 3 debname: debugger 1 depthlevel: 1] is generated as message information and sent to the object, "game" 22.

<"user-interface" 21: Notification and Recording of Sending of Message>

Figure 13:
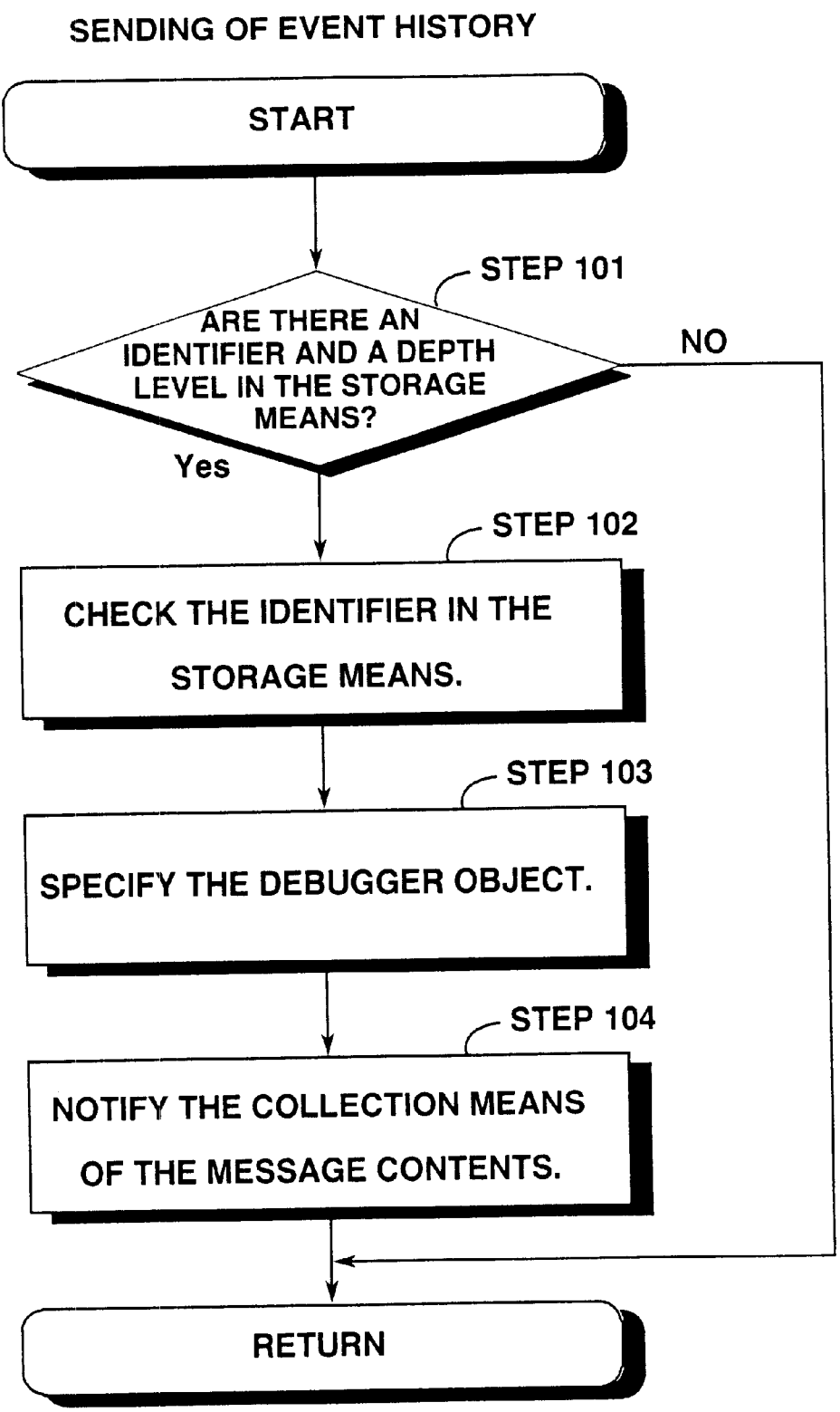
FIG. 13 is a flowchart of the procedures of second sending means 109 in the second preferred embodiment of the present invention.

Next, the above-mentioned message, [game start player: 3], which was sent to "game" 22 from the debug target object, "user-interface" 21, is sent to the second sending means 109 of "user-interface" 21. FIG. 13 is a flowchart which describes this procedure.

In FIG. 13, since the debugger identifier and the depth level are registered in storage means 107 of "user-interface" 21 (step 101), storage means 107 is checked and the debugger identifier, "debname: debugger 1," is obtained (step 102). Next, object manager 27 is referenced and the debugger object corresponding to the obtained debugger identifier, "debugger 1," is specified as the destination of the event history (step 103). Collection means 102 of debugger object 25 is thereby notified of the contents of the message, [game start player: 3], to "game" 22 (step 104).

At collection means 102, the above-mentioned notified message contents are recorded as the event history of "user-interface" 21. FIG. 15 shows the contents of the event history recorded in collection means 102 at this point. The event history is compiled according to each object and is comprised of the source object and destination object of each message, the contents of the method (type, factor) designated by each message, and the return value to be returned from the destination object to the source object.

<"game" 22: Receiving of Message>

Figure 14:
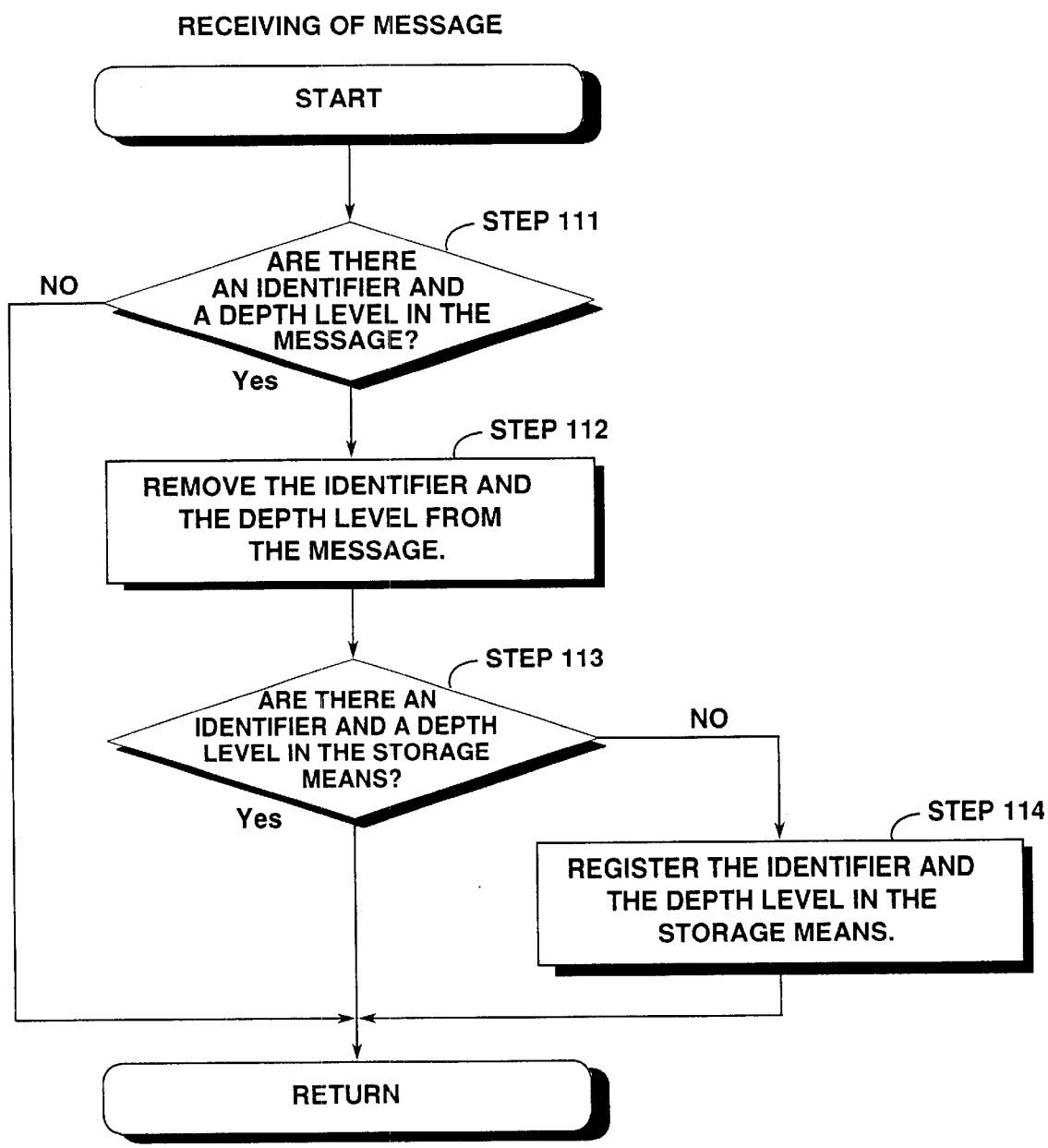
FIG. 14 is a flowchart of the procedures of receiving means 106 in the second preferred embodiment of the present invention.

The above-mentioned message information sent from "user-interface" 21 is received by the object, "game" 22. In this case, the receiving means 106 at "game" 22 performs the message information receiving process. FIG. 14 is a flowchart that shows this procedure.

In FIG. 14, since the debugger identifier, "debname: debugger 1" and the depth level, "depthlevel: 1" are attached to the message information, [game start player: 3 debname: debugger 1 depthlevel: 1], received by "game" 22 (step 111), these are removed from said message information (step 112). Next, it is found upon checking the contents of storage means 107 of "game" 22 (step 113) that the debugger identifier and the depth level are not registered therein. The debugger identifier, "debname: debugger 1," and the depth level, "depthlevel: 1," which have been removed from said message information, are thus registered in storage means 107 of "game" 22 (step 114). FIG. 8 shows the contents of the storage means 107 of "game" 22 at this stage.

The object, for which the debugger identifier and the depth level have been registered in storage means 107, is handled in exactly the same manner as the debug target object. Thus, as long as the debugger identifier and depth level are registered in storage means 107 of "game" 22, debugger object 25 is notified of and records all messages sent and received by "game" 22.

<"game" 22 : Notification and Recording of Receiving of Message>

The message part, [game start player: 3], which has been processed for receiving by "game" 22 and has been removed of the debugger identifier and the depth level, is sent to the second sending means 109 of "game" 22.

In the procedures shown in FIG. 13, the debugger identifier and the depth level registered by receiving means 106 are found to exist in storage means 107 of "game" 22 (step 101). Therefore, upon checking storage means 107, the debugger identifier, "debname: debugger 1" is obtained (step 102). Next, object manager 27 is referenced and the debugger object 25 corresponding to the obtained debugger identifier, "debname: debugger 1," is specified as the destination of the event history (step 103). Collection means 102 of debugger object 25 is then notified of the contents of the above-mentioned message (step 104).

At collection means 102, the above-mentioned notified message contents are recorded as the event history of "game" 22. FIG. 18 shows the contents of the event history recorded in collection means 102 at this stage.

<"game 22": Receiving of Message>

The message information, [game roll who: 0 debname: debugger 1 depthlevel: 1], sent from "user-interface" 21, is received by "game" 22. The receiving means 106 of "game" 22 then performs the process for receiving the above message information according to the above-mentioned procedures in FIG. 14 again. That is, as shown in FIG. 14, since the debugger identifier, "debname: debugger 1" and the depth level, "depthlevel: 1," are attached to this message information (step 111), these are removed from said message information (step 112). Furthermore, since it is found upon checking the storage means of "game" 22 that the debugger identifier and depth level are registered (step 113), the message, [game roll who: 0], from which the debugger identifier and depth level have been removed, is received as it is. Since the debugger identifier and depth level are registered in the storage means 107 of "game" 22, debugger object 25 is notified of and records the above-mentioned received message.

<"game" 22: Notification and Recording of Receiving of Message>

The message, [game roll who: 0], which has been received and processed by "game" 22 is then sent to the second sending means 109 of "game" 22 and is processed according to the above-mentioned procedures shown in FIG. 13. That is, since the debugger identifier and depth level exist within storage means 107 of "game" 22 (step 101), the debugger identifier, "debname: debugger 1," is obtained upon checking storage means 107 (step 102). Debugger object 25, corresponding to the obtained debugger identifier, "debname: debugger 1," is then specified as the destination for the event history (step 103) and notifies collection means 102 of debugger object 25 of the above-mentioned message (step 104). At collection means 102, the notified message is recorded as the event history of "game" 22. FIG. 19 shows the contents of the event history recorded in collection means 102 at this stage.

<"game" 22: Execution of Method>

Figure 10:
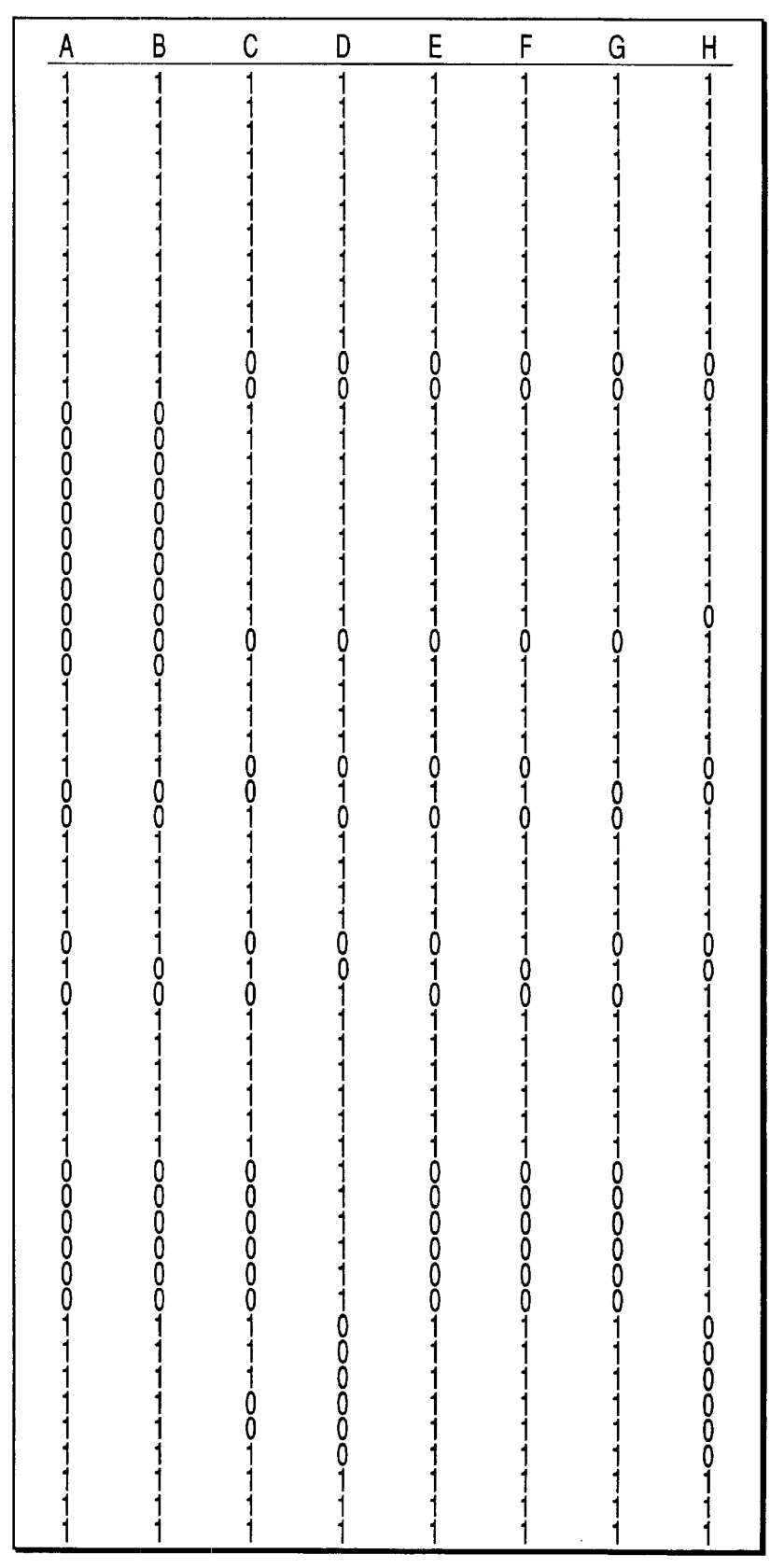

Upon receiving the message, [game roll who: 0], "game" 22 executes the method, "roll who: 0," according to the ninth coded line onwards shown in FIG. 10. That is, the game is performed in which the dice is rolled twice starting from the first player and the player's piece is moved by the total value of the dice. The game is "finished" when some player's piece has moved by 10 or more steps. Here, the twelfth coded line in FIG. 10 shows that a new message, [dice roll num: 2] is sent from "game" 22 to the object, "dice" 23, during the execution of the method, "roll who: 0." This message means, "determine the total value of the dice upon rolling the two dice" and the factor, "num: 2" in the method indicates the number of dice rolled.

<"game" 22: Sending of Message>

Upon sending the message, [dice roll num: 2], the first sending means 108 of "game" 22 checks the storage means 107 in accordance with the above-mentioned procedures in FIG. 12 and since the debugger identifier and the depth level exist (steps 91, 92), the next step 93 is entered. At step 93, the depth level stored in the storage means 107 of "game" 22 is found to be the limit value of 1. As was described with reference to FIG. 6, the range for which the depth level is 1 is the furthest debugging support target range from the debug target object and thus the objects belonging to ranges that are further away are not targeted for debugging support. In other words, the event history of "dice" 23, which is the next object after "game" 22, do not have to be recorded in debugger object 25. Since the debugger identifier and depth level therefore do not have to be attached to the above-mentioned message, [dice roll num: 2], the contents of this message are sent as they are to "dice" 23.

<"game" 22: Notification and Recording of the Sending of Message>

The message, [dice roll num: 2], sent to "dice" 23 is given to the second sending means 109 of "game" 22. Second sending means 109 then notifies collection means 12 of debugger object 25 of the above-mentioned message in accordance with the above-mentioned procedures in FIG. 13. At collection means 12, the notified message contents are recorded as the event history of "game" 22. FIG. 20 shows the contents of the event history at this stage.

<"dice" 23: Receiving of Message>

At "dice" 23, the receiving process of the message, [dice roll num: 2], sent from "game" 22, is performed according to the above-mentioned procedures in FIG. 14. That is, as shown in FIG. 14, since the debugger identifier and depth level are not contained in the above-mentioned message (step 111), the contents of the above-mentioned message are received as they are.

On the other hand, at the second sending means 109 of "dice" 23, it is found in the procedures of FIG. 13 that the debugger identifier and depth level that are to be recorded do not exist (step 101). This is because "dice" 23 is outside the debugging support target range. Thus, collection means 102 of debugger object 25 is not notified of and does not record the above-mentioned received message contents.

<"dice" 23: Sending of Message (Return Value)>

"Dice" 23 executes the method, [roll num: 2], designated by the message from "game" 22. To be specific, the codes shown in FIG. 11 are executed to calculate the result of rolling the two dice by using random numbers. When the above method, [roll num: 2], is executed without any problem, a return value is sent as a reply message for "game" 22 as designated by the eighth coded line in FIG. 11. That is, the first sending means 108 of "dice" 23 sends, for example, a return value, [8], according to the above-mentioned procedure in FIG. 12. At this time, since it is found in steps 91 and 92 that the debugger identifier and depth level are not registered in storage means 107 of dice 23, the above-mentioned return value, [8], is sent as it is to "game" 22.

<"game" 22: Receiving of Message (Return Value)>

When the return value, [8], from "dice" 23 is received at "game" 22, receiving means 106 performs the receiving process for this message according to the above-mentioned procedures shown in FIG. 14. That is, since the debugger identifier and depth level are found to be not contained at step 11, the above-mentioned return value, [8], is received as it is.

<"game" 22: Notification and Recording of Receiving of Message>

Collection means 102 of debugger object 25 is notified of the received return value from "dice" 23 by second sending means 109 of "game" 22 in accordance with the above-mentioned procedures shown in FIG. 13. That is, since the debugger identifier and the depth level are registered in storage means 107 of "game" 22 (step 101), the debugger identifier is checked, the corresponding debugger object is specified (steps 102, 103), and collection means 102 is notified of the above-mentioned return value (step 104). At collection means 102, the contents of the received message notified are recorded as the event history of "game" 22. FIG. 21 shows the contents of the event history at this stage.

<"game" 22: Sending of Message (Return Value)>

When the method designated by the message, [game roll who: 0] is thus completed, "game" 22 sends the return value, [0], as a reply message to the debug target object, "user-interface 21," which is the source of said message. That is, the first sending means 108 of "game" 22 performs the sending process of said return value, [0], according to the above-mentioned procedures of FIG. 12. Since the debugger identifier and the depth level are registered in storage means 107 of "game" 22, the program proceeds to step 91, step 92, and then to step 93 and since the depth level is found to be 1 at step 93, the above-mentioned return value, [0], is sent as it is to "user-interface" 21.

<"game" 22: Notification and Recording of Sending of Message>

The second sending means 109 of "game" 22 notifies the collection means 102 of debugger object 25 of the above-mentioned return value, [0], as a sent message in accordance with the above-mentioned procedures shown in FIG. 13. At collection means 102, the contents of the received message notified are recorded as the event history of "game" 22. FIG. 22 shows the contents of the event history at this stage.

This information is the event history of "game" 22. It is also necessary to record event histories of "user-interface" 21 and "dice" 23 in the debugger object 25, or, above described information of each object can not be obtained correctly.

It is desirable not only to record the representations of FIGS. 18–22 but to record both sending and receiving of identical message as different events by including the information that represents on which object the sending or the receiving have been observed.

<"user-interface" 21: Receiving of Message (Return Value)>

When the return value, [0], is received at "user-interface" 21 as a message from "game" 22, receiving means 106 performs the receiving process for this message in accordance with the procedures shown in FIG. 14. That is, since the debugger identifier and the depth level are not contained in the return value, which is the received message (step 111), this return value, [0], is received as it is.

<"user-interface" 21: Notification and Recording of Receiving of Message>

In accordance with the above-mentioned procedures shown in FIG. 13, the second sending means 109 of "user-interface" 21 notifies collection means 102 of debugger object 25 of the above-mentioned return value, [0], as a received message. At collection means 102, the received message notified is recorded as the event history of "user-interface" 21. FIG. 17 shows the contents of the event history at this stage.

The processing of the message, [game roll who: 0], sent from "user-interface" 21 to "game" 22 is thus completed. At the final stage, the cancellation means 103 of debugger object 25 deletes the debugger identifier and the depth level registered in each storage means 107 of "user-interface" 21 and "game" 22.

As described above, with the debugging support device of the second embodiment, the debugger identifier, which is the destination of the event history, and the depth level, which restricts the target range for debugging support, are designated for the debug target object. By changing this depth level, the range of the event history to be recorded may be selected according to the user's needs. The degree of freedom in the debugging support work is thus increased. Also, since the target range is restricted, the debugging support work is simplified and efficient debugging support can be carried out in a short time. Furthermore, since the above-mentioned depth level can be set simply by attaching an integer of 1 or greater as information within the message, there is no need to add a special device and thus this setting process can be applied widely to conventional debugging support devices.

[User Interface]

Figure 23:
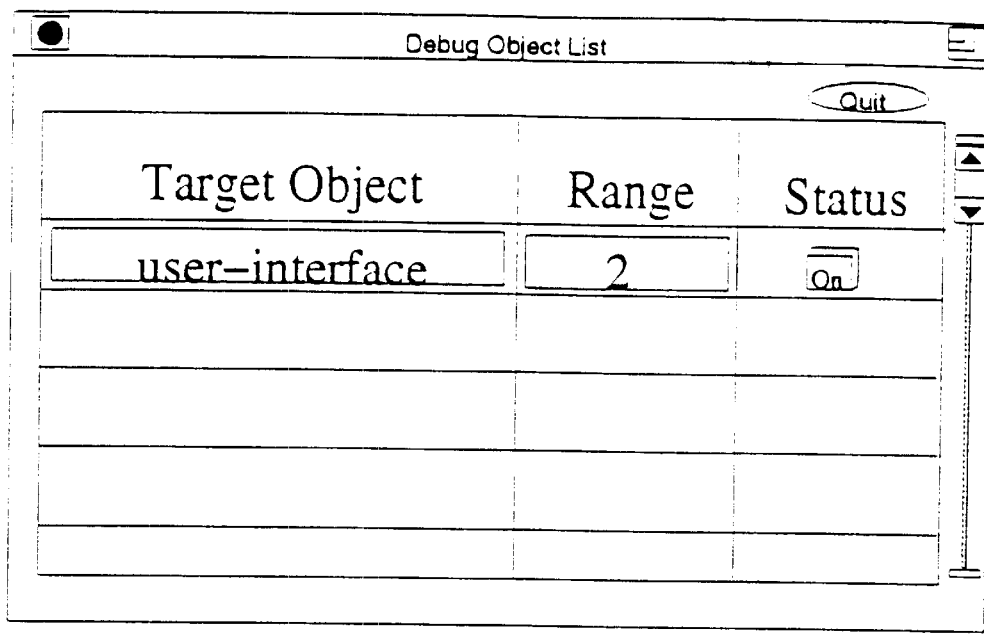
FIG. 23 is a display example of the window, Debug Object List, which is used to select the object name to be targeted for debugging in the second preferred embodiment of the present invention.

An example of the user interface in the second embodiment shall now be described. In this example, the so-called multi-window is used in which windows, that differ according to the type of information to be displayed or designated, are used. FIG. 23 shows a display example of the window, Debug Object List, by which the name of the object to be targeted for debugging is selected. Here, the object, "user-interface" is selected and a depth level of 2 is designated.

Figure 24:
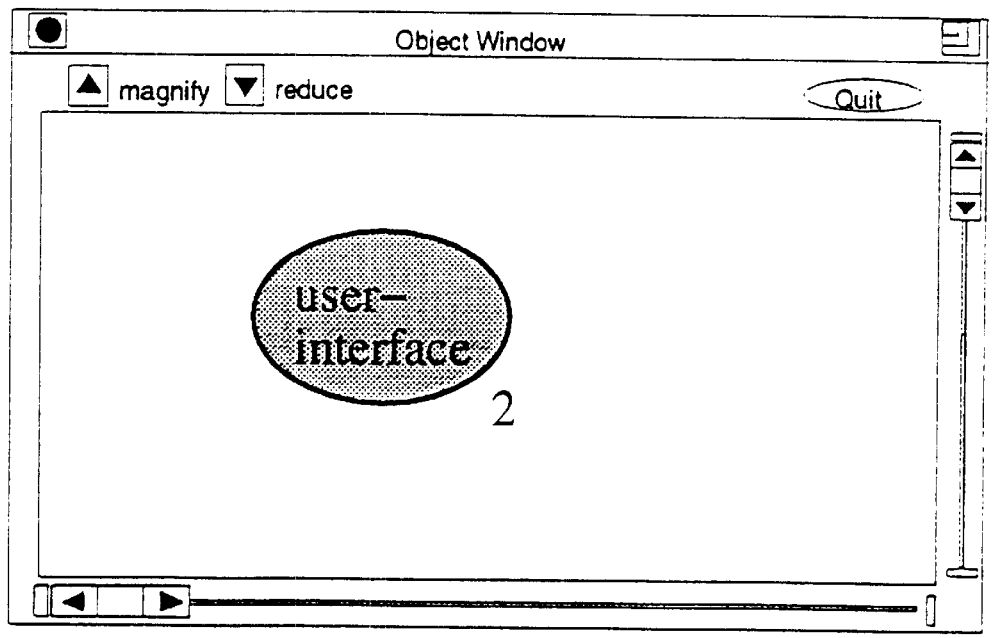
FIG. 24 shows the condition where a debug target object is displayed in the window, Object Window, in the second preferred embodiment of the present invention.
Figure 25:
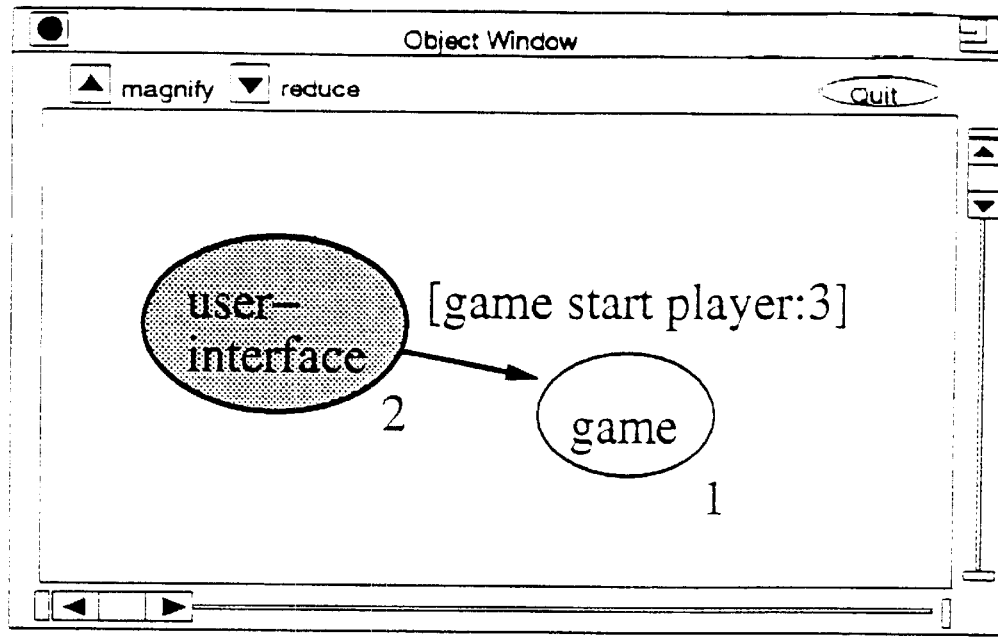
FIG. 25 shows the condition of the window, Object Window, when it sequentially displays the increasing number of relevant objects in the second preferred embodiment of the present invention.

During the execution of the program, the debug target object is displayed in another window called the Object Window. FIG. 24 shows the condition where the debug target object is displayed in the window, Object Window. This window, Object Window, sequentially displays the relevant objects as their number increases as messages are sent. FIG. 25 shows the condition where the window, Object Window, sequentially displays the relevant objects as their number increases.

Figure 26:
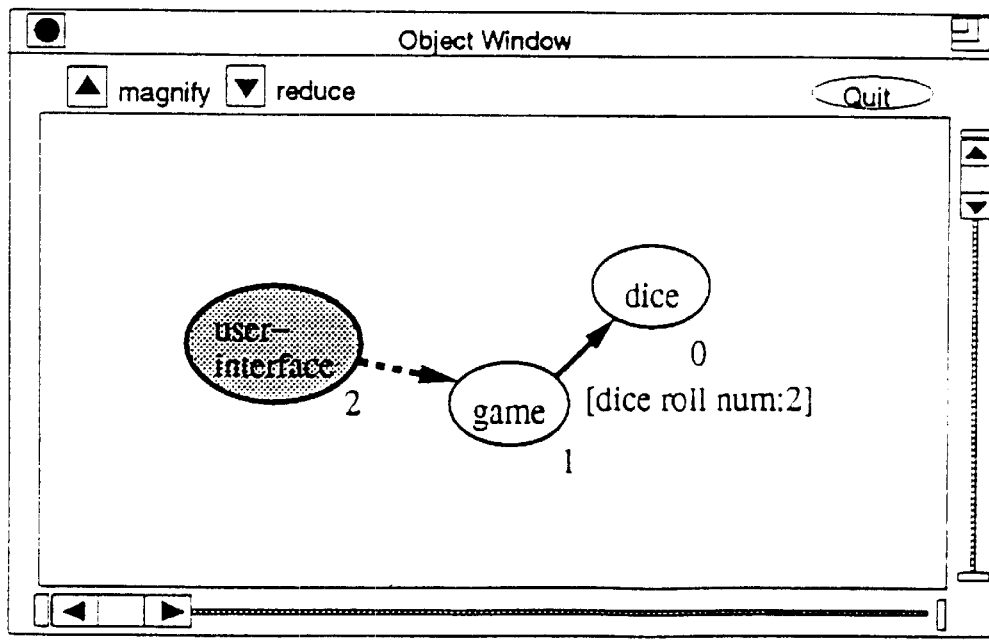
FIG. 26 shows the reduced display condition of the window, Object Window, in the second preferred embodiment of the present invention.

Reduced display of the objects may be performed at the window, Object Window, as necessary according to the number of objects displayed. FIG. 26 shows the reduced display condition of the window, Object Window.

Figures 27, 28:
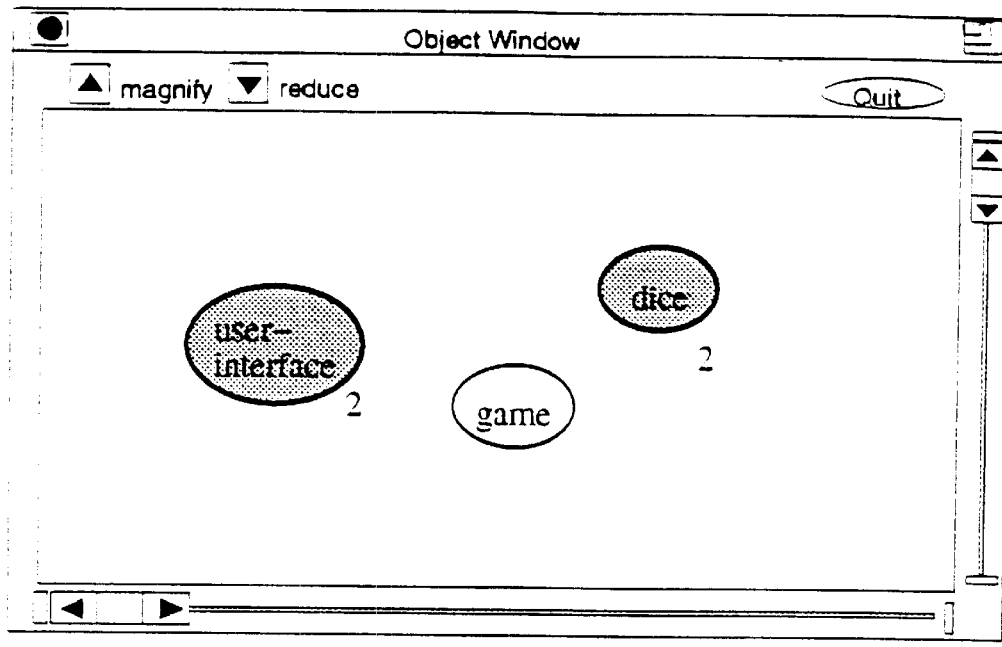
FIG. 27 shows the condition where an object is additionally selected at the window, Object Window, and a depth level is designated for that object in the second preferred embodiment of the present invention.
FIG. 28 is a display example which shows the window, Debug Object List, after additional selection is performed in the second preferred embodiment of the present invention.

By using a mouse pointer to point/click the objects, displayed in the window, Object Window, in the above manner, objects targeted for debugging may be selected additionally and the depth levels may be designated for the additionally selected objects. FIG. 27 shows the condition where an object is additionally selected and the depth level is designated for said object at the window, Object Window. FIG. 28 is a display example of the window, Debug Object List, after additional selection.

Since additional selection of objects to be targeted for debugging may thus be performed simply by selecting objects displayed as symbols in the second embodiment, the operation efficiency is improved.

[Data Format]

In the second embodiment, the message (event) data are recorded in the form of character strings. FIG. 29 shows an example of the data format during the recording of messages in the second embodiment. As shown in this figure, the data are composed so that one line corresponds to one event and each line is delimited by a semicolon and a line feed. Each line contains several items, such as the source and destination of the message, and items are delimited from each other by a comma. These data storage blocks are controlled by means of their respective starting address and ending address.

Since a variable-length data form is thus used by using delimiter codes in the second embodiment, the storage blocks may be economized even when numerous messages are to be recorded.

[Output of Record]

It is desirable that each of the recorded messages and each of the objects concerned with the sending and receiving of each of the messages can be output in the form shown in FIG. 6a at an output means, such as the display screen. That is, by outputting objects and messages in a manner where they are centered about the target object (central object) and positioned further outward the greater the distance from the central object, the distance relationship of each object and message with respect to the central object may be grasped easily in one view to make the debugging efficient.

For example, the following process may be performed to output objects and message in such a radial manner. First, in order to perform such an output after the program execution has ended and all objects and messages have been assorted, the following is performed.

Figure 30:
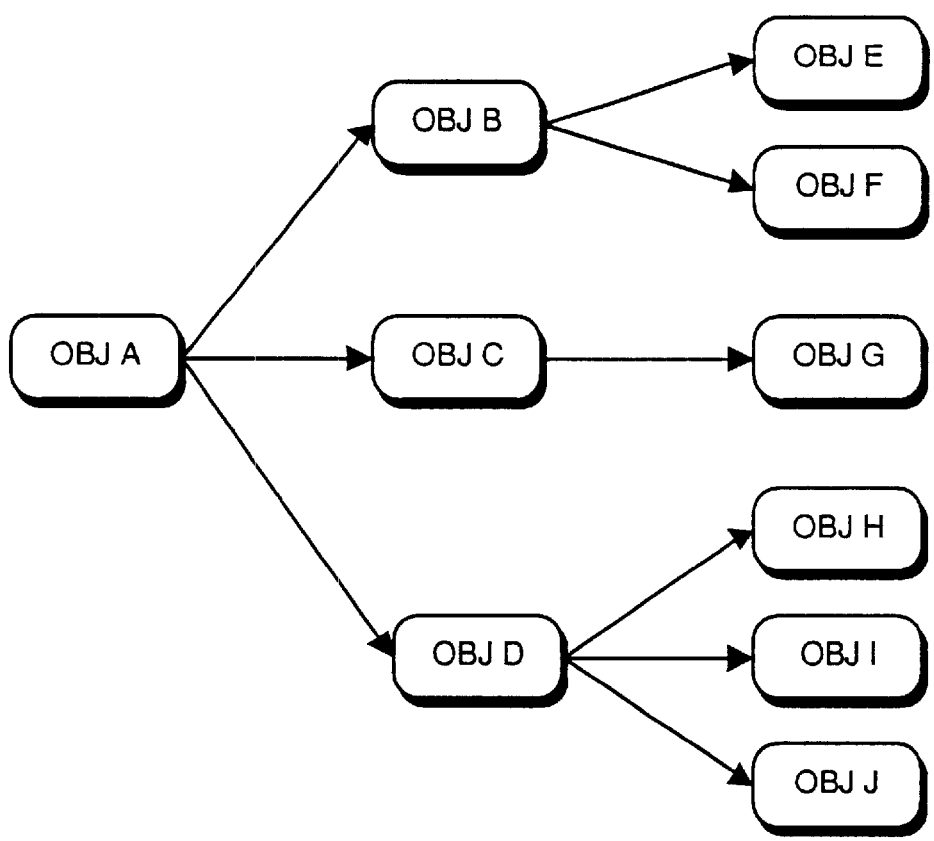
FIG. 30 shows an example of the tree structure data of the second preferred embodiment of the present invention in which the target object is the root, a message is an edge, and an object is a node.

That is, concentric zones corresponding to each depth level are set. Furthermore, tree structure data, in which the target object is set as the root, the messages as edges, and the objects as nodes, are formed once in the memory. FIG. 30 shows an example of tree structure data in which the target object is set as the root, the messages as edges, and the objects as nodes and in this figure, the objects, OBJ A–OBJ J are included as nodes.

Figure 31:
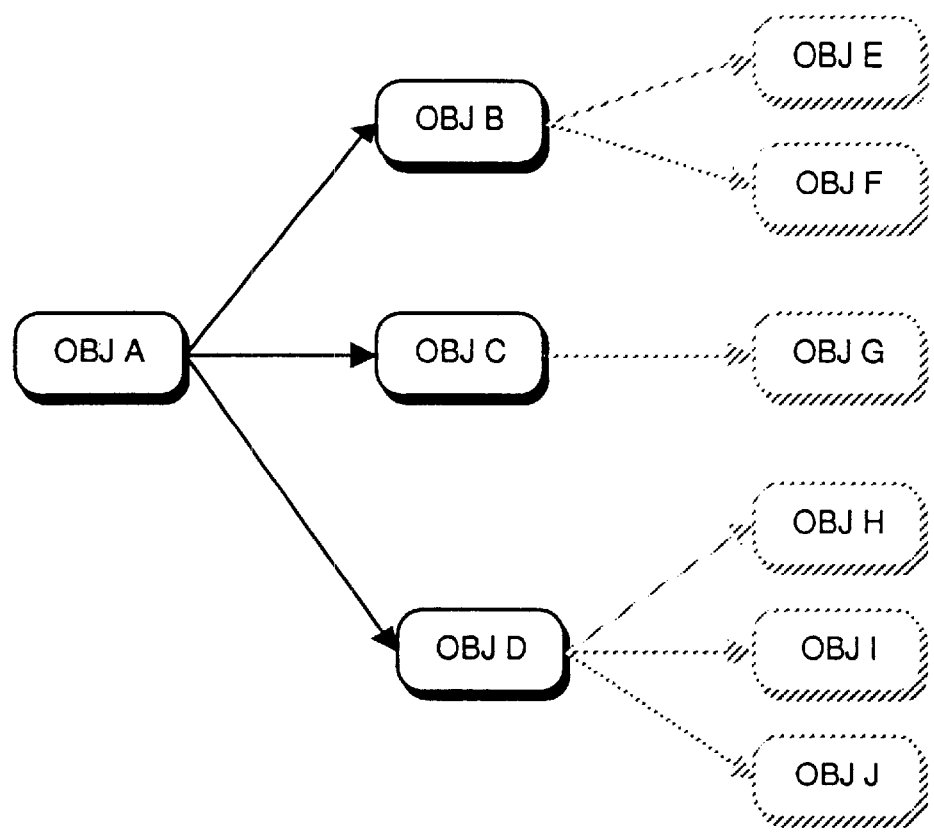
FIG. 31 shows the condition of the tree structure data after the lowest ranking node has been removed in the second preferred embodiment of the present invention.
Figure 32:
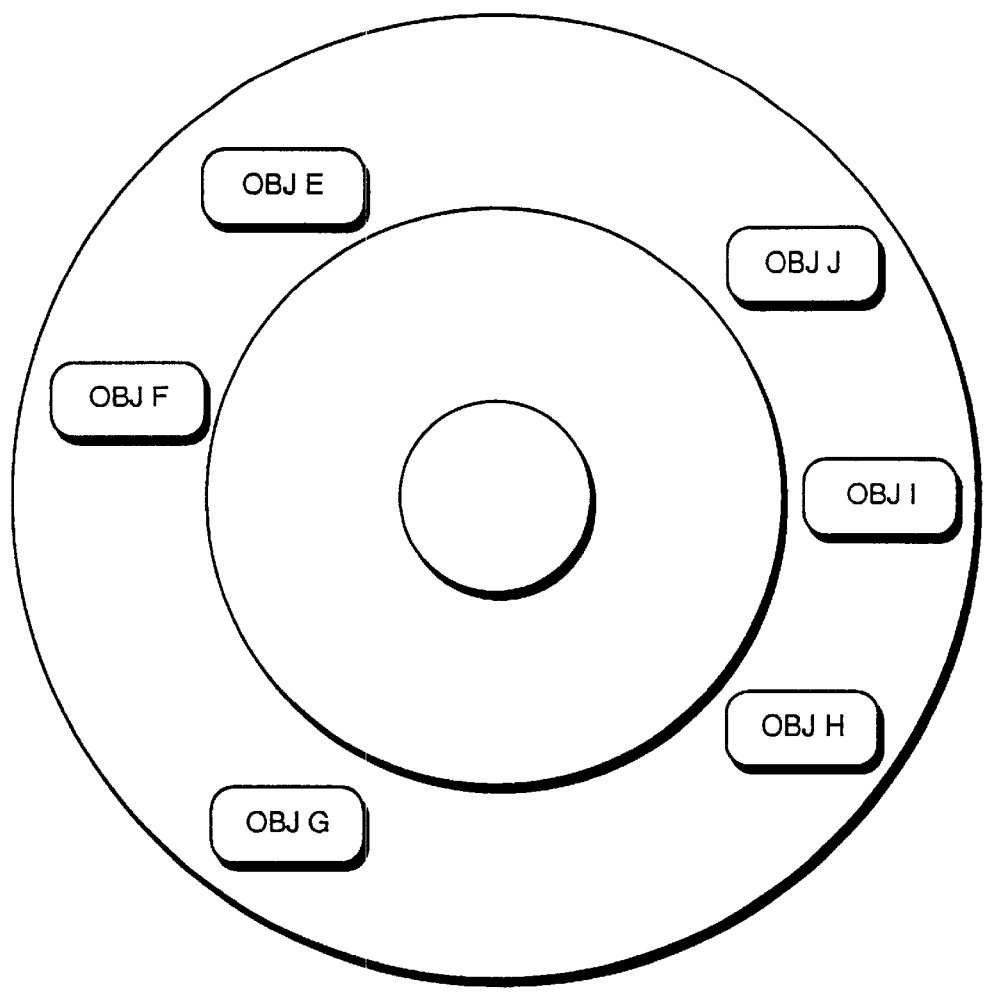
FIG. 32 shows the condition after the lowest ranking node has been positioned at the concentric zone in the second preferred embodiment of the present invention.

Starting with the data at the lower rank side of such tree structure data, data are removed sequentially in groups that consist of all the nodes for which the number of edges from the root (depth level) are the same. FIG. 31 shows the condition of the tree structure data after the nodes at the lowest rank have been removed and the removed nodes are indicated with broken lines. The objects of each removed node are then positioned (from the outer side) to the corresponding depth level part in a circumferential manner. FIG. 32 shows the condition after the lowest ranking nodes have been positioned at the above-mentioned concentric zone. Although each object may be spaced by equal intervals at this time, it is desirable to group together the lower ranking nodes that are dependent on the same upper ranking nodes and spacing nodes dependent on different upper ranking nodes by one node from each other.

Figure 33:
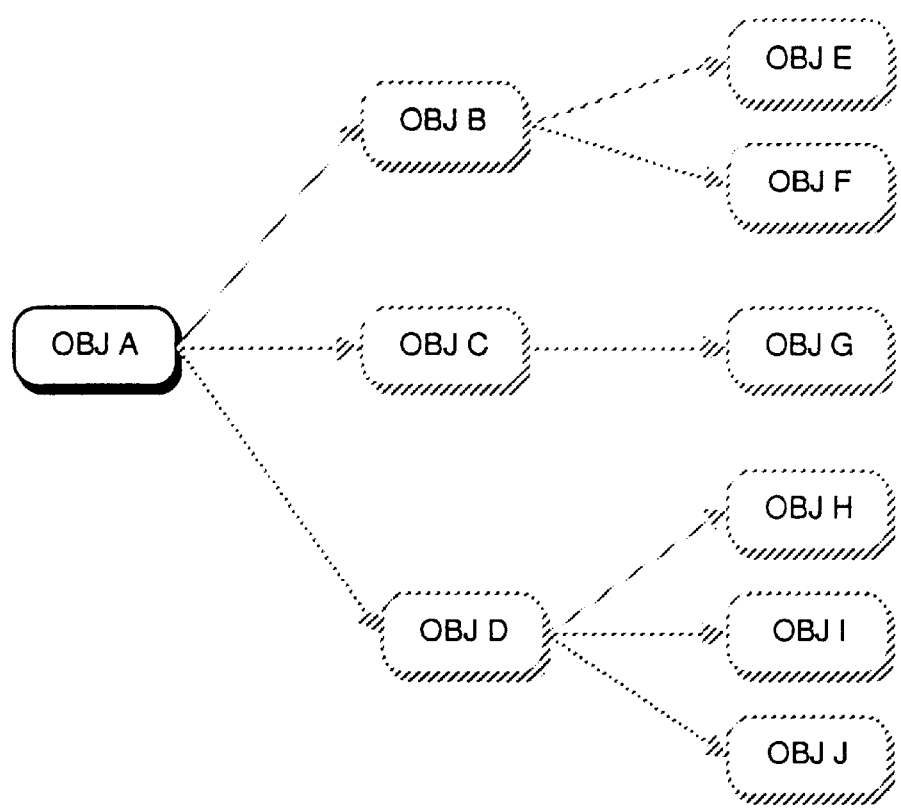
FIG. 33 shows the condition of the tree structure data after all nodes except for object, OBJ A, have been removed in the second preferred embodiment of the present invention.
Figure 34:
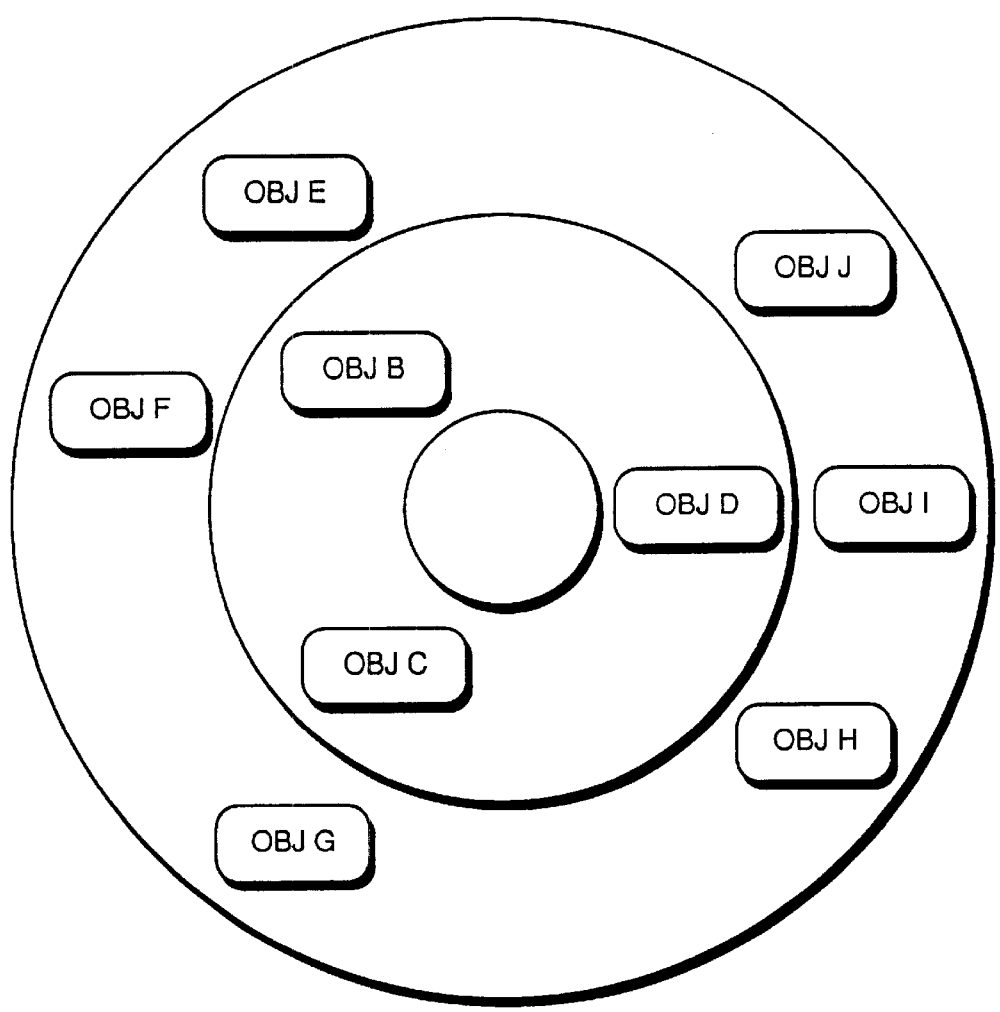
FIG. 34 shows the condition where all nodes except for object, OBJ A, have been positioned in concentric zones in the second preferred embodiment of the present invention.

In the same manner, the upper ranking nodes are removed sequentially and positioned at positions along the circumference of the corresponding depth level part that are close to the center of the relevant lower ranking nodes. FIG. 33 shows the condition of the tree structure data after all nodes except for the object, OBJ A, have been removed and the removed nodes are indicated with broken lines in this figure. FIG. 34 shows the condition where all nodes except for the object, OBJ A, have been positioned at the above-mentioned concentric zones.

Figure 35:
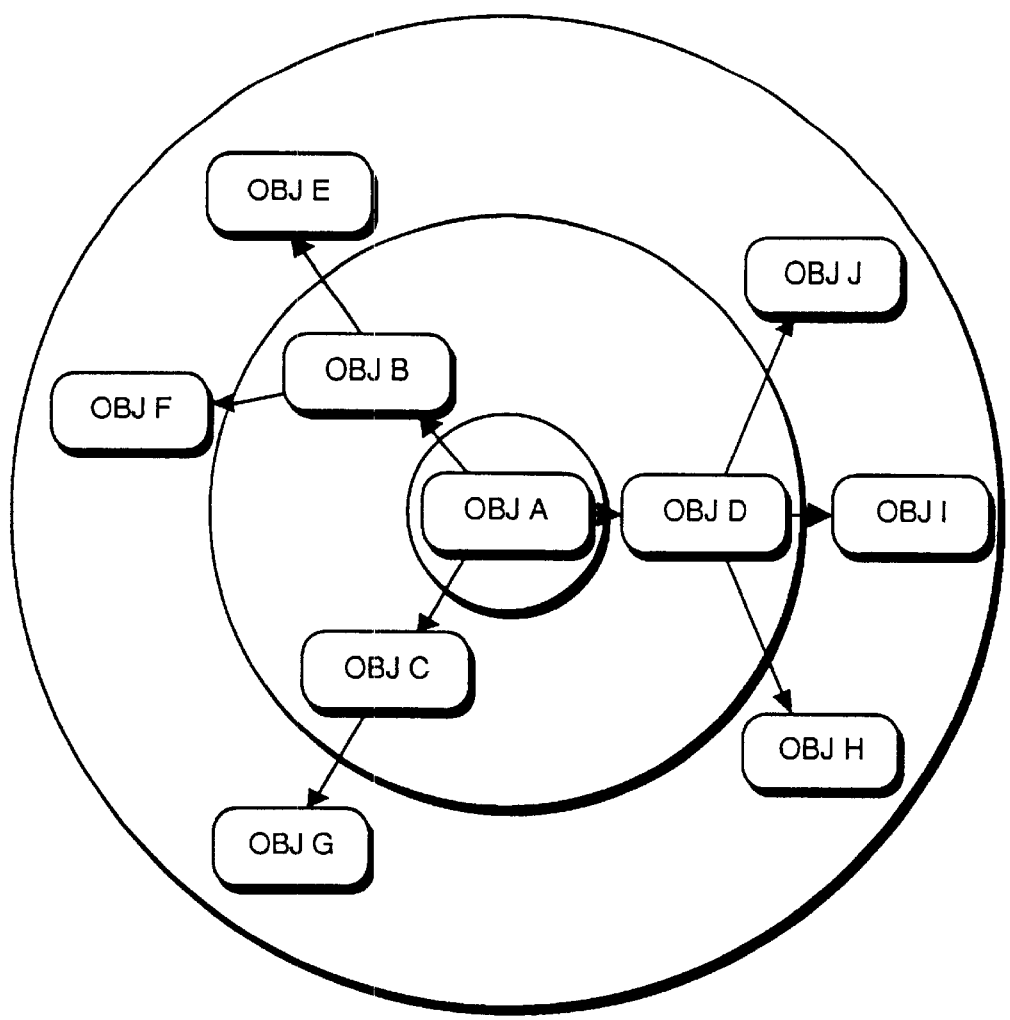
FIG. 35 shows the output contents which have been completed and are ready to be output in the second preferred embodiment of the present invention.

Finally, output is enabled after the central object, OBJ A, is positioned at the center of the concentric zones and the nodes for which message exist are joined by straight lines. FIG. 35 shows the output contents that have been completed and are ready for output.

In order to sequentially add output contents every time it is found that a relevant object and message have been recorded, the following is performed. Concentric zones corresponding to each depth level are set. The target object is displayed at the central zone and objects are displayed at sequentially outward zones as the depth level decreases one at a time. Objects in the same zone are displayed so that the distance (angle) between each other will be equal. If a plurality of objects at the outer side of one object are related, said plurality of objects are displayed together at mutually close positions.

Figure 36:
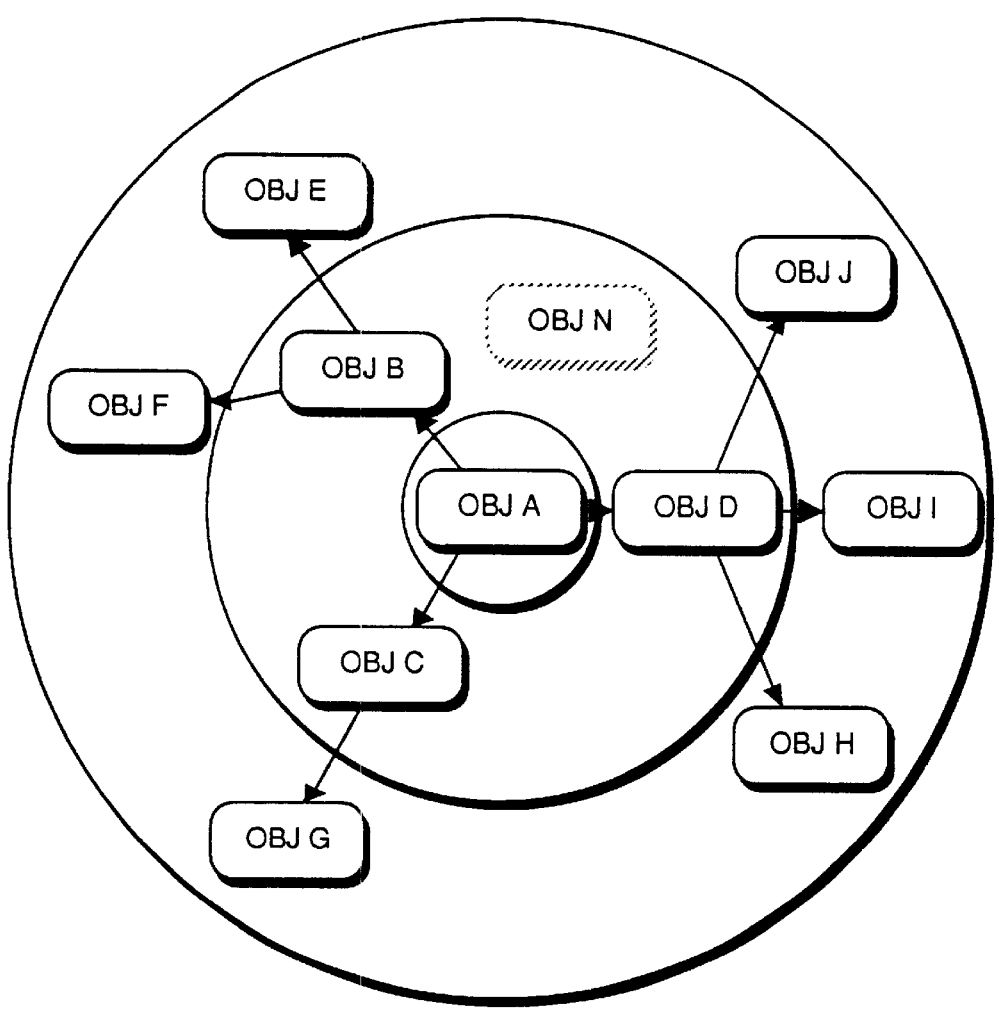
FIG. 36 shows the condition where a new object, OBJ N, is about to be additionally displayed at the position indicated by the broken line in the second preferred embodiment of the present invention.

If a new object is to be displayed at a zone for which an object exists already, the existing objects are moved so that all objects, including the new object, will be spaced by equal intervals. The relevant objects on the outer or inner side of the moved objects are also moved in a similar manner. For example, FIG. 36 shows the condition where a new object, OBJ N, is about to be additionally displayed at the position indicated by a broken line.

Figure 37:
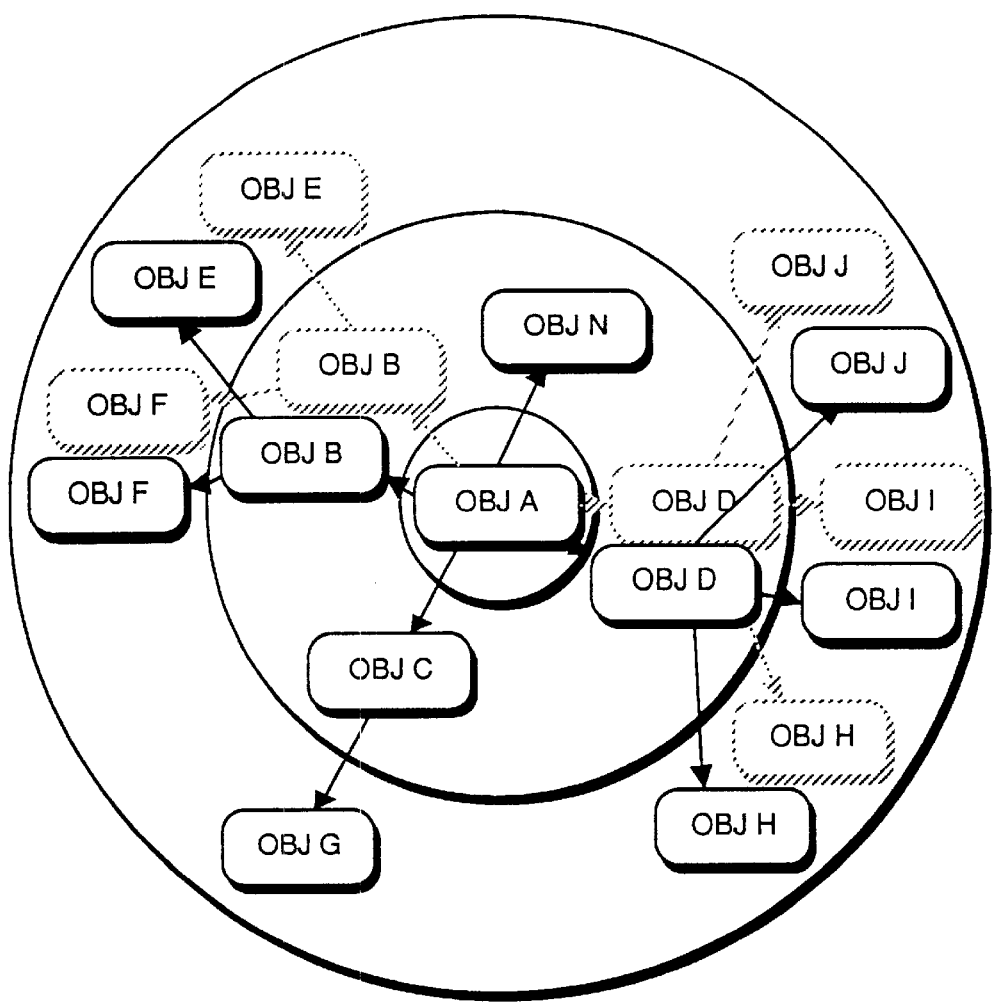
FIG. 37 shows the condition where an existing object is moved to add a new object, OBJ N, in the second preferred embodiment of the present invention.
Figure 1:
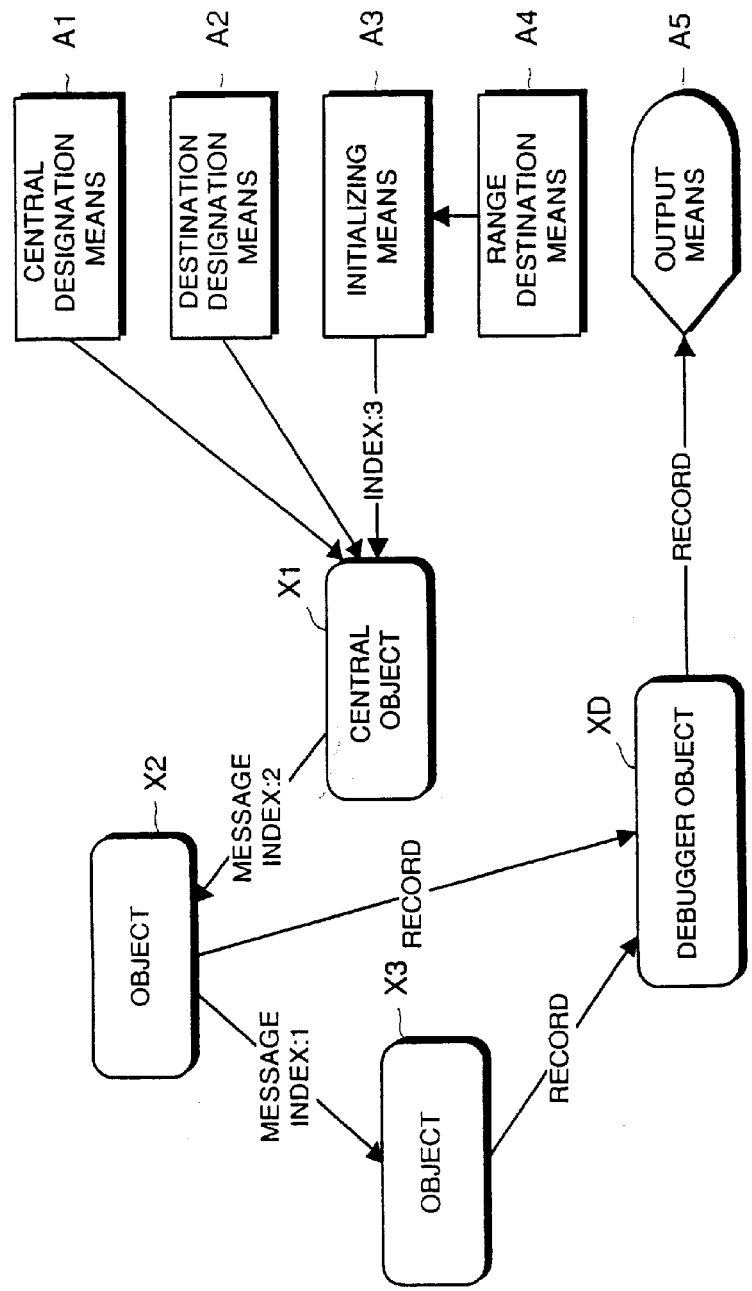
Figure 2:
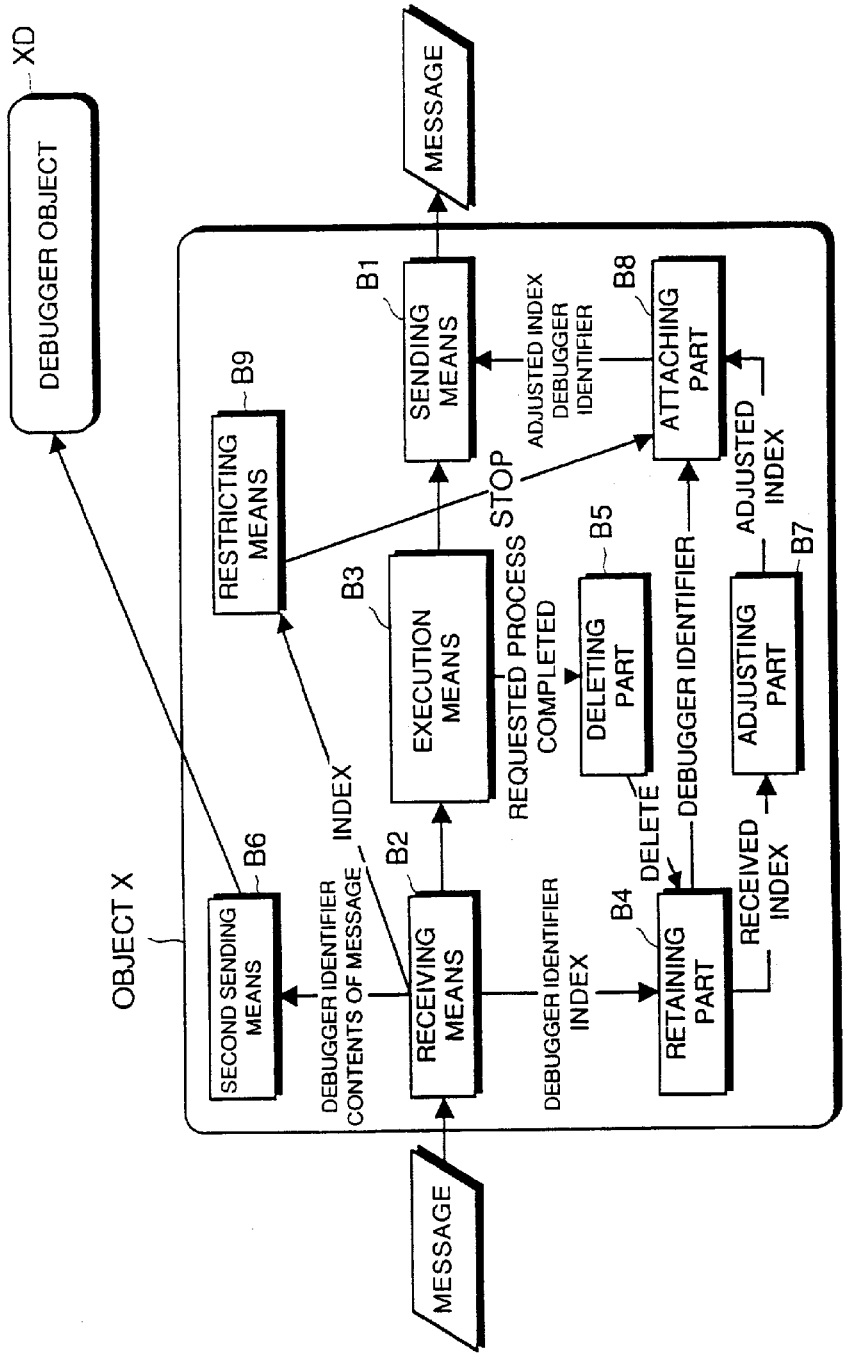
Figure 3:
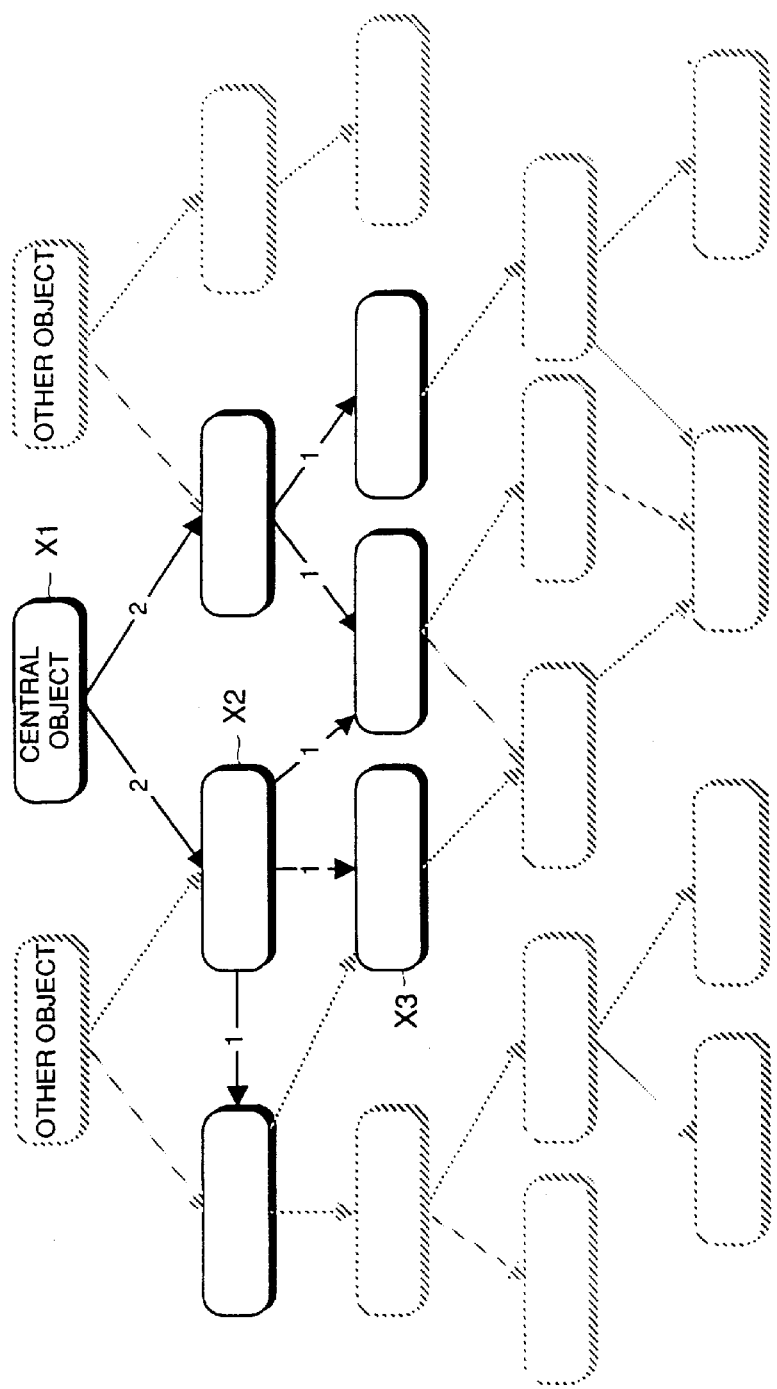

FIG. 37 shows the condition where existing objects are moved to add a new object, OBJ N. That is, as shown in FIG. 37, objects OBJ B and OBJ D are moved and relevant objects OBJ H, OBJ I, and OBJ J, which are located to the outer side of objects OBJ B and OBJ D, are moved in accompaniment. In FIG. 37, the positions of objects prior to being moved are shown by broken lines while the positions of objects after being moved are shown by solid lines.

By displaying objects and messages according to such procedures, the objects and messages do not crowd at one part of the output contents and become easy to see.

3. Other Embodiments

The present invention is not limited to the embodiments described above and since changes of the embodiment can be made freely, the present invention also includes other embodiments such as those exemplified below. For example, in the first embodiment, the coding language of the object-oriented program is not restricted and the recording means does not have to be composed as an object. Also, the several central objects may be designated simultaneously and in such a case, it is free to choose whether or not to set different debugger objects for each central object.

Furthermore, data describing a specific object (instance) relationship may be prepared as follows to detect the indirect messages sent and received "as a result" of direct messages. That is, an adequate number of storage blocks for registering each instance generated are secured in the memory. An ID and an adequate number of array variables are provided for each storage block for each instance. The information on the generation and annihilation of instances are then obtained from the processing system, such as the object manager, and are registered with ID at the storage blocks.

Information concerning the sending and receiving of messages are also obtained from the processing system. When a message has been sent across instances, pointers that mutually indicate the other party are stored in the array variables in the storage blocks of both the sending end and the receiving end to establish a bidirectional link between memory blocks. Each block is thereby composed in a list form connected by the array variables which serve as pointers. The link is eliminated when the receiving instance has completed a process requested by a message and has returned a reply message to the sending end or has returned the processor execution rights to the system.

When a message is to be sent, the link is traced backwards from the storage block of the sending instance and the message is deemed as a message sent and received "as a result" of the direct message only when said message has been traced back to the central object. By performing the above, relevant messages may be specified without providing a fixed composition within each object as was done in the first embodiment.

The various components included in the debugging support device do not have to be provided within the object and may be composed as part of the processing line or system. Although integers were used for the index in the first embodiment, the index does not have to be an integer and can, for example, be an alphabetical character, real number, etc. Furthermore, although the index was decremented in proportion to the distance in the first embodiment, the mode of adjustment of the index is not restricted and, for example, the index may be incremented in proportion to the distance.

Also, although a single debugger object 25 was used in the second embodiment, a plurality of debugger objects may generated in the parallel processing system according to the number of users requesting debugging to enable a plurality of users to perform the debugging process simultaneously. The plurality of debugger objects thus generated may also be activated by one user to promote the debugging process. Also in this case, the debugger object, which is to be the destination of the event history, may be specified from among the plurality of debugger objects by providing each debugger object with an unique debugger identifier.

Furthermore, although in the second embodiment, the debugger object 25 was set within processor A to perform debugging support of the program A executed by the same processor, this debugger object 25 may also be used to perform debugging support of a program executed by another processor in the same parallel processing system. In this case, all that has to be done is to designate an arbitrary object within the program of said another processor to be a new debug target object for debugger object 25 using the first designation means 110.

Needless to say, if the efficiency becomes poor when messages are sent to a debugger object of a different processor as in the above case, it is also possible to set one dedicated debugger object for each processor in the parallel processing system. In this case, since one dedicated debugger object is specified for each processor, the second sending means 109 can be provided with a function by which all of the event history from the same processor are sent to the dedicated debugger object.

The form by which the messages and objects are output is not restricted to being radial and the output may be made in a desired form, such as a tree form, a network form, a character string form, etc.

As has been described above, by the present invention, a user may extract only those messages related to the object targeted for debugging and leave a record of the exchanges of messages between objects as the event history in the debugging of a parallel object-oriented program. The debug target range may thereby be restricted flexibly as necessary and the degree of freedom in the work is increased. Furthermore, since the conventionally complicated investigations of the behavior of parallel object-oriented programs can be simplified and be performed efficiently in a short time, the efficiency of the debugging operation is improved.

While embodiments of the present invention have been described above, it is to be understood that modifications and variations will occur to those skilled in the art without departing from the spirit of the invention as clarified by the appended claims.

What is claimed as new and desired to be secured by Letters Patent of the United States is:

1. A debugging support method for object-oriented programs, comprising the steps of:

making a first designation designating an object-oriented program targeted for debugging, making a second designation designating an object of the designated object-oriented program as a center of a debug target zone; and recording messages sent and received by objects contained within the designated debug target zone, wherein the debug target zone is formed as a series of message rings around the center of the debug target zone based on a number of messages that other objects are away from the center of the debug target zone.

2. A debugging support method as claimed in claim 1, wherein the step of making a second designation comprises:

selecting an arbitrary object arbitrarily from among objects of said object-oriented program to be the center of the debug target zone; and attaching a numeral within a prescribed range to another object within said debug target range corresponding to a distance between the center of the debug target zone and the another object.

3. A debugging support device including a debugger object which records messages sent and received by plural other objects within an object-oriented program, said debugging support device further comprising:

first designation means which designates an object that is arbitrarily selected from among said plural other objects of said object-oriented program, to be a debug target object;

second designation means which designates another of said plural other objects, relevant to said debug target object, as being in a debug target range along with said debug target object based on a number of messages between the debug target object and the another of said plural objects;

collection means which records messages sent and received by each object designated as in the debug target range, according to each object;

cancellation means which, when the collection means has completed collection, removes and cancels the objects designated as in the debug target range for debugging;

storage means which stores a contents designated by said second designation means;

first sending means which sends messages from the objects designated as in the debug target range;

second sending means which sends a contents of messages, received and sent by said receiving means and first sending means, to said debugger object.

4. A debugging support device comprising:

a debugger object which records messages sent and received by plural other objects within an object-oriented program;

first designation means which designates a debug target object from among said plural other objects of said object-oriented program;

second designation means which designates another of said plural other objects, related to said debug target object, as being in a debug target range along with said debug target object based on a number of messages between the debug target object and the another of said plural objects;

collection means which records messages sent and received by each object designated as in the debug target range;

cancellation means which, when the collection means has completed collection, removes and cancels the objects designated as in the debug target range for debugging;

storage means which stores a contents designated by said second designation means;

first sending means which sends messages from the objects designated as in the debug target range;

second sending means which sends a contents of messages, received and sent by said receiving means and first sending means, to said debugger object; and second designation means comprises a range designation means which designates the debug target range by a numeral.

5. A debugging support device comprising:

a debugger object which records messages sent and received by plural other objects within an object-oriented program;

first designation means which designates a debug target object from among said plural other objects of said object-oriented program;

second designation means which designates another of said plural other objects, related to said debug target object, as being in a debug target range along with said debug target object based on a number of messages between the debug target object and the another of said plural objects;

collection means which records messages sent and received by each object designated as in the debug target range;

cancellation means which, when the collection means has completed collection, removes and cancels the objects designated as in the debug target range for debugging;

storage means which stores a contents designated by said second designation means;

first sending means which sends messages from the objects designated as in the debug target range;

second sending means which sends a contents of messages, received and sent by said receiving means and first sending means, to said debugger object; and second designation means comprises destination designation means which designates said debugger object which is to be a recording designation of messages sent and received by objects designated as in the debug target range.

6. A debugging support device as claimed in claim 4, further comprising distance calculating means for calculating distances from said debug target object to each of the objects designated as in the debug target range by depth levels by which said distances are classified in a relative manner by using integers within a prescribed range.

7. A debugging support device as claimed in claim 6, wherein said distance calculating means assigns a prescribed limit value to said depth level when said depth level is to indicate the furthest distance, within the debug target range, from said debug target object.

8. A debugging support device as claimed in claim 7, wherein said first sending means comprises:

registering means for registering in the storage means said identifier and said depth level within a prescribed range; and modifying means for modifying said depth level to a new depth level and attaching said identifier and said new depth level, to a contents of the message to be sent.

9. A debugging support device as claimed in claim 8, wherein said modifying means comprises:

value modifying means for setting said new depth level to a value one step closer to the prescribed limit value than the depth level before modification, wherein the prescribed limit is the depth level that indicates the farthest distance, from said debug target object.

10. A debugging support device as claimed in claim 5, wherein said receiving means comprises means for removing said depth identifier and said depth level from said message when said identifier and said depth level within a prescribed range are attached to the received message.

11. A debugging support device as claimed in claim 5, wherein said second sending means comprises means for sending to the debugger object specified by said identifier messages sent and received by objects within the debug target range when said identifier and said depth level within a prescribed range are registered in said storage means.

12. The device as claimed in claim 4, wherein the second designation means comprises a means for designating the numeral within a prescribed range.

13. The device as claimed in claim 5, wherein the destination designation means comprises a means for using a unique identifier to designate said debugger object which is to be the recording destination.

14. The device as claimed in claim 4, wherein said collection means records at least one of a source and a destination of said messages.

15. The device as claimed in claim 5, wherein said collection means records at least one of a source and a destination of said messages.

16. The method as claimed in claim 1, further comprising the step of detecting as relevant messages both direct messages and indirect messages that are relevant to the center of the debug target zone, wherein said direct messages are messages sent and received during the debugging by the center of the debug target zone, and said indirect messages are messages sent and received during the debugging as a result of said direct messages.

* * * * *

UNITED STATES PATENT AND TRADEMARK OFFICE
CERTIFICATE OF CORRECTION

PATENT NO.    : 6,345,383 B1
DATED         : February 5, 2002
INVENTOR(S)   : Katsuhiko Ueki It is certified that error appears in the above-identified patent and that said Letters Patent is hereby corrected as shown below:

The title page should be deleted and substituted therefor the attached title page.

Delete Drawing Figures 1-37, and substitute therefor the Drawing Figure, consisting of Figs. 1-37, as shown on the attached pages.

Signed and Sealed this

Twenty-seventh Day of May, 2003

JAMES E. ROGAN
*Director of the United States Patent and Trademark Office*

(12) United States Patent
Ueki

(10) Patent No.: US 6,345,383 B1
(45) Date of Patent: Feb. 5, 2002

(54) DEBUGGING SUPPORT DEVICE AND DEBUGGING SUPPORT METHOD

(75) Inventor: Katsuhiko Ueki, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 08/528,247

(22) Filed: Sep. 14, 1995

(30) Foreign Application Priority Data

Sep. 14, 1994 (JP) .............................. 6-219759

(51) Int. Cl.$^7$ ................................. G06F 9/45
(52) U.S. Cl. .......................... 717/4; 709/315
(58) Field of Search ................. 345/683, 680, 345/704, 702; 717/4; 714/38; 709/315

(56) References Cited

U.S. PATENT DOCUMENTS

| | | | | |
|---|---|---|---|---|
| 4,885,717 A | * | 12/1989 | Beck et al. ............... | 395/704 |
| 5,093,914 A | * | 3/1992 | Coplien et al. ............ | 395/700 |
| 5,339,433 A | * | 8/1994 | Frid-Nielsen ............ | 395/700 |
| 5,428,618 A | * | 6/1995 | Ueki et al. ................ | 395/704 |
| 5,600,838 A | * | 2/1997 | Guillen et al. ............ | 395/683 |
| 5,652,888 A | * | 7/1997 | Burgess .................... | 395/683 |
| 5,845,125 A | * | 12/1998 | Nishimura et al. ....... | 395/704 |

OTHER PUBLICATIONS

R. Wahle, et al, "Practical Data Breakpoints: Design and Implementation", ACM publication, pp. 1–12, Jun. 1993.*
T. Moher, "PROVIDE: A Process Visualization and Debugging Environment", IEEE Trans. Software Eng. vol. 14, No. 6, pp. 849–857, Jun. 1988.*
Wim De Pauw et al., Visualizing the Behavior of Object-Oriented Systems, 1993, ACM, 326–337.*
Kleyn et al, Graph Trace–Understanding Object–Oriented Systems Using Concurrently Animated Views, OOPSLA '88 Proceedings, p. 191–205.*

* cited by examiner

Primary Examiner—Majid Banankhah
Assistant Examiner—Sue Lao
(74) Attorney, Agent, or Firm—Oblon, Spivak, McClelland, Maier & Neustadt, P.C.

(57) ABSTRACT

A debugging support method for object-oriented programs by which the debug target objects may be designated and a debugging support method equipped with various means for realizing said method. A first designation means (110) designates an object (100) as the debug target object. At a second designation means (101), a destination designation means (104) designates the destination of the event history and a range designation means (105) designates the range of objects targeted for debug support. While said designation is registered in a storage means (107), a second sending means (109) notifies a collection means (102) of the messages received by a receiving means (106) and messages sent by a first sending means (108). After the completion of the processes, a cancellation means (103) deletes the registered contents in said storage means (107).

16 Claims, 31 Drawing Sheets

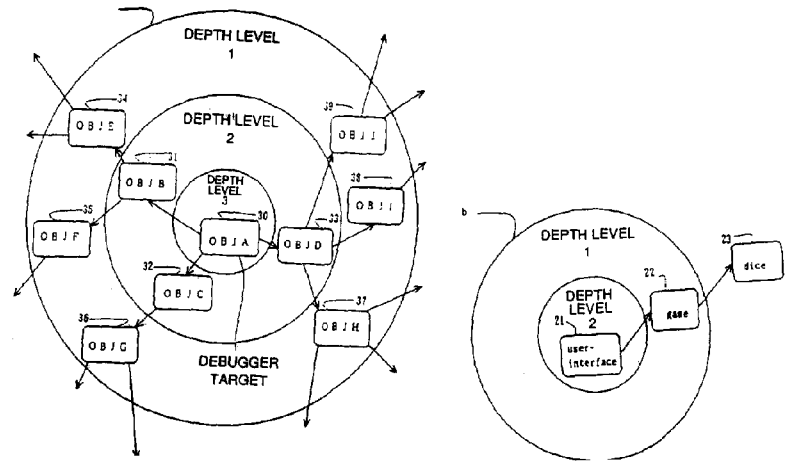

FIG. 7

| DEBUGGER IDENTIFIER<br>(debname) | DEPTH LEVEL<br>(debdepth) |
|---|---|
| debugger1 | 2 |

FIG. 8

| DEBUGGER IDENTIFIER<br>(debname) | DEPTH LEVEL<br>(debdepth) |
|---|---|
| debugger1 | 1 |

FIG. 9

```
void main(void)
   int x = 0;
   int who = -1;

/* Start the game with three players (initialize the
   GAME object) */
   [game start player:3];
/* Continue until all players end the game (until x is no
longer 0) */
   while (x ==0) {
       who = (who + 1)%3; /* Determine the turn of each of
       the three players in order. */
       x = [game roll who:who]; / Roll the dice. **/
   }
   printf("winner No % d\ n", who);
}
```

FIG. 10

```
(void) start:(int) player {
   for (int x = 0;x<player;x++) {
/* Initial setting for number of players.*/
      place [x] = 0;
   }
   return;
}

(int) roll: (int) who {
   int spot;
/* Roll two dice. */
   spot = [dice roll num:2];

/* Move the piece of player "who" by the value of the
dice.*/
   place [who] = place [who] + spot;
/* Return 1 when the goal is entered (when a player has
moved by 10 or more steps). */
   if (place [who] > 10){
      return 1;
   } else {
      return 0;
}
```

FIG. 11

```
(int) roll: (int) num {
   int spot = 0;
/* Calculate the total value of the num number of dice
using random numbers. */
   for (int x = 0; x < num; x++) {
/* Calculate the value obtained by rolling the dice using
random numbers. */
      spot = spot + (Random () * 6 + 1)
   }
   return spot;
}
```

Note 1: Random () is a function that returns a value of 0 or more and less than 1.

Note 2: A count from 1 to 6 is returned when one dice is rolled.

FIG. 15

| | SOURCE | DESTINATION | TYPE | FACTOR | RETURN VALUE |
|---|---|---|---|---|---|
| 1 | user-interface | game | start | player:3 | |

FIG. 16

| | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |

FIG. 17

| | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |
| 3 | game | user-interface | | | 0 |

FIG. 18

|   | SOURCE | DESTINATION | TYPE | FACTOR | RETURN VALUE |
|---|---|---|---|---|---|
| 1 | user-interface | game | start | player:3 | |

FIG. 19

|   | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |

FIG. 20

|   | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |
| 3 | game | dice | roll | num:2 | |

FIG. 21

| | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |
| 3 | game | dice | roll | num:2 | |
| 4 | dice | game | | | 8 |

FIG. 22

| | SOURCE | DESTINATION | TYPE | FACTOR | RETURN VALUE |
|---|---|---|---|---|---|
| 1 | user-interface | game | start | player:3 | |
| 2 | user-interface | game | roll | who:0 | |
| 3 | game | dice | roll | num:2 | |
| 4 | dice | game | | | 8 |
| 5 | game | user-interface | | | 0 |

FIG. 29

| SOURCE | DESTINATION | TYPE | FACTOR | RETURN VALUE |
|---|---|---|---|---|

```
user-interface, game, start, player:3, ;
user-interface, game, roll, who:0, ;
game, dice, roll, num:2, ;
dice, game, , , 8;
game, user-interface, , , 0;
```